United States Patent
Yamazaki et al.

(10) Patent No.: US 8,432,502 B2
(45) Date of Patent: Apr. 30, 2013

(54) DISPLAY DEVICE AND ELECTRONIC DEVICE INCLUDING THE SAME

(75) Inventors: Shunpei Yamazaki, Setagaya (JP); Hajime Kimura, Atsugi (JP); Takeshi Nishi, Atsugi (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 246 days.

(21) Appl. No.: 12/957,809

(22) Filed: Dec. 1, 2010

(65) Prior Publication Data
US 2011/0134350 A1 Jun. 9, 2011

(30) Foreign Application Priority Data

Dec. 4, 2009 (JP) ................................. 2009-277088

(51) Int. Cl.
*G02F 1/136* (2006.01)

(52) U.S. Cl.
USPC ............................................. 349/43; 349/44

(58) Field of Classification Search .................. 349/43, 349/44, 175, 177, 179
See application file for complete search history.

(56) References Cited

U.S. PATENT DOCUMENTS

| | | |
|---|---|---|
| 5,731,856 A | 3/1998 | Kim et al. |
| 5,744,864 A | 4/1998 | Cillessen et al. |
| 6,294,274 B1 | 9/2001 | Kawazoe et al. |
| 6,563,174 B2 | 5/2003 | Kawasaki et al. |
| 6,576,926 B1 | 6/2003 | Yamazaki et al. |
| 6,628,253 B1 | 9/2003 | Hiroki |
| 6,727,522 B1 | 4/2004 | Kawasaki et al. |
| 7,049,190 B2 | 5/2006 | Takeda et al. |
| 7,061,014 B2 | 6/2006 | Hosono et al. |
| 7,064,346 B2 | 6/2006 | Kawasaki et al. |
| 7,105,868 B2 | 9/2006 | Nause et al. |

(Continued)

FOREIGN PATENT DOCUMENTS

| | | |
|---|---|---|
| EP | 1737044 A | 12/2006 |
| EP | 2226847 A | 9/2010 |

(Continued)

OTHER PUBLICATIONS

International Search Report (Application No. PCT/JP2010/071418) Dated Mar. 15, 2011.

(Continued)

*Primary Examiner* — Brian Healy
*Assistant Examiner* — Mary El Shammaa
(74) *Attorney, Agent, or Firm* — Eric J. Robinson; Robinson Intellectual Property Law Office, P.C.

(57) ABSTRACT

A low-power-consuming display device including a liquid crystal material which exhibits a blue phase is provided. A display device includes a first substrate having a pixel portion in which a pixel including a transistor is provided; a second substrate which faces the first substrate; and a liquid crystal layer between the first substrate and the second substrate; in which the liquid crystal layer includes a liquid crystal material which exhibits a blue phase; a gate of the transistor is electrically connected to a scan line, one of a source and a drain of the transistor is electrically connected to a signal line, and the other of the source and the drain of the transistor is electrically connected to an electrode; and the transistor includes an oxide semiconductor layer a hydrogen concentration of which is $5 \times 10^{19}/cm^3$ or less.

10 Claims, 27 Drawing Sheets

U.S. PATENT DOCUMENTS

| | | |
|---|---|---|
| 7,211,825 B2 | 5/2007 | Shih et al |
| 7,282,782 B2 | 10/2007 | Hoffman et al. |
| 7,297,977 B2 | 11/2007 | Hoffman et al. |
| 7,323,356 B2 | 1/2008 | Hosono et al. |
| 7,385,224 B2 | 6/2008 | Ishii et al. |
| 7,402,506 B2 | 7/2008 | Levy et al. |
| 7,411,209 B2 | 8/2008 | Endo et al. |
| 7,453,065 B2 | 11/2008 | Saito et al. |
| 7,453,087 B2 | 11/2008 | Iwasaki |
| 7,462,862 B2 | 12/2008 | Hoffman et al. |
| 7,468,304 B2 | 12/2008 | Kaji et al. |
| 7,501,293 B2 | 3/2009 | Ito et al. |
| 7,576,829 B2 * | 8/2009 | Kikuchi et al. ............... 349/175 |
| 7,674,650 B2 | 3/2010 | Akimoto et al. |
| 7,732,819 B2 | 6/2010 | Akimoto et al. |
| 7,791,074 B2 | 9/2010 | Iwasaki |
| 2001/0046027 A1 | 11/2001 | Tai et al. |
| 2002/0056838 A1 | 5/2002 | Ogawa |
| 2002/0132454 A1 | 9/2002 | Ohtsu et al. |
| 2003/0189401 A1 | 10/2003 | Kido et al. |
| 2003/0218222 A1 | 11/2003 | Wager et al. |
| 2004/0038446 A1 | 2/2004 | Takeda et al. |
| 2004/0127038 A1 | 7/2004 | Carcia et al. |
| 2005/0017302 A1 | 1/2005 | Hoffman |
| 2005/0199959 A1 | 9/2005 | Chiang et al. |
| 2006/0035452 A1 | 2/2006 | Carcia et al. |
| 2006/0043377 A1 | 3/2006 | Hoffman et al. |
| 2006/0091793 A1 | 5/2006 | Baude et al. |
| 2006/0108529 A1 | 5/2006 | Saito et al. |
| 2006/0108636 A1 | 5/2006 | Sano et al. |
| 2006/0110867 A1 | 5/2006 | Yabuta et al. |
| 2006/0113536 A1 | 6/2006 | Kumomi et al. |
| 2006/0113539 A1 | 6/2006 | Sano et al. |
| 2006/0113549 A1 | 6/2006 | Den et al. |
| 2006/0113565 A1 | 6/2006 | Abe et al. |
| 2006/0169973 A1 | 8/2006 | Isa et al. |
| 2006/0170111 A1 | 8/2006 | Isa et al. |
| 2006/0197092 A1 | 9/2006 | Hoffman et al. |
| 2006/0208977 A1 | 9/2006 | Kimura |
| 2006/0228974 A1 | 10/2006 | Thelss et al. |
| 2006/0231882 A1 | 10/2006 | Kim et al. |
| 2006/0238135 A1 | 10/2006 | Kimura |
| 2006/0244107 A1 | 11/2006 | Sugihara et al. |
| 2006/0284171 A1 | 12/2006 | Levy et al. |
| 2006/0284172 A1 | 12/2006 | Ishii |
| 2006/0292777 A1 | 12/2006 | Dunbar |
| 2007/0024187 A1 | 2/2007 | Shin et al. |
| 2007/0046191 A1 | 3/2007 | Saito |
| 2007/0052025 A1 | 3/2007 | Yabuta |
| 2007/0054507 A1 | 3/2007 | Kaji et al. |
| 2007/0090365 A1 | 4/2007 | Hayashi et al. |
| 2007/0108446 A1 | 5/2007 | Akimoto |
| 2007/0152217 A1 | 7/2007 | Lai et al. |
| 2007/0172591 A1 | 7/2007 | Seo et al. |
| 2007/0187678 A1 | 8/2007 | Hirao et al. |
| 2007/0187760 A1 | 8/2007 | Furuta et al. |
| 2007/0194379 A1 | 8/2007 | Hosono et al. |
| 2007/0252928 A1 | 11/2007 | Ito et al. |
| 2007/0272922 A1 | 11/2007 | Kim et al. |
| 2007/0287296 A1 | 12/2007 | Chang |
| 2008/0006877 A1 | 1/2008 | Mardilovich et al. |
| 2008/0038882 A1 | 2/2008 | Takechi et al. |
| 2008/0038929 A1 | 2/2008 | Chang |
| 2008/0050595 A1 | 2/2008 | Nakagawara et al. |
| 2008/0073653 A1 | 3/2008 | Iwasaki |
| 2008/0083950 A1 | 4/2008 | Pan et al. |
| 2008/0106191 A1 | 5/2008 | Kawase |
| 2008/0128689 A1 | 6/2008 | Lee et al. |
| 2008/0129195 A1 | 6/2008 | Ishizaki et al. |
| 2008/0166834 A1 | 7/2008 | Kim et al. |
| 2008/0182358 A1 | 7/2008 | Cowdery-Corvan et al. |
| 2008/0224133 A1 | 9/2008 | Park et al. |
| 2008/0254569 A1 | 10/2008 | Hoffman et al. |
| 2008/0258139 A1 | 10/2008 | Ito et al. |
| 2008/0258140 A1 | 10/2008 | Lee et al. |
| 2008/0258141 A1 | 10/2008 | Park et al. |
| 2008/0258143 A1 | 10/2008 | Kim et al. |
| 2008/0296568 A1 | 12/2008 | Ryu et al. |
| 2009/0045397 A1 | 2/2009 | Iwasaki |
| 2009/0068773 A1 | 3/2009 | Lai et al. |
| 2009/0073325 A1 | 3/2009 | Kuwabara et al. |
| 2009/0114910 A1 | 5/2009 | Chang |
| 2009/0134399 A1 | 5/2009 | Sakakura et al. |
| 2009/0152506 A1 | 6/2009 | Umeda et al. |
| 2009/0152541 A1 | 6/2009 | Maekawa et al. |
| 2009/0153761 A1 * | 6/2009 | Park et al. ...................... 349/43 |
| 2009/0278122 A1 | 11/2009 | Hosono et al. |
| 2009/0280600 A1 | 11/2009 | Hosono et al. |
| 2010/0065844 A1 | 3/2010 | Tokunaga |
| 2010/0092800 A1 | 4/2010 | Itagaki et al. |
| 2010/0109002 A1 | 5/2010 | Itagaki et al. |
| 2010/0276689 A1 | 11/2010 | Iwasaki |
| 2010/0279462 A1 | 11/2010 | Iwasaki |
| 2011/0090183 A1 | 4/2011 | Yamazaki et al. |
| 2011/0090204 A1 | 4/2011 | Yamazaki et al. |
| 2011/0128491 A1 | 6/2011 | Kubota et al. |

FOREIGN PATENT DOCUMENTS

| | | |
|---|---|---|
| JP | 60-198861 A | 10/1985 |
| JP | 63-210022 A | 8/1988 |
| JP | 63-210023 A | 8/1988 |
| JP | 63-210024 A | 8/1988 |
| JP | 63-215519 A | 9/1988 |
| JP | 63-239117 A | 10/1988 |
| JP | 63-265818 A | 11/1988 |
| JP | 05-251705 A | 9/1993 |
| JP | 08-264794 A | 10/1996 |
| JP | 11-505377 | 5/1999 |
| JP | 2000-044236 A | 2/2000 |
| JP | 2000-150900 A | 5/2000 |
| JP | 2002-076356 A | 3/2002 |
| JP | 2002-289859 A | 10/2002 |
| JP | 2003-086000 A | 3/2003 |
| JP | 2003-086808 A | 3/2003 |
| JP | 2004-103957 A | 4/2004 |
| JP | 2004-273614 A | 9/2004 |
| JP | 2004-273732 A | 9/2004 |
| JP | 2007-103918 A | 4/2007 |
| JP | 2007-271839 A | 10/2007 |
| JP | 2009-145865 A | 7/2009 |
| JP | 2009-212443 A | 9/2009 |
| WO | WO-2004/114391 | 12/2004 |
| WO | 2005/090520 | 9/2005 |
| WO | WO-2007/029844 | 3/2007 |
| WO | WO-2009/110623 | 9/2009 |

OTHER PUBLICATIONS

Written Opinion (Application No. PCT/JP2010/071418) Dated Mar. 15, 2011.

Fortunato.E et al., "Wide-Bandgap High-Mobility ZnO Thin-Film Transistors Produced at Room Temperature,", Appl. Phys. Lett. (Applied Physics Letters), Sep. 27, 2004, vol. 85, No. 13, pp. 2541-2543.

Dembo.H et al., "RFCPUS on Glass and Plastic Substrates Fabricated by TFT Transfer Technology,", IEDM 05: Technical Digest of International Electron Devices Meeting, Dec. 5, 2005, pp. 1067-1069.

Ikeda.T et al., "Full-Functional System Liquid Crystal Display Using CG-Silicon Technology,", SID Digest '04:SID International Symposium Digest of Technical Papers, 2004, vol. 35, pp. 860-863.

Nomura.K et al., "Room-Temperature Fabrication of Transparent Flexible Thin-Film Transistors Using Amorphous Oxide Semiconductors,", Nature, Nov. 25, 2004, vol. 432, pp. 488-492.

Park.J et al., "Improvements in the Device Characteristics of Amorphous Indium Gallium Zince Oxide Thin-Film Transistors by Ar Plasma Treatment,", Appl. Phys. Lett. (Applied Physics Letters), Jun. 26, 2007, vol. 90, No. 26, pp. 262106-1-262106-3.

Takahashi.M et al., "Theoretical Analysis of IGZO Transparent Amorphous Oxide Semiconductor, " IDW '08: Proceedings of the 15th International Display Workshops, Dec. 3, 2008, pp. 1637-1640.

Hayashi.R et al., "42.1: Invited Paper: Improved Amorphous In-Ga-Zn-O TFTS,", SID Digest '08: SID International Symposium Digest of Technical Papers, May 20, 2008, vol. 39, pp. 621-624.

Prins.M et al., "A Ferroelectric Transparent Thin-Film Transistor," Appl. Phys. Lett. (Applied Physics Letters), Jun. 17, 1996, vol. 68, No. 25, pp. 3650-3652.
Nakamura.M et al., "The phase relations in the $In_2O_3$-$Ga_2ZnO_4$-ZnO system at 1350° C,", Journal of Solid State Chemistry, Aug. 1, 1991, vol. 93, No. 2, pp. 298-315.
Kimizuka.N. et al., "Syntheses and Single-Crystal Data of Homologous Compounds, $In_2O_3(ZnO)m$ (m=3, 4, and 5), $InGa_2O_3(ZnO)m$ (m=7, 8, 9, and 16) in the $In_2O_3$-$ZnGa_2O_4$-ZnO System," Journal of Solid State Chemistry, Apr. 1, 1995, vol. 116, No. 1, pp. 170-178.
Nomura.K et al., "Thin-Film Transistor Fabricated in Single-Crystalline Transparent Oxide Semiconductor,",Science, May 23, 2003, vol. 300, No. 5623, pp. 1269-1272.
Masuda.S et al., "Transparent thin film transistors using ZnO as an active channel layer and their electrical properties,", J. Appl. Phys. (Journal of Applied Physics), Feb. 1, 2003, vol. 93, No. 3, pp. 1624-1630.
Asakuma.N. et al., "Crystallization and Reduction of Sol-Gel-Derived Zinc Oxide Films by Irradiation with Ultraviolet Lamp," Journal of Sol-Gel Science and Technology, 2003, vol. 26, pp. 181-184.
Osada.T et al., "15.2: Development of Driver-Integrated Panel using Amorphous In-Ga-Zn-Oxide TFT," SID Digest '09: SID International Symposium of Technical Papers, May 31, 2009, pp. 184-187.
Nomura.K et al., "Carrier transport in transparent oxide semiconductor with intrinsic structural randomness probed using single-crystalline $InGaO_3(ZnO)_5$films," Appl. Phys. Lett. (Applied Physics Letters), Sep. 13, 2014, vol. 85, No. 11, pp. 1993-1995.
Li.C et al., "Modulated Structures of Homologous Compounds $InMO3(ZnO)m$ (M=In,Ga; m=Integer) Described by Four-Dimensional Superspace Group,", Journal of Solid State Chemistry, 1998, vol. 139, pp. 347-355.
Son.K et al., "42.4L: Late-News Paper: 4 Inch QVGA AMOLED Driven by the Threshold Voltage Controlled Amorphous GIZO ($Ga_2Oe$-$In_2O_3$-ZnO) TFT," SID Digest '08: SID International Symposium of Technical Papers, May 20, 2008, vol. 39, pp. 633-636.
Lee.J et al., "World's Largest (15-Inch) XGA AMLCD Panel Using IGZO Oxide TFT,", SID Digest '08: SID International Symposium Digest of Technical Papers, May 20, 2008, vol. 39, pp. 625-628.
Nowatari.H et al., "60.2: Intermediate Connector With Suppressed Voltage Loss for White Tandem OLEDS,", SID Digest '09: SID International Symposium Digest of Technical Papers, May 31, 2009, vol. 40, pp. 899-902.
Kanno.H et al., "White Stacked Electrophosphorecent Organic Light-Emitting Devices Employing $MoO_3$ as a Charge-Generation Layer, " Adv. Mater. (Advanced Materials), 2006, vol. 18, No. 3, pp. 339-342.
Tsuda.K et al., "Ultra Low Power Consumption Technologies for Mobile TFT-LCDs ,", IDW '02:Proceedings of the 9th International Display Workshops, Dec. 4, 2002, pp. 295-298.
Van de Walle.C, "Hydrogen as a Cause of Doping in Zinc Oxide,", Phys. Rev. Lett. (Physical Review Letters), Jul. 31, 2000, vol. 85, No. 5, pp. 1012-1015.
Fung.T et al., "2-D Numerical Simulation of High Performance Amorphous In-Ga-Zn-O TFTs for Flat Panel Displays,",AM-FPD '08 Digest of Technical Papers, Jul. 2, 2008, pp. 251-252, The Japan Society of Applied Physics.
Jeong.J et al., "3.1: Distinguished Paper: 12.1-Inch WXGA AMOLED Display Driven by Indium-Gallium-Zinc Oxide TFTs Array,", SID Digest '08: SID International Symposium Digest of Technical Papers, May 20, 2008, vol. 39, No. 1, pp. 1-4.
Park.J et al., "High performance amorphous oxide thin film transistors with self-aligned top-gate structure," IEDM 09: Technical Digest of International Electron Devices Meeting, Dec. 7, 2009, pp. 191-194.
Kurokawa.Y et al., "UHF RFCPUS on Flexible and Glass Substrates for Secure RFID Systems,", Journal of Solid-State Circuits, 2008, vol. 43, No. 1, pp. 292-299.
Ohara.H et al., "Amorphous In-Ga-Zn-Oxide TFTs with Suppressed Variation for 4.0 inch QVGA AMOLED Display,", AM-FPD '09 Digest of Technical Papers, Jul. 1, 2009, pp. 227-230, The Japan Society of Applied Physics.

Coates.D et al., "Optical Studies of the Amorphous Liquid-Cholesteric Liquid Crystal Transition: The "Blue Phase",", Physics Letters, Sep. 10, 1973, vol. 45A, No. 2, pp. 115-116.
Cho.D et al., "21.2:Al and Sn-Doped Zinc Indium Oxide Thin Film Transistors for AMOLED Back-Plane," SID Digest '09: SID International Symposium Digest of Technical Papers, May 31, 2009, pp. 280-283.
Lee.M et al., "15.4:Excellent Performance of Indium-Oxide-Based Thin-Film Transistors by DC Sputtering,", SID Digest '09: SID International Symposium Digest of Technical Papers, May 31, 2009, pp. 191-193.
Jin.D et al., "65.2:Distinguished Paper:World-Largest (6.5") Flexible Full Color Top Emission AMOLED Display on Plastic Film and Its Bending Properties,", SID Digest '09: SID International Symposium Digest of Technical Papers, May 31, 2009, pp. 983-985.
Sakata.J et al., "Development of 4.0-In. Amoled Display With Driver Circuit Using Amorphous In-Ga-Zn-Oxide TFTS,", IDW '09: Proceedings of the 16th International Display Workshops, 2009, pp. 689-692.
Park.J et al., "Amorphous Indium-Gallium-Zinc Oxide TFTS and Their Application for Large Size AMOLED,", AM-FPD '08 Digest of Technical Papers, Jul. 2, 2008, pp. 275-278.
Park.S et al., "Challenge to Future Displays: Transparent AM-OLED Driven by Peald Grown ZnO TFT,", IMID '07 Digest, 2007, pp. 1249-1252.
Godo.H et al., "Temperature Dependence of Characteristics and Electronic Structure for Amorphous In-Ga-Zn-Oxide TFT,", AM-FPD '09 Digest of Technical Papers, Jul. 1, 2009, pp. 41-44.
Osada.T et al., "Development of Driver-Integrated Panel Using Amorphous In-Ga-Zn-Oxide TFT,", AM-FPD '09 Digest of Technical Papers, Jul. 1, 2009, pp. 33-36.
Hirao.T et al., "Novel Top-Gate Zinc Oxide Thin-Film Transistors (ZnO TFTS) for AMLCDS,", Journal of the SID, 2007, vol. 15, No. 1, pp. 17-22.
Hosono.H, "68.3:Invited Paper:Transparent Amorphous Oxide Semiconductors for High Performance TFT,", SID Digest '07: SID International Symposium Digest of Technical Papers, 2007, vol. 38, pp. 1830-1833.
Godo.H et al., "P-9:Numerical Analysis on Temperature Dependence of Characteristics of Amorphous In-Ga-Zn-Oxide TFT,", SID Digest '09: SID International Symposium Digest of Technical Papers, May 31, 2009, pp. 1110-1112.
Ohara.H et al., "21.3:4.0 In. QVGA AMOLED Display Using In-Ga-Zn-Oxide TFTS With a Novel Passivation Layer,", SID Digest '09: SID International Symposium Digest of Technical Papers, May 31, 2009, pp. 284-287.
Miyasaka.M, "Suftla Flexible Microelectronics on Their Way to Business,", SID Digest '07: SID International Symposium Digest of Technical Papers, 2007, vol. 38, pp. 1673-1676.
Chern.H et al., "An Analytical Model for the Above-Threshold Characteristics of Polysilicon Thin-Film Transistors,", IEEE Transactions on Electron Devices, Jul. 1, 1995, vol. 42, No. 7, pp. 1240-1246.
Kikuchi.H et al., "39.1:Invited Paper:Optically Isotropic Nano-Structured Liquid Crystal Composites for Display Applications,", SID Digest '09: SID International Symposium Digest of Technical Papers, May 31, 2009, pp. 578-581.
Asaoka.Y et al., "29.1:Polarizer-Free Reflective LCD Combined With Ultra Low-Power Driving Technology,", SID Digest '09: SID International Symposium Digest of Technical Papers, May 31, 2009, pp. 395-398.
Lee.H et al., "Current Status of, Challenges to, and Perspective View of AM-OLED,", IDW '06: Proceedings of the 13th International Display Workshops, Dec. 7, 2006, pp. 663-666.
Kikuchi.H et al., "62.2:Invited Paper:Fast Electro-Optical Switching in Polymer-Stabilized Liquid Crystalline Blue Phases for Display Application,", SID Digest '07: SID International Symposium Digest of Technical Papers, 2007, vol. 38, pp. 1737-1740.
Nakamura.M, "Synthesis of Homologous Compound with New Long-Period Structure, " Nirim Newsletter, Mar. 1, 1995, vol. 150, pp. 1-4.
Kikuchi.H et al., "Polymer-Stabilized Liquid Crystal Blue Phases,", Nature Materials, Sep. 2, 2002, vol. 1, pp. 64-68.

Kimizuka.N. et al., "Spinel,YbFe$_2$O$_4$, and Yb$_2$Fe$_3$O$_7$ Types of Structures for Compounds in the In$_2$O$_3$ and Sc$_2$O$_3$-A$_2$O$_3$-Bo Systems [A;Fe, Ga,or Al; B: Mg, Mn, Fe, Ni, Cu, or Zn] at Temperatures Over 1000° C.,", Journal of Solid State Chemistry, 1985, vol. 60, pp. 382-384.

Kitzerow.H et al., "Observation of Blue Phases in Chiral Networks," Liquid Crystals, 1993, vol. 14, No. 3, pp. 911-916.

Costello.M et al., "Electron Microscopy of a Cholesteric Liquid Crystal and Its Blue Phase,", Phys. Rev. A (Physical Review. A), May 1, 1984, vol. 29, No. 5, pp. 2957-2959.

Meiboom.S et al., "Theory of the Blue Phase of Cholesteric Liquid Crystals,", Phys. Rev. Lett. (Physical Review Letters), May 4, 1981, vol. 46, No. 18, pp. 1216-1219.

Park.Sang-Hee et al., "42.3: Transparent ZnO Thin Film Transistor for the Application of High Aperture Ratio Bottom Emission AM-OLED Display,", SID Digest '08: SID International Symposium Digest of Technical Papers, May 20, 2008, vol. 39, pp. 629-632.

Orita.M et al., "Mechanism of Electrical Conductivity of Transparent InGaZnO4,", Phys. Rev. B (Physical Review. B), Jan. 15, 2000, vol. 61, No. 3, pp. 1811-1816.

Nomura.K et al., "Amorphous Oxide Semiconductors for High-Performance Flexible Thin-Film Transistors,", Jpn. J. Appl. Phys. (Japanese Journal of Applied Physics), 2006, vol. 45, No. 5B, pp. 4303-4308.

Janotti.A et al., "Native Point Defects in ZnO,", Phys. Rev. B (Physical Review. B), Oct. 4, 2007, vol. 76, No. 16, pp. 165202-1-165202-22.

Park.J et al., "Electronic Transport Properties of Amorphous Indium-Gallium-Zinc Oxide Semiconductor Upon Exposure to Water,", Appl. Phys. Lett. (Applied Physics Letters), 2008, vol. 92, pp. 072104-1-072104-3.

Hsieh.H et al., "P-29:Modeling of Amorphous Oxide Semiconductor Thin Film Transistors and Subgap Density of States,", SID Digest '08: SID International Symposium Digest of Technical Papers, 2008, vol. 39, pp. 1277-1280.

Janotti.A et al., "Oxygen Vacancies in ZnO,", Appl. Phys. Lett. (Applied Physics Letters), 2005, vol. 87, pp. 122102-1-122102-3.

Oba.F et al., "Defect energetics in ZnO: A hybrid Hartree-Fock density functional study,", Phys. Rev. B.(Physical Review. B), 2008, vol. 77, pp. 245202-1-245202-6.

Orita.M et al., "Amorphous transparent conductive oxide InGaO$_3$(ZnO)m (m<4):a Zn 4s conductor,", Philosophical Magazine, 2001, vol. 81, No. 5, pp. 501-515.

Hosono.H et al., "Working hypothesis to explore novel wide band gap electrically conducting amorphous oxides and examples," J. Non-Cryst. Solids (Journal of Non-Crystalline Solids), 1996, vol. 198-200, pp. 165-169.

Mo.Y et al., "Amorphous Oxide TFT Backplanes for Large Size AMOLED Displays," IDW '08: Proceedings of the 6th International Display Workshops, Dec. 3, 2008, pp. 581-584.

Kim.S et al., "High-Performance oxide thin film transistors passivated by various gas plasmas," 214th ECS Meeting, 2008, No. 2317, ECS.

Clark.S et al., "First Principles Methods Using CASTEP,", Zeitschrift fur Kristallographie, 2005, vol. 220, pp. 567-570.

Lany.S et al., "Dopability, Intrinsic Conductivity, and Nonstoichiometry of Transparent Conducting Oxides," Phys. Rev. Lett. (Physical Review Letters), Jan. 26, 2007, vol. 98, pp. 045501-1-045501-4.

Park.J et al., "Dry etching of ZnO films and plasma-induced damage to optical properties,", J. Vac. Sci. Technol. B (Journal of Vacuum Science & Technology B), Mar. 1, 2003, vol. 21, No. 2, pp. 800-803.

Oh.M et al., "Improving the Gate Stability of ZnO Thin-Film Transistors With Aluminum Oxide Dielectric Layers,", J. Electrochem. Soc. (Journal of the Electrochemical Society), 2008, vol. 155, No. 12, pp. H1009-H1014.

Ueno.K et al., "Field-Effect Transistor on SrTiO$_3$ With Sputtered Al$_2$O$_3$ Gate Insulator," Appl. Phys. Lett. (Applied Physics Letters), Sep. 1, 2003, vol. 83, No. 9, pp. 1755-1757.

* cited by examiner

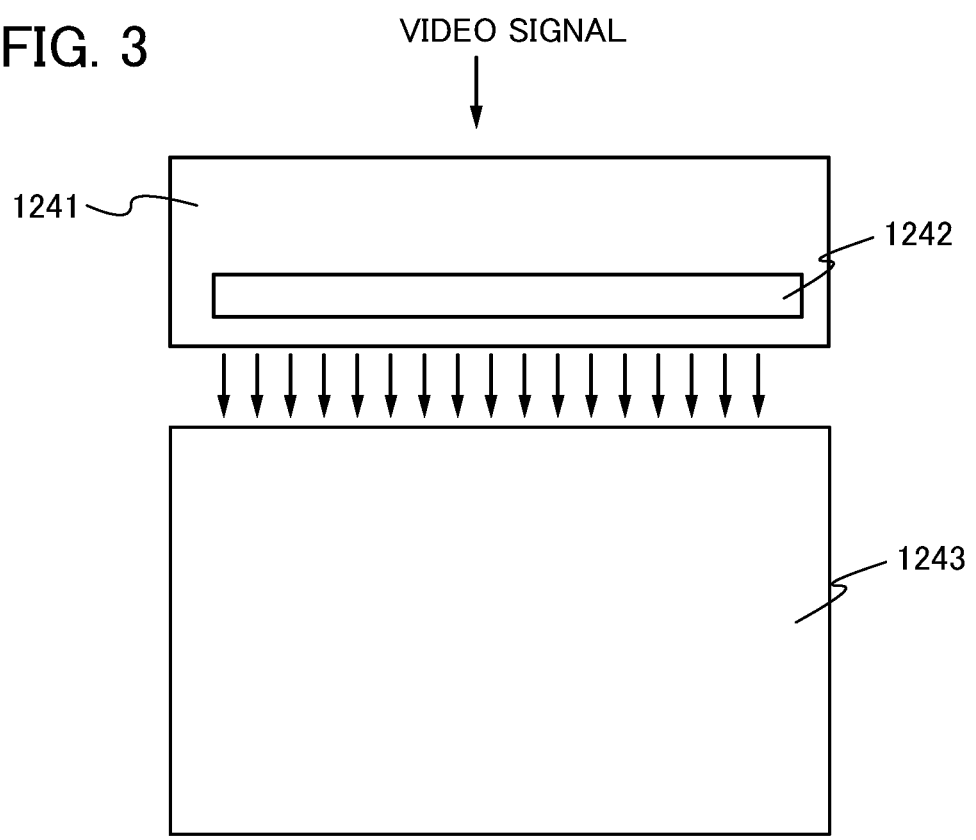

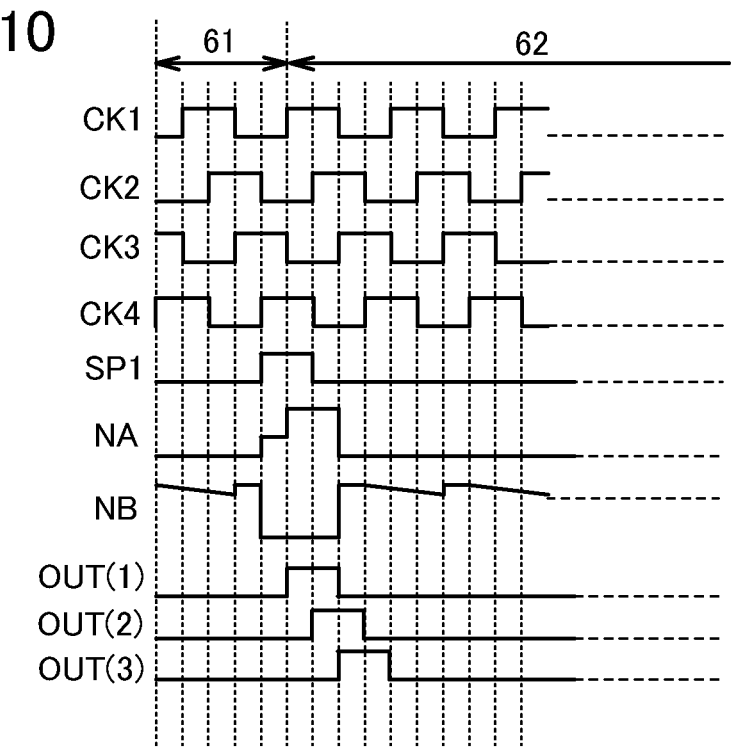

Energy Band Diagram in A-A' Cross Section

Energy Band Diagram when Voltage is Applied

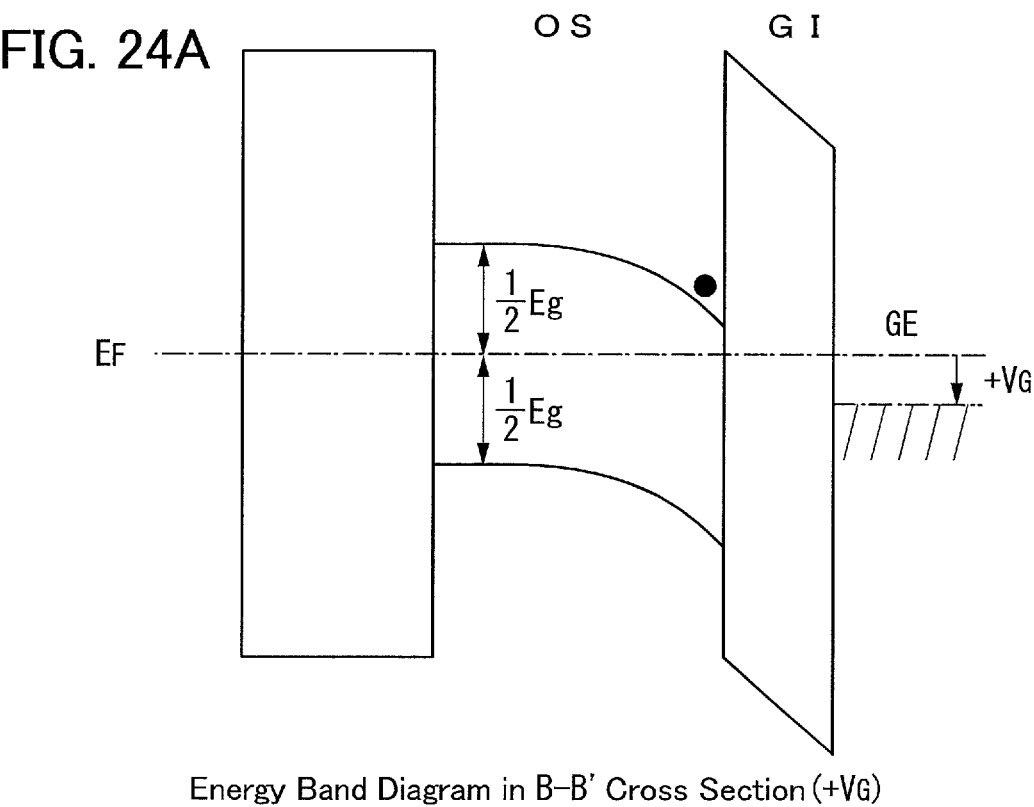
Energy Band Diagram in B-B' Cross Section (+VG)
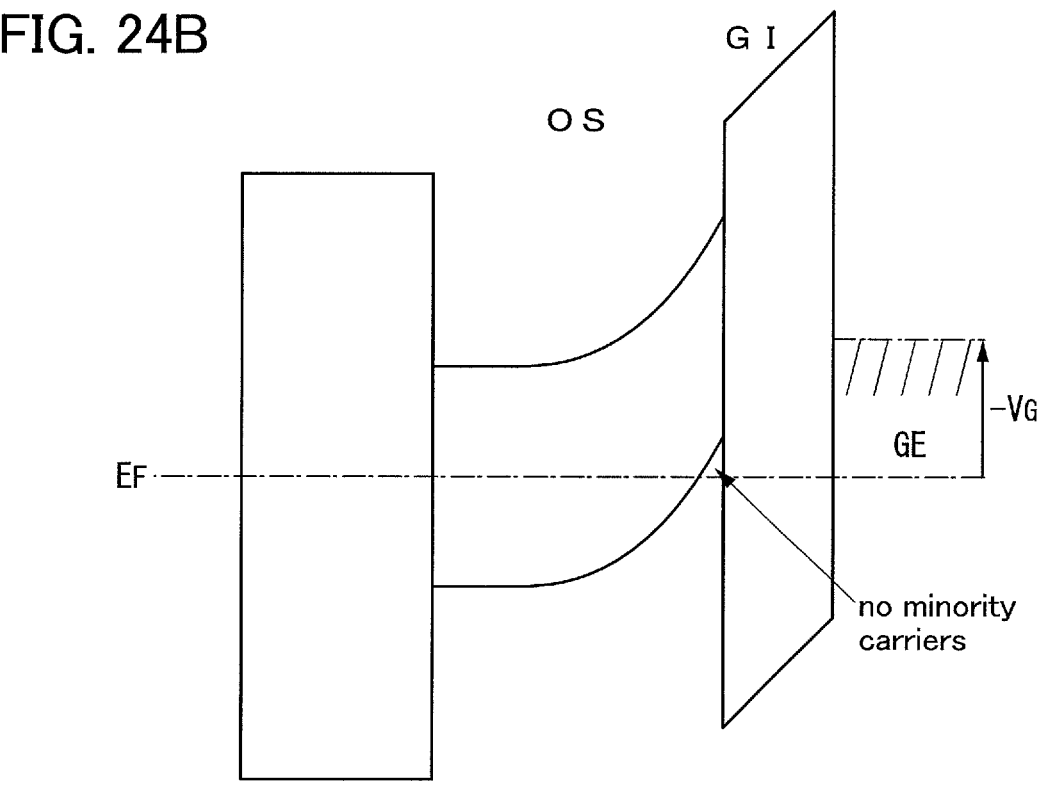
Energy Band Diagram in B-B' Cross Section (-VG)

DISPLAY DEVICE AND ELECTRONIC DEVICE INCLUDING THE SAME

TECHNICAL FIELD

The present invention relates to display devices. Further, the present invention relates to electronic devices including the display device.

BACKGROUND ART

As display devices, liquid crystal display devices or electroluminescence display devices (hereinafter, referred to as EL display devices) including electroluminescence elements are known. The mainstream of liquid crystal display devices is a display device utilizing liquid crystal called nematic liquid crystal. Further, a display device utilizing a liquid crystal material which exhibits a blue phase has been attracting attention in recent years (e.g., see Patent Document 1).
[Reference]
[Patent Document 1] PCT International Publication No. 05/090520

DISCLOSURE OF INVENTION

A display device including a liquid crystal material which exhibits a blue phase has characteristics in that high-speed response is possible, a viewing angle is wide, and an alignment film is not required. On the other hand, the display device including a liquid crystal material which exhibits a blue phase has a problem in that driving voltage is significantly higher than that of a liquid crystal display device of another type. Therefore, in an active matrix liquid crystal display device including a liquid crystal material which exhibits a blue phase where transistors serve as switching elements, the transistors need to have high drain breakdown voltage. In addition, significantly high driving voltage will lead to high power consumption.

An object of one embodiment of the present invention is to provide a highly-reliable display device including a liquid crystal material which exhibits a blue phase. Further, another object is to provide a low-power-consuming display device including a liquid crystal material which exhibits a blue phase. Note that the present invention solves at least one of the above problems.

In view of the foregoing problems, in one embodiment of the present invention, each pixel in a display device at least includes a transistor including a high-purity oxide semiconductor. Here, a "high-purity oxide semiconductor" is an oxide semiconductor in which hydrogen is reduced as much as possible and which is intrinsic or substantially intrinsic. One example of a high-purity oxide semiconductor is an oxide semiconductor the hydrogen concentration of which is $5 \times 10^{19}/cm^3$ or less at most, preferably $5 \times 10^{18}/cm^3$ or less, more preferably $5 \times 10^{17}/cm^3$ or less, or less than $1 \times 10^{16}/cm^3$. A transistor is formed using, for a channel formation region, an oxide semiconductor film the carrier concentration of which is less than $1 \times 10^{14}/cm^3$, preferably less than $1 \times 10^{12}/cm^3$, more preferably less than $1 \times 10^{11}/cm^3$ or less than $6.0 \times 10^{10}/cm^3$. Note that the hydrogen concentration in the oxide semiconductor layer may be measured by secondary ion mass spectrometry (SIMS).

An embodiment of the present invention is a display device including: a first substrate having a pixel portion in which a pixel including a transistor is provided; a second substrate which faces the first substrate; and a liquid crystal layer between the first substrate and the second substrate; in which the liquid crystal layer includes a liquid crystal material which exhibits a blue phase; a gate of the transistor is electrically connected to a scan line, one of a source and a drain of the transistor is electrically connected to a signal line, and the other of the source and the drain of the transistor is electrically connected to an electrode; and the transistor includes an oxide semiconductor layer a hydrogen concentration of which is $5 \times 10^{19}/cm^3$ or less.

Another embodiment of the present invention is a display device including: a first substrate having a pixel portion in which a pixel including a transistor is provided; a second substrate which faces the first substrate; a liquid crystal layer between the first substrate and the second substrate; and a capacitor digital-to-analog converter which converts a digital video signal into an analog video signal; in which the liquid crystal layer includes a liquid crystal material which exhibits a blue phase; a gate of the transistor is electrically connected to a scan line, one of a source and a drain of the transistor is electrically connected to a signal line, and the other of the source and the drain of the transistor is electrically connected to an electrode; the transistor includes an oxide semiconductor layer a hydrogen concentration of which is $5 \times 10^{19}/cm^3$ or less; and the analog video signal is input to the electrode via the signal line and the transistor.

Further, another embodiment of the present invention is a display device in which a period when the display device displays a still image includes a period when output of a signal to all the scan lines in the pixel portion is stopped.

Another embodiment of the present invention is a display device including: a first substrate having a pixel portion in which a pixel including a transistor is provided; a second substrate which faces the first substrate; and a liquid crystal layer between the first substrate and the second substrate, the liquid crystal layer including a liquid crystal material which exhibits a blue phase; a driver circuit portion driving the pixel portion; a signal generation circuit generating a control signal for driving the driver circuit portion and an image signal supplied to the pixel; a memory circuit storing image signals of respective frame periods; a comparison circuit detecting a difference between image signals of successive frame periods among the image signals of the respective frame periods stored in the memory circuit; a selection circuit selecting and outputting the image signals of the successive frame periods when the comparison circuit detects a difference; and a display control circuit supplying the control signal and the image signal output from the selection circuit to the driver circuit portion when the comparison circuit detects a difference, and stopping supply of the control signal to the driver circuit portion when the comparison circuit does not detect a difference; in which the transistor includes an oxide semiconductor layer a hydrogen concentration of which is $5 \times 10^{19}/cm^3$ or less.

In another embodiment of the present invention, the control signal is a high power supply potential, a low power supply potential, a clock signal, a start pulse signal, or a reset signal.

In another embodiment of the present invention, a carrier concentration of the oxide semiconductor layer is less than $1 \times 10^{14}/cm^3$.

In another embodiment of the present invention, the oxide semiconductor layer has a band gap of 2 eV or more.

In another embodiment of the present invention, a resistivity of the liquid crystal material which exhibits a blue phase is $1 \times 10^9$ $\Omega \cdot cm$ or more.

Another embodiment of the present invention is an electronic device including the above display device.

Note that a "liquid crystal material" refers to a composition containing liquid crystal. A liquid crystal material which exhibits a blue phase contains liquid crystal and a chiral agent. As the liquid crystal, thermotropic liquid crystal, low-molecular liquid crystal, high-molecular liquid crystal, ferroelectric liquid crystal, anti-ferroelectric liquid crystal, or the like is used. The chiral agent is employed to align the liquid crystal in a helical structure and to make the liquid crystal exhibit a blue phase. For example, a liquid crystal material into which a chiral agent is mixed at 5 wt % or more is used for a liquid crystal layer.

Note that it is difficult to distinguish a source and a drain of a transistor from each other because of the structure thereof. Further, potential levels may be interchanged depending on an operation of a circuit. Therefore, in this specification, a source and a drain is not particularly specified and are referred to as a first electrode (or a first terminal) and a second electrode (or a second terminal). For example, in the case where the first electrode is a source, the second electrode refers to a drain, whereas in the case where the first electrode is a drain, the second electrode refers to a source.

Note that in this specification, an aperture ratio refers to a ratio of a light-transmitting area to a unit area; the aperture ratio is decreased as an area occupied by components that do not transmit light is widened, whereas the aperture ratio is increased as an area occupied by components that transmit light is widened. In a display device, the aperture ratio is increased by a reduction in area occupied by a wiring and a capacitor line that overlap with a pixel electrode, and by a reduction in size of a transistor.

In this specification, the phrase "A and B are connected" refers to the case where A and B are electrically connected (i.e., A and B are connected with another element or circuit interposed therebetween), the case where A and B are functionally connected (i.e., A and B are functionally connected with another circuit interposed therebetween), or the case where A and B are directly connected (i.e., A and B are connected without another element or circuit interposed therebetween). Note that, each of A and B is an object (e.g., a device, an element, a circuit, a wiring, an electrode, a terminal, a conductive film, or a layer).

Further, in this specification, ordinal numbers such as first, second, third, to N-th (N is a natural number) are used in order to avoid confusion among components, and the terms do not limit the components numerically. For example, a transistor which is referred to as a "first transistor" in this specification may alternatively be referred to as a "second transistor" as long as it is not confused with another component.

According to one embodiment of the present invention, a transistor including a high-purity oxide semiconductor is used as a switching element in each pixel. A transistor including a high-purity oxide semiconductor has stable electrical characteristics. For example, the drain breakdown voltage can be 100 V or more, preferably 500 V, more preferably 1 kV or more. Therefore, with such a transistor, a highly-reliable display device can be provided even in the case where the driving voltage is high like the case of a display device including a liquid crystal material which exhibits a blue phase.

In addition, off-state current of a transistor including a high-purity oxide semiconductor can be reduced to $1 \times 10^{-16}$ A or less, preferably $1 \times 10^{-17}$ A or less, more preferably $1 \times 10^{-18}$ A or less. Thus, voltage can be held in a storage capacitor for a long period of time and thus power consumption for displaying a still image or the like can be suppressed.

Furthermore, the image to be displayed is determined whether it is a still image or a moving image, and in a period in which a still image is displayed, operation of a driver circuit portion is stopped, whereby power consumption of the display device can be further reduced.

BRIEF DESCRIPTION OF DRAWINGS

FIG. 3 illustrates an example of a block diagram of a display device.
FIG. 10 is a timing diagram of a driver circuit.
FIGS. 18A1, 18A2, and 18B are plan views and a cross-sectional view illustrating an example of a liquid crystal display panel.
FIGS. 24A and 24B are energy band diagrams.

BEST MODE FOR CARRYING OUT THE INVENTION

Figure 1:
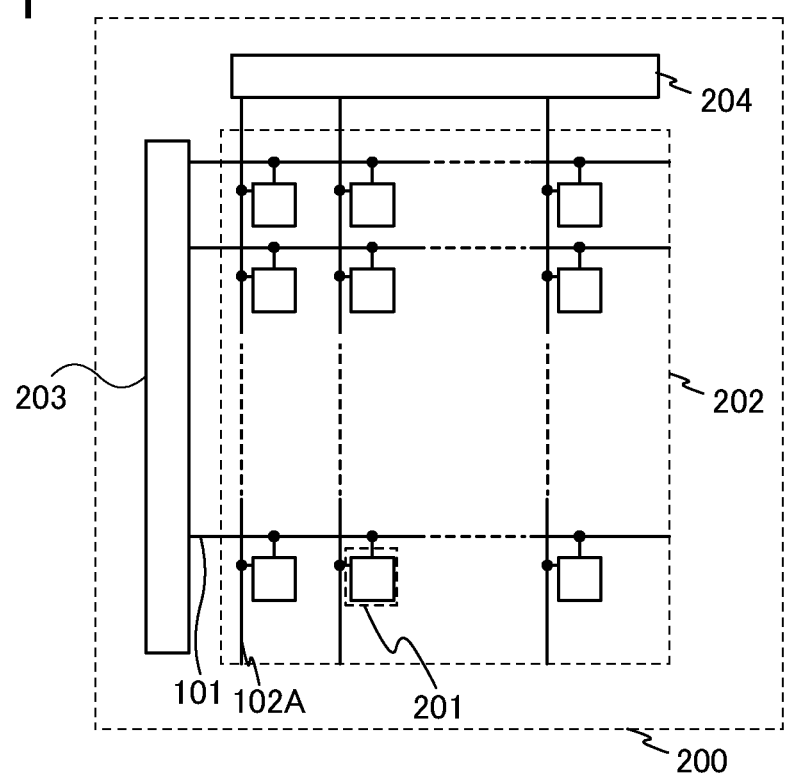
FIG. 1 illustrates a structural example of a display device.

Embodiments of the present invention will be described in detail with reference to the drawings. Note that the present invention is not limited to the following description and it will be readily appreciated by those skilled in the art that modes and details can be modified in various ways without departing from the spirit and the scope of the present invention. Accordingly, the present invention should not be construed as being limited to the description of the embodiments. Note that in the embodiments of present invention to be described below, the same reference numerals are used to denote the same components in different drawings.

Note that, each of the embodiments described below can be implemented by being combined with any of the other embodiments given in this specification unless otherwise specified.

(Embodiment 1)

In this embodiment, an example of a display device which is one embodiment of the present invention will be described. Specifically, a structural example of a pixel in a pixel portion of a display device will be described.

FIG. 1 illustrates a structural example of a display device which is one embodiment of the present invention. As is illustrated in FIG. 1, in a display device, a pixel portion 202 in which a plurality of pixels 201 are arranged in a matrix is provided over a substrate 200. In addition, the display device includes a scan line driver circuit 203 (a first driver circuit) and a signal line driver circuit 204 (a second driver circuit) as circuits for driving the plurality of pixels 201. Whether the pixels 201 are in a selected state or in a non-selected state is determined for each row in accordance with a scan signal supplied through a first wiring 101 (a scan line) electrically connected to the scan line driver circuit 203. The pixel 201 selected by the scan signal is supplied with a video voltage (also referred to as an image signal, a video signal, or video data) through a second wiring 102A (a signal line) electrically connected to the signal line driver circuit 204.

Note that although FIG. 1 illustrates a structure where the scan line driver circuit 203 and the signal line driver circuit 204 are provided over the substrate 200, the present invention is not limited to this structure. Only one of the scan line driver circuit 203 and the signal line driver circuit 204 may be provided over the substrate 200 and the other may be separately mounted. Alternatively, only the pixel portion 202 may be provided over the substrate 200 and the scan line driver circuit 203 and the signal line driver circuit 204 may be separately mounted.

Further, although FIG. 1 illustrates an example where the plurality of pixels 201 are arranged in a matrix (a stripe arrangement), the present invention is not limited to this structure. As for the arrangement of the pixels 201, a delta arrangement or Bayer arrangement may be employed as an alternative to a stripe arrangement.

As a display method in the pixel portion 202, a progressive method, an interlace method or the like can be employed. Color components controlled in the pixel at the time of color display are not limited to three colors of R, G, and B (R, G and B represent red, green, and blue, respectively); for example, R, G, B, and W (W represents white), or R, G, B, and one or more of yellow, cyan, magenta, and the like can be employed. Further, the sizes of display regions of may be different between color components of dots. Note that the present invention is not limited to the application to a display device for color display; the present invention can also be applied to a display device for monochrome display.

Further, although FIG. 1 illustrates a structure where the ratio of the number of first wirings 101 to the number of second wirings 102A, which are respectively extended in the row direction and the column direction of the pixels, is one to one, the present invention is not limited to this structure. For example, adjacent pixels 201 may share the first wiring 101 or the second wiring 102A and be driven.

Figure 2A:
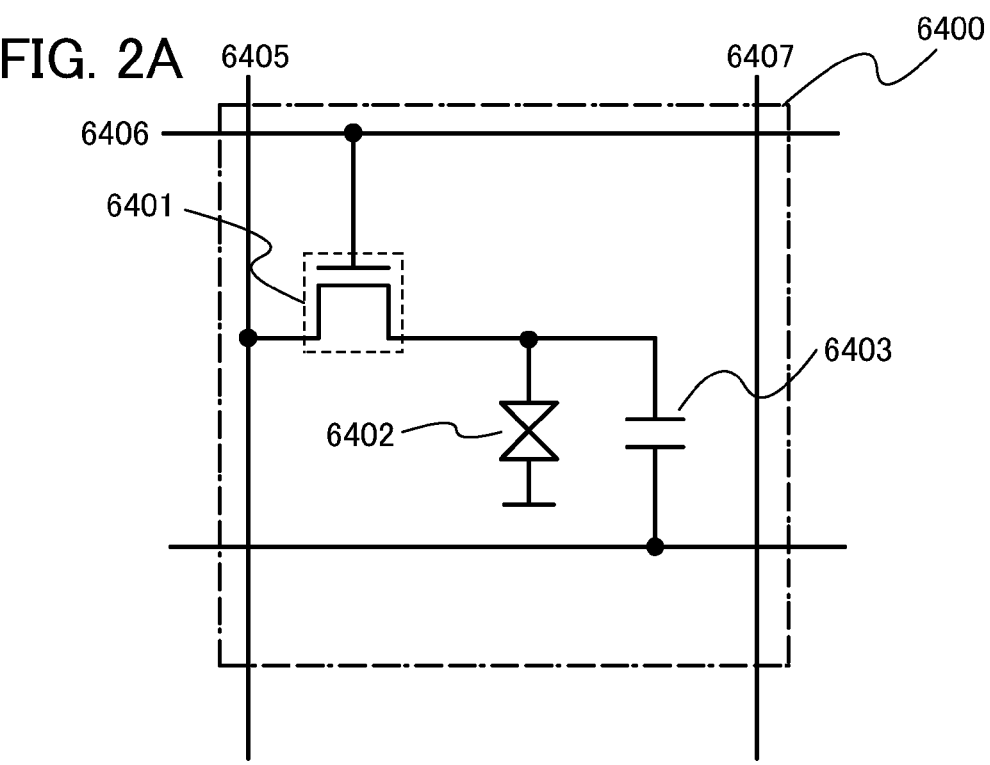
FIGS. 2A and 2B are each an equivalent circuit diagram illustrating a structural example of a pixel.

FIG. 2A is an equivalent circuit diagram illustrating a structural example of the pixel 201 in FIG. 1.

The pixel 6400 includes a transistor (hereinafter, also referred to as a switching transistor) 6401, a liquid crystal element 6402, and a capacitor 6403. The liquid crystal element 6402 includes a liquid crystal material which exhibits a blue phase, between a pair of electrodes (a pixel electrode and a counter electrode).

A gate of the transistor 6401 is electrically connected to a scan line 6406, one of a source and a drain of the transistor 6401 is electrically connected to a signal line 6405, and the other of the source and the drain of the transistor 6401 is electrically connected to the pixel electrode. Here, in this embodiment, a transistor including a high-purity oxide semiconductor layer is used as the transistor 6401. In addition, the transistor 6401 is an n-channel transistor.

The capacitor 6403 includes an insulating layer provided as a dielectric between a pair of electrodes. The capacitance of the capacitor 6403 is set considering leakage current of a thin film transistor provided in the pixel portion or the like so that charge may be held for a predetermined period of time. The capacitance of the capacitor 6403 may also be set considering off-state current of the transistor 6401 or the like. In this embodiment, since the transistor 6401 includes a high-purity oxide semiconductor layer, a capacitor is acceptable enough if it has capacitance less than or equal to $\frac{1}{3}$, preferably less than or equal to $\frac{1}{5}$ of the liquid crystal capacitance in each pixel.

Figure 2B:
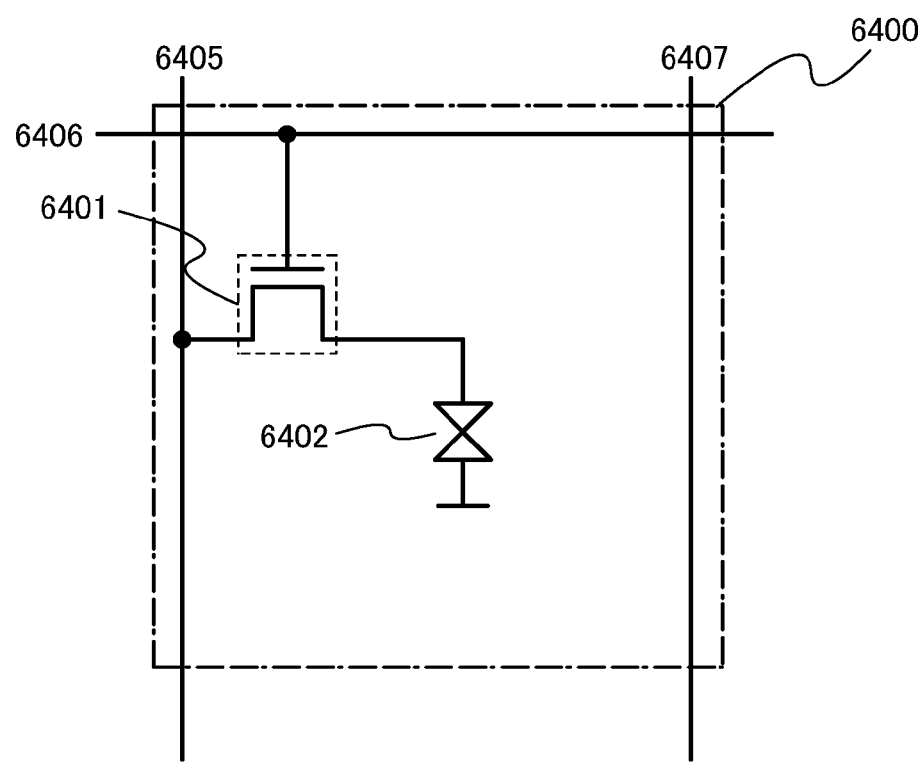

Although the other of the source and the drain of the transistor 6401 is electrically connected to the capacitor 6403 in FIG. 2A, the present invention is not limited to the structure. A structure in FIG. 2B where the capacitor 6403 is not provided can be employed. In other words, in the present invention, since the transistor 6401 includes a high-purity oxide semiconductor layer and off-state current of the transistor 6401 is sufficiently low, voltage can be held for a sufficiently long period of time even with a liquid crystal capacitor, which is formed of a pair of electrodes and a liquid crystal material therebetween, or the like. In addition, since the display device of this embodiment is a transmissive type or a transflective type, omission of the capacitor 6403 leads to an improvement in aperture ratio.

Figure 5A:
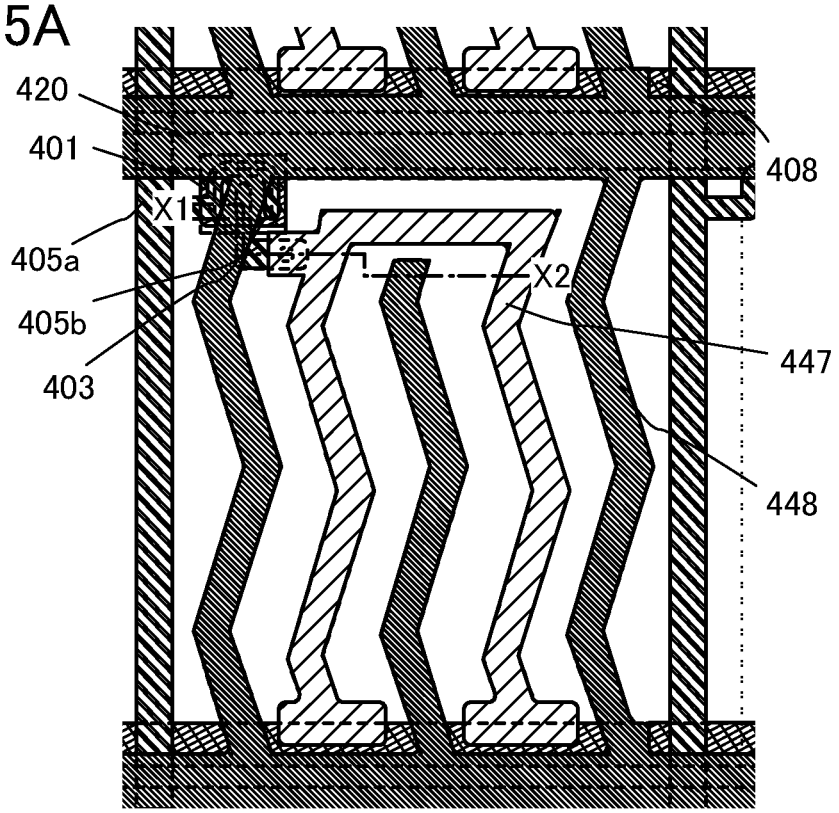
FIGS. 5A and 5B are a plan view and a cross-sectional view illustrating a structural example of a pixel.
Figure 5B:
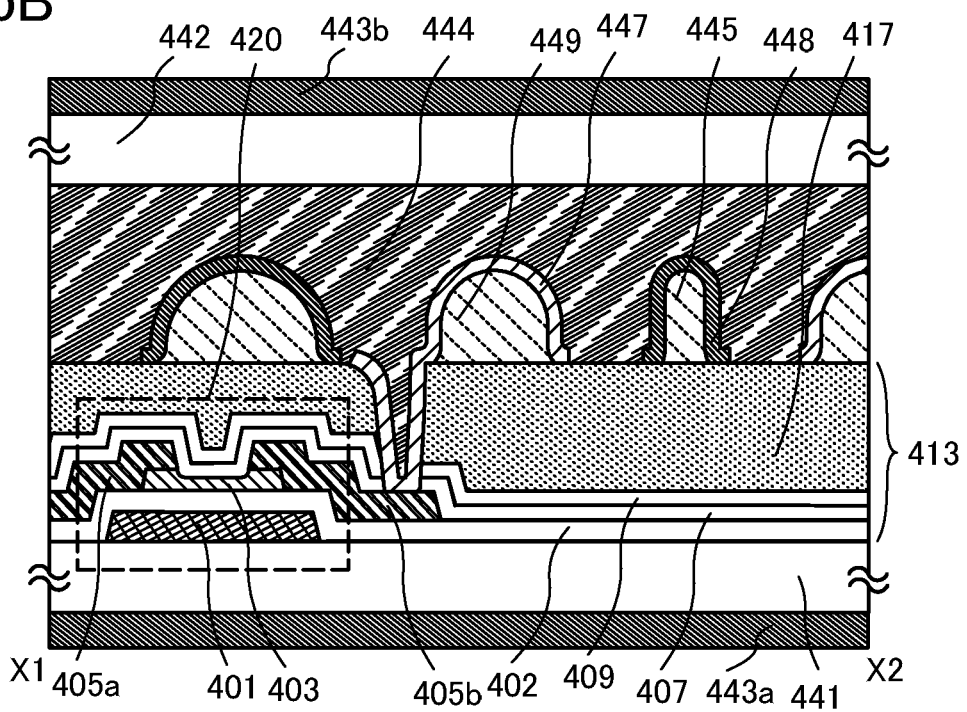

FIGS. 5A and 5B are an example of a plan view and a cross-sectional view of the transistor 6401 in the pixel 201. A transistor 420 illustrated in FIGS. 5A and 5B corresponds to the transistor 6401 and has a bottom-gate structure. The transistor 420 is also called an inverted-staggered transistor because a wiring (a gate electrode) 401 is provided under an oxide semiconductor layer 403 serving as a channel region, and a wiring (one of a source electrode and a drain electrode) 405a and a wiring (the other of the source electrode and the drain electrode) 405b are provided on the opposite side of the oxide semiconductor layer 403 from the wiring 401.

The wiring 401 over a first substrate 441 serves as a gate electrode of the transistor 420. In addition, the wiring 401 may be a scan line itself or may be a wiring which is not a scan line but is electrically connected to a scan line.

A gate insulating layer 402 is provided to cover the wiring 401. The oxide semiconductor layer 403 is provided over the gate insulating layer 402. The wiring 405a and the wiring 405b are provided over the oxide semiconductor layer 403. The wiring 405a and the wiring 405b are electrically connected to the oxide semiconductor layer 403 and one of them serves as a source electrode and the other of them serves as a drain electrode. Note that the wiring 405a may be a signal line itself or may be an electrode which is not a signal line but is electrically connected to a signal line.

In addition, an insulating film 413 is provided to cover the transistor 420. An opening is formed in the insulating film 413. Through the opening, a first electrode 447 and the wiring 405b are electrically connected. Note that although the insulating film 413 has a three-layer structure of a first insulating film 407, a second insulating film 409, and a third insulating film 417 in FIG. 5B, the present invention is not limited to the structure. The insulating film 413 may have a single-layer structure, a two-layer structure, or a stack-layer structure of three or more layers.

Next, the oxide semiconductor layer 403 will be described in detail.

The oxide semiconductor layer 403 in this embodiment is an oxide semiconductor layer in which impurities, which adversely affect the electric characteristics of the transistor including the oxide semiconductor, are reduced to a very low level, that is, the oxide semiconductor layer 403 is a high-purity oxide semiconductor. As a typical example of impurities which adversely affect the electric characteristics, hydrogen is given. Hydrogen is an impurity which may be a supplier (a donor) of carriers in an oxide semiconductor. An oxide semiconductor which includes a large amount of hydrogen may become an n-type oxide semiconductor. Thus, a transistor including an oxide semiconductor which includes a large amount of hydrogen may be a normally-on transistor, and the on/off ratio of the transistor cannot be high enough. In this specification, a "high-purity oxide semiconductor" refers to an oxide semiconductor in which hydrogen is reduced as much as possible and which is intrinsic or substantially intrinsic. One example of a high-purity oxide semiconductor is an oxide semiconductor the hydrogen concentration of which is $5 \times 10^{19}/cm^3$ or less at most, preferably $5 \times 10^{18}/cm^3$ or less, more preferably $5 \times 10^{17}/cm^3$ or less, or less than $1 \times 10^{16}/cm^3$. A transistor is formed using, for a channel formation region, an oxide semiconductor film the carrier concentration of which is less than $1 \times 10^{14}/cm^3$, preferably less than $1 \times 10^{12}/cm^3$, more preferably less than $1 \times 10^{11}/cm^3$ or less than $6.0 \times 10^{10}/cm^3$. Note that the hydrogen concentration of the oxide semiconductor layer may be measured by secondary ion mass spectrometry (SIMS).

Further, it is preferable that the energy gap of the oxide semiconductor layer be 2 eV or more, preferably 2.5 eV or more, more preferably 3 eV or more.

The high-purity oxide semiconductor layer, which is obtained by drastically removing hydrogen included in the oxide semiconductor layer as described above, is used for a channel formation region of a transistor, whereby a transistor with an extremely small off-state current value can be provided.

Here, off-state current (also referred to as leakage current) refers to current that flows between a source and a drain of a transistor when gate voltage between −5 V to −20 V is applied. In the transistor including an oxide semiconductor which is disclosed in this specification, a current value per channel width (w) of 1 μm is 100 aA/μm or less, preferably 10 aA/μm or less, more preferably 1 aA/μm or less.

Next, electrical conduction mechanism of a transistor including an oxide semiconductor layer will be described with reference to FIG. 21, FIG. 22, FIGS. 23A and 23B, and FIGS. 24A and 24B. Note that the following description is based on an ideal situation for ease of understanding and does not entirely reflect the actual situation. Note that the following description is just a consideration and is irrelevant to the validity of the present invention.

Figure 21:
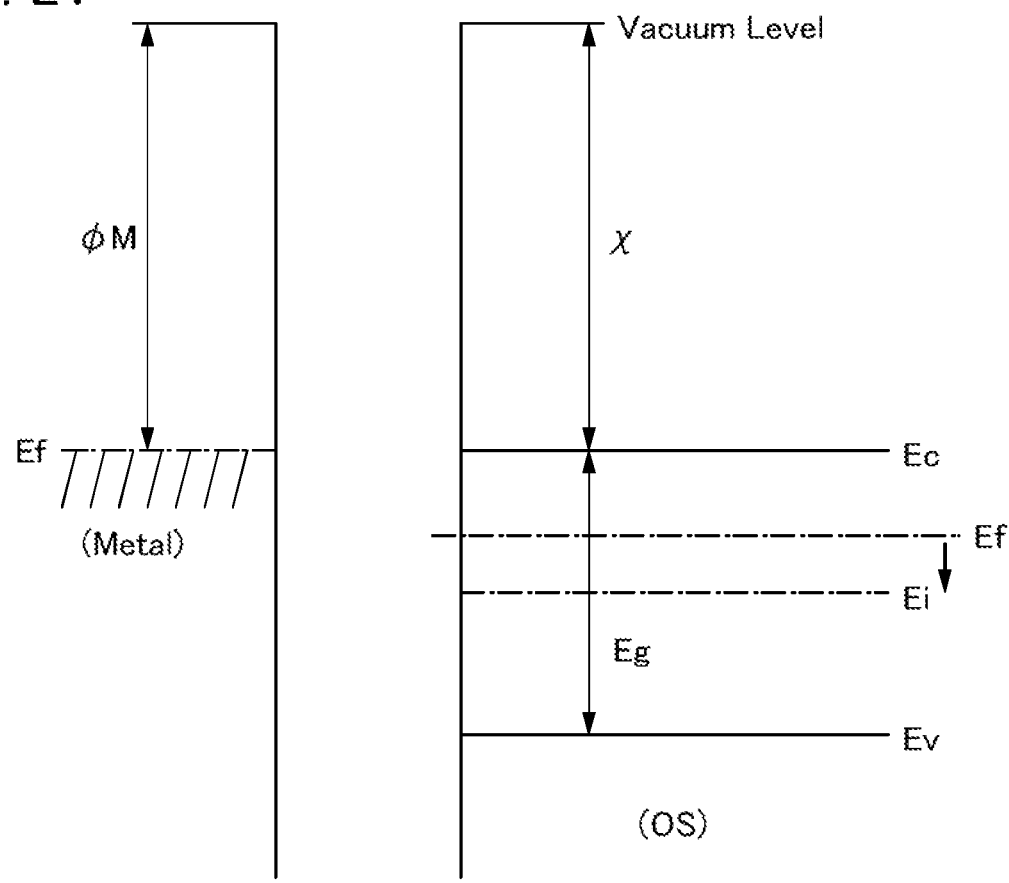
FIG. 21 is an energy band diagram.

FIG. 21 shows the relationship between the work function ($\phi_M$) of a metal (Metal) and the electron affinity ($\chi$) of an oxide semiconductor (OS). The Fermi level of the metal is denoted by $E_F$. The Fermi level of the oxide semiconductor is denoted by $E_f$. The energy at the bottom of the conduction band is denoted by $E_C$. The energy at the top of the valence band is denoted by $E_V$. The intrinsic Fermi level is denoted by $E_i$. The energy band gap of the oxide semiconductor is denoted by $E_g$. Note that the energy band gap ($E_g$) of the oxide semiconductor is 3.0 eV to 3.5 eV.

In FIG. 21, in the case of a conventional oxide semiconductor having n-type conductivity, the Fermi level ($E_f$) is apart from the intrinsic Fermi level ($E_i$) positioned in the middle of the band gap ($E_g$) and is positioned near the conduction band ($E_C$).

Here, when the oxide semiconductor is made closer to an intrinsic semiconductor by decreasing the carrier density, the Fermi level ($E_f$) of the oxide semiconductor becomes closer to the intrinsic Fermi level ($E_i$). In this embodiment, an intrinsic or substantially intrinsic oxide semiconductor is in a state in which carrier density is decreased and the Fermi level ($E_f$) is made close or equal to the intrinsic Fermi level ($E_i$).

The intrinsic or substantially intrinsic oxide semiconductor in this embodiment is obtained based on the following technical idea.

Hydrogen contained in an oxide semiconductor is one of the factors that make the oxide semiconductor have n-type conductivity. In the oxide semiconductor, hydrogen serves as a donor and forms a shallow level which is 0.1 eV to 0.2 eV below the conduction band and thereby increases the carrier concentration.

In addition, deficiency of oxygen (oxygen deficiency) which is a main component of the oxide semiconductor is another factor that makes the oxide semiconductor have n-type conductivity. The oxygen deficiency forms a deep donor level in the oxide semiconductor and thereby increases the carrier concentration.

Although many studies on physical properties of a semiconductor, such as density of states (DOS), have been conducted, they do not include an idea of sufficiently reducing defect levels itself. In this embodiment, a highly purified intrinsic oxide semiconductor is obtained by removal of water or hydrogen, which might increase the DOSs, from the oxide semiconductor. This is based on an idea of sufficiently reducing the DOSs itself.

In other words, in this embodiment, an impurity such as hydrogen, which is one of the factors that make the oxide semiconductor have n-type conductivity, is removed from an oxide semiconductor as much as possible, and oxygen deficiency is also removed, whereby the oxide semiconductor is highly purified. When the oxide semiconductor is highly purified, an intrinsic or substantially intrinsic oxide semiconductor can be obtained. Thus, in FIG. 21, the Fermi level ($E_f$) can be substantially equal to the intrinsic Fermi level ($E_i$).

Specifically, the concentration of hydrogen in the oxide semiconductor is decreased to $5 \times 10^{19}/cm^3$ or lower, preferably $5 \times 10^{18}/cm^3$ or lower, more preferably $5 \times 10^{17}/cm^3$ or lower. Further, the carrier concentration of the oxide semiconductor (for example, the carrier concentration is less than $1 \times 10^{12}/cm^3$, preferably $1.45 \times 10^{10}/cm^3$ or less) is preferably much lower than that of a conventional oxide semiconductor.

Figure 22:
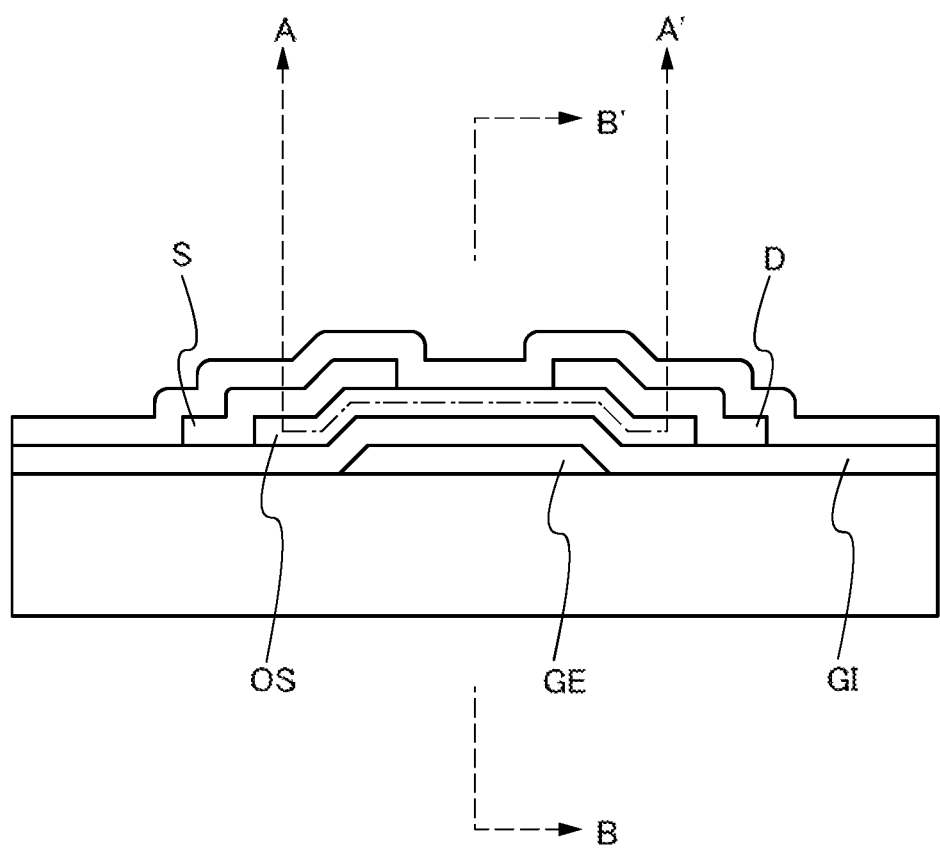
FIG. 22 illustrates a transistor including an oxide semiconductor.

FIG. 22 illustrates an example of an inverted-staggered bottom-gate thin film transistor that is formed using an intrinsic or substantially intrinsic oxide semiconductor. An oxide semiconductor layer (OS) is provided over a gate electrode (GE) with a gate insulating film (GI) provided therebetween. A source electrode (S) and a drain electrode (D) are provided thereover.

It is preferable that a Schottky barrier be not formed between the oxide semiconductor, and the source and the drain. In this embodiment, the electron affinity ($\chi$) of the oxide semiconductor is substantially equal to the work function ($\phi_M$) of a metal used for the source electrode and the drain electrode. For example, it is said that the electron affinity ($\chi$) is 4.3 eV in the case where the band gap ($E_g$) of the oxide semiconductor is 3.15 eV; thus, the source electrode and the drain electrode may be formed with a structure in which titanium (Ti), which has a work function ($\phi_M$) of about 4.3 eV, is in contact with the oxide semiconductor.

Figure 23A:
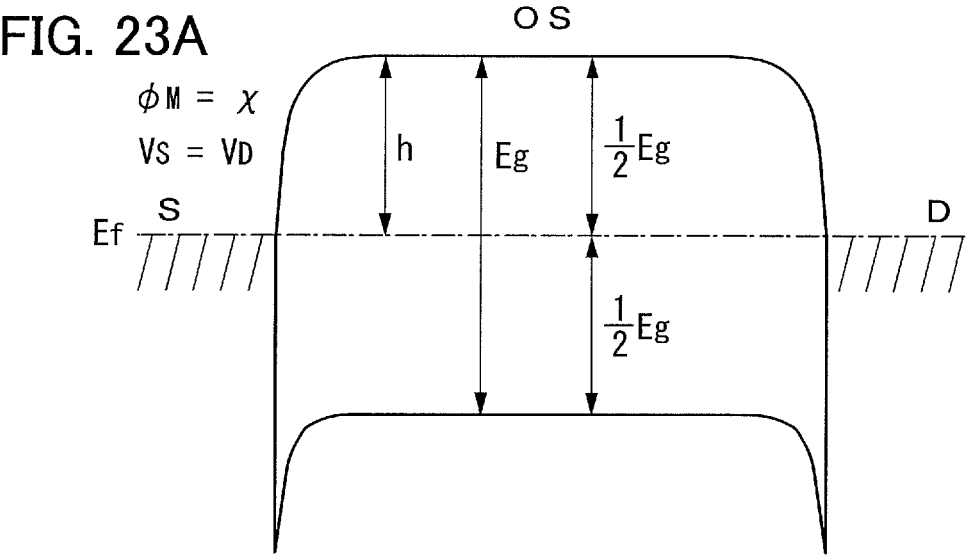
FIGS. 23A and 23B are energy band diagrams.
Figure 23B:
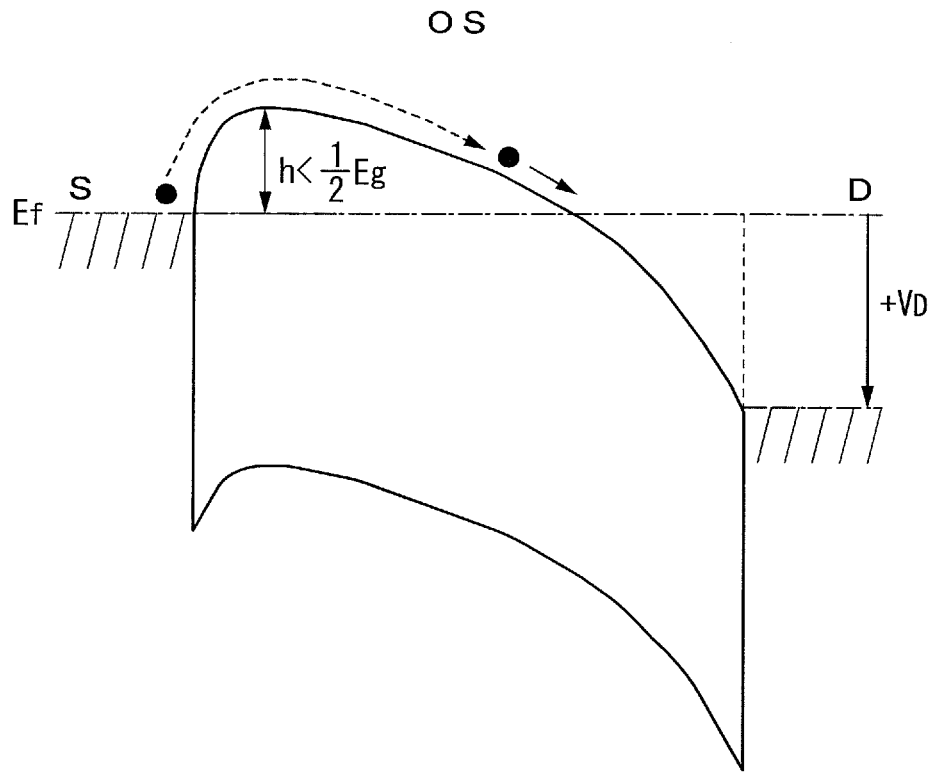

FIGS. 23A and 23B are energy band diagrams (schematic diagrams) in an A-A' cross section in FIG. 22. FIG. 23A illustrates the case where a potential difference between the source (S) and the drain (D) is zero (the source and the drain have the same potential, $V_{DS}=0$ V). FIG. 23B illustrates the case where the potentials of the drain and the gate are higher than that of the source ($V_{DS}>0$ V, $V_{GS}>0$).

In FIG. 23B, a black circle (•) indicates an electron. When positive potentials are applied to the gate and the drain (D), the electron is injected into the oxide semiconductor (OS) over a bather (h) and flows toward the drain (D). The height of the bather (h) changes depending on the gate voltage and the drain voltage. In the case where positive drain voltage is applied, the height of the barrier is smaller than the height of the barrier in FIG. 23A where no voltage is applied, i.e., ½ $E_g$. Thus, when positive voltage is applied to the gate, the potential barrier is lowered as in FIG. 23B and the transistor is in an on state allowing current to flow. On the other hand, when voltage is not applied to the gate (Vg=0 V), the transistor is in an off state and current does not flow because of the high potential bather (½ $E_g$).

FIGS. 24A and 24B are energy band diagrams (schematic diagrams) along B-B' cross-section in FIG. 22.

As illustrated in FIG. 24A, when a positive potential is applied to the gate, the electron moves in the vicinity of an interface between the gate insulating film (GI) and the oxide semiconductor (OS) (the lowest part of the oxide semiconductor that is energetically stable).

On the other hand, when a negative potential (reverse bias) is applied to the gate, as illustrated in FIG. 24B, the current value between the source and drain is extremely close to zero because holes that are minority carriers do not exist substantially.

In this manner, when a transistor is formed using an intrinsic or substantially intrinsic oxide semiconductor, current which flows between the source and the drain when a negative potential is applied to the gate (off-state current) can be less than or equal to $10^{-13}$ A which is the measuring limit. In addition, the temperature characteristics of the transistor formed using an intrinsic or substantially intrinsic oxide semiconductor are favorable. Typically, in the temperature range of from −25° C. to 150° C., the current-voltage characteristics of the transistor, such as on-state current, off-state current, field-effect mobility, a subthreshold value (an S value), and a threshold voltage, hardly change and deteriorate due to temperature.

Note that in the intrinsic or substantially intrinsic oxide semiconductor, interface characteristics with the gate insulating film become noticeable. Therefore, an interface between the gate insulating film and the oxide semiconductor is preferably favorable. Specifically, for example, it is preferable to use an insulating film formed by a CVD method with the use of high-density plasma generated with a power frequency in the range of the VHF band to the microwave band, an insulating film formed by a sputtering method, or the like.

Next, hot-carrier degradation of a transistor including an oxide semiconductor will be described.

The hot-carrier degradation refers to a phenomenon in which electrons that are accelerated to high speed become fixed charges by being injected into a gate insulating film from a channel in the vicinity of drain or form a trap level at the interface between the gate insulating film and the oxide semiconductor film, and thereby causing deterioration such as change in threshold voltage or gate leakage current. The factors of the hot-carrier degradation are channel-hot-electron injection (CHE injection) and drain-avalanche-hot-carrier injection (DAHC injection).

Since the band gap of silicon is as small as 1.12 eV, electrons are likely to be generated like an avalanche owing to an avalanche breakdown, and electrons that are accelerated to be so rapid as to go over a barrier to the gate insulating film are increased in number. On the other hand, the oxide semiconductor described in this embodiment has a wide band gap of 3.15 eV; therefore, the avalanche breakdown is unlikely to occur and resistance to the hot-carrier degradation is higher than that of silicon.

Note that although the band gap of silicon carbide which is one of materials having high breakdown voltage and that of an oxide semiconductor are substantially equal to each other, electrons are less likely to be accelerated in an oxide semiconductor because the mobility in an oxide semiconductor is smaller than that of silicon carbide by approximately two orders of magnitude. Further, a barrier between an oxide semiconductor and an oxide film that is a gate insulating film is larger than a barrier between any of silicon carbide, gallium nitride, or silicon and an oxide film that is a gate insulating film; therefore, in an oxide semiconductor, the number of electrons injected to the oxide film is extremely small. Accordingly, in a transistor including an intrinsic or substantially intrinsic oxide semiconductor, hot-carrier degradation is less likely to be caused and drain breakdown voltage is high compared with a transistor including silicon carbide, gallium nitride, or silicon. In addition, low-concentration impurity regions do not need to be provided between an oxide semiconductor serving as a channel and source and drain electrodes, whereby the transistor structure can be very simple and the number of manufacturing steps can be reduced.

From the above, a transistor including an intrinsic or substantially intrinsic oxide semiconductor has high drain breakdown voltage of, specifically, 100 V or more, preferably 500 V, more preferably 1 kV or more.

Note that since off-state current is extremely small in the transistor including an intrinsic or substantially intrinsic oxide semiconductor, it is difficult to precisely measure an off-state current value by a measuring method for transistor elements having a general size. Therefore, a test element group (also referred to as TEG) for measurement is formed for measurement. The off-state current which is thus measured will be described below.

Figure 25:
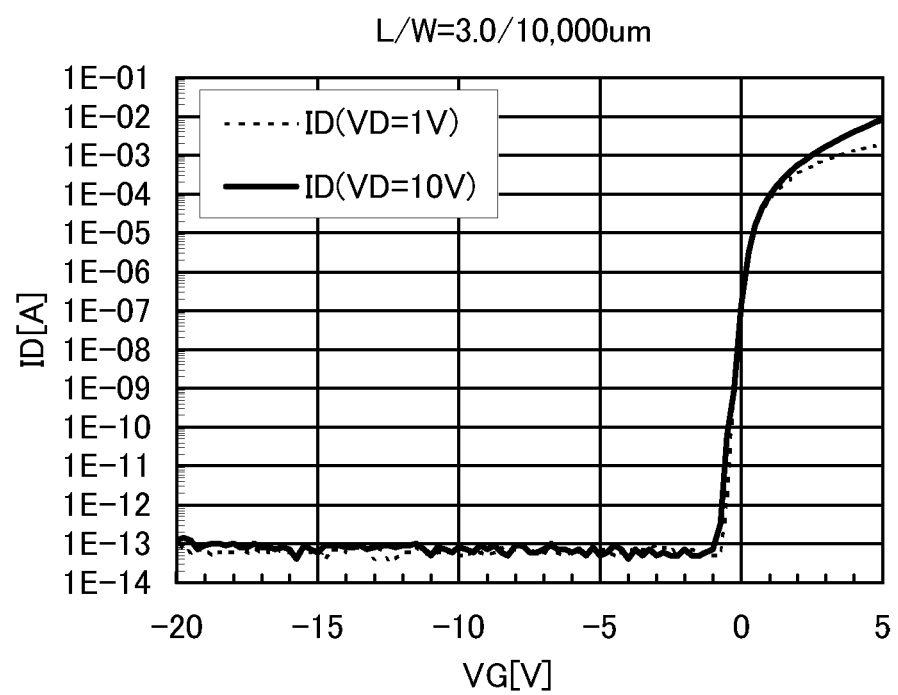
FIG. 25 is a graph showing electric characteristics of a transistor.

Two hundreds transistors each with L/W=3 μm/50 μm were connected in parallel to provide a transistor with L/W=3 μm/10000 μm in TEG. FIG. 25 shows the initial characteristics of the transistor. Here, Vg is in the range of from −20 V to +5 V.

In order to measure the initial characteristics of the transistor, change of characteristics of current between a source and a drain (hereinafter referred to as a drain current or Id), i.e., Vg-Id characteristics, were measured under the conditions where the substrate temperature was set to room temperature, the voltage between the source and the drain (hereinafter referred to as a drain voltage or Vd) was set to 10 V, and the voltage between the source and the gate (hereinafter referred to as a gate voltage or Vg) was changed from −20 V to +20 V.

As shown in FIG. 25, when Vd is 1 V or 10 V and the gate voltage is in the range of −5V to −20V, the transistor having a channel width W of 10000 μm has drain current (off-state current) of $1\times10^{-13}$ [A] or less, which is less than or equal to the resolution (100 fA) of a measuring system (a semiconductor parameter analyzer, Agilent 4156C manufactured by Agilent Technologies Inc.). This off-state current value corresponds to $1\times10^{-17}$ A/μm(=10 aA/μm) per channel width of 1 μm.

The reason why the off-state current of the transistor can be $1 \times 10^{-13}$ [A] or less as shown in FIG. 25 is that the hydrogen concentration of the oxide semiconductor layer is sufficiently reduced. In other words, the hydrogen concentration of the oxide semiconductor layer is $5 \times 10^{19}$ atoms/cm$^3$ or less, preferably $5 \times 10^{18}$ atoms/cm$^3$ or less, more preferably $5 \times 10^{17}$ atoms/cm$^3$ or less or less than $1 \times 10^{16}$ atoms/cm$^3$. Note that the hydrogen concentration of the oxide semiconductor layer may be measured by secondary ion mass spectrometry (SIMS).

The carrier concentration of the oxide semiconductor layer is less than $1 \times 10^{14}$/cm$^3$, preferably less than $1 \times 10^{12}$/cm$^3$, more preferably less than $1 \times 10^{11}$/cm$^3$ or less than $6.0 \times 10^{10}$/cm$^3$. In other words, the carrier concentration of the oxide semiconductor layer is extremely close to zero. Note that for measuring the carrier concentration, for example, a MOS capacitor may be formed and a CV measurement result (CV characteristics) thereof may be evaluated.

As described above, even in a transistor having a channel width W of $1 \times 10^4$ μm and a channel length of 3 μm, excellent electric characteristics, off-state current of $10^{-13}$ A or less and the subthreshold swing (S value) of 0.1 V/dec. or less (the thickness of the gate insulating film is 100 nm), can be obtained. By highly purifying the oxide semiconductor so that the amount of impurities in the oxide semiconductor may be as small as possible, favorable operation of the transistor can be realized. When a transistor having an extremely small value of off-state current (off-state current value) is used as the transistor 6401 in FIGS. 2A and 2B, an electrical signal such as an image signal can be held for a longer period of time.

Specifically, in the transistor including the above oxide semiconductor layer, off-state current per channel width of 1 μm can be $1 \times 10^{-17}$ A or less. On the other hand, in a transistor including low-temperature polysilicon, for example, design or the like is performed while estimating the amount of the off-state current at around $1 \times 10^{-12}$ A. Thus, the voltage holding period of a transistor including an oxide semiconductor can be approximately $10^5$ times as long as that of a transistor including low-temperature polysilicon, when the storage capacitance is substantially the same (approximately 0.1 pF). For example, display is generally performed at 60 frames per second (16 msec per frame) in a pixel including a transistor which includes low-temperature polysilicon. The same can be said for the case of still image display because a decrease in rate (an increase in writing interval) will cause a decrease in voltage of a pixel and a defect of display. In contrast, in the case where the transistor including the above oxide semiconductor layer is used, since off-state current is small, the holding period of one signal writing can be approximately 1600 seconds, that is, $10^5$ times as long as that of the transistor including low-temperature polysilicon. Thus, a still image can be displayed on a display portion even with a small number of writing of image signals. Since the holding period can be extended, the frequency of signal writing can be decreased particularly when a still image is displayed. Therefore, a reduction in power consumption of the display device can be achieved.

Further, a transistor including amorphous silicon has off-state current of $1 \times 10^{-13}$ A or more per channel width of 1 μm. Thus, the voltage holding period of a transistor including a high-purity oxide semiconductor can be approximately $10^4$ times as long as that of a transistor including amorphous silicon, when the storage capacitance is substantially the same (approximately 0.1 pF).

Figure 4A:
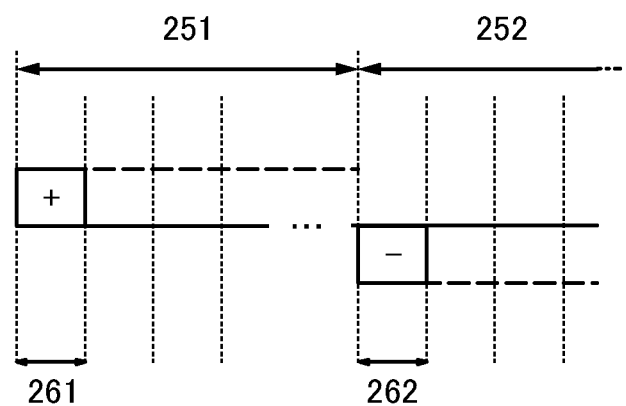
FIGS. 4A and 4B each illustrate a relation between a writing period and a holding period of a pixel.
Figure 4B:
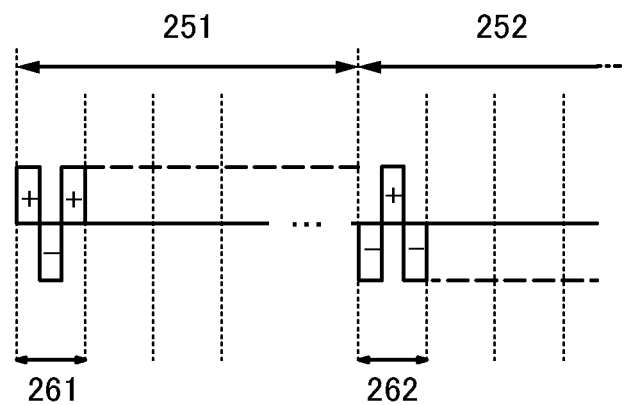

FIG. 4A shows a relationship between a writing period and a holding period (also referred to as one frame period). In FIG. 4A, periods 251 and 252 each are a holding period, and periods 261 and 262 each are a writing period. In FIG. 4A, the polarity of voltage (in the diagram, the polarity is indicated by a plus sign or a minus sign) applied to a liquid crystal element, which is a display element, is inverted in every holding period. Accordingly, the electric field applied to the liquid crystal element is not biased, and the degree of deterioration of the liquid crystal element can be decreased. FIG. 4B shows the relationship in the case of writing voltage whose polarity is inverted a plurality of times in each of the writing periods 261 and 262 of FIG. 4A. By writing voltage whose polarity is inverted a plurality of times in each of the writing periods 261 and 262 as illustrated in FIG. 4B, the degree of deterioration of a liquid crystal element can be further decreased. Note that the polarity of the voltage applied at the end of each of the writing periods 261 and 262 is a polarity to be held in the holding period.

When the above transistor including a high-purity oxide semiconductor layer is used, the holding period (the period 251 or the period 252) can be set longer. Therefore, the frequency of writing into a pixel can be drastically decreased particularly when a still image is displayed. Accordingly, in the case of displaying a still image or the like which involves less frequent changes in display, the number of times of signal writing to a pixel can be decreased, and thus power consumption can be reduced.

In displaying a still image, refresh operation can be performed as appropriate in the holding period, in accordance with the holding rate of the voltage applied to a liquid crystal element. For example, the refresh operation can be performed at the time when the voltage decreases to a predetermined level with respect to a value (initial value) of a voltage just after the signal writing into the pixel electrode of the liquid crystal element. The predetermined level is preferably set, with respect to the initial value, to a voltage at which flickers are not sensed. Specifically, it is preferable to perform the refresh operation (rewriting) every time the voltage reaches a value less than the initial value by 10%, preferably 3%.

During the holding period in still image display, a counter electrode (also referred to as a common electrode) can be put in a floating state. Specifically, a switch may be provided between the counter electrode and a power source for supplying a common potential to the counter electrode. During the writing period, the switch may be turned on and the common potential may be supplied to the counter electrode; after that, during the holding period, the switch may be turned off and the counter electrode may be put in a floating state.

Note that the voltage applied to a liquid crystal element in FIGS. 4A and 4B may be input in accordance with dot inversion driving, source line inversion driving, gate line inversion driving, frame inversion driving, or the like.

Next, a liquid crystal material which exhibits a blue phase will be described.

A liquid crystal material which exhibits a blue phase contains liquid crystal and a chiral agent. As the liquid crystal, thermotropic liquid crystal, low-molecular liquid crystal, high-molecular liquid crystal, ferroelectric liquid crystal, anti-ferroelectric liquid crystal, or the like is used. These liquid crystal materials exhibit a cholesteric phase, a cholesteric blue phase, a smectic phase, a smectic blue phase, a cubic phase, a chiral nematic phase, an isotropic phase, or the like depending on conditions. The chiral agent is employed to align the liquid crystal in a helical structure and to make the liquid crystal exhibit a blue phase. For example, a liquid crystal material into which a chiral agent is mixed at 5 wt % or more may be used for a liquid crystal layer. For the chiral agent, a material which has a high compatibility with liquid crystal and has a strong twisting power is used. In addition, as a material, either an R-enantiomer or an S-enantiomer is favorable, and the use of a racemic body in which an R-enantiomer and an S-enantiomer are mixed at a ratio of 50:50 is preferably avoided.

A cholesteric blue phase and a smectic blue phase, which are blue phases, are seen in a liquid crystal material having a cholesteric phase or a smectic phase with a relatively short helical pitch of 500 nm or less. The alignment of the liquid crystal material has a double twist structure.

When an electric field is not applied, a liquid crystal material which exhibits a blue phase is optically isotropic. When an electric field is applied, birefringence of the liquid crystal material is induced, whereby light is modulated. In other words, a display device including a liquid crystal material which exhibits a blue phase is of a normally black mode. Note that in application of an electric field to a liquid crystal material which exhibits a blue phase, an electric field is preferably applied horizontally so as to be substantially parallel to a substrate plane. Further, since a display device including a liquid crystal material which exhibits a blue phase does not need the formation of an alignment film, an inexpensive display device can be provided.

Note that the blue phase hardly appears outside a narrow temperature range; therefore, it is preferable that a photocurable resin and a photopolymerization initiator be added to a liquid crystal material and polymer stabilization treatment may be performed in order to widen the temperature range. The polymer stabilization treatment is performed in such a manner that a liquid crystal material containing a liquid crystal, a chiral agent, a photocurable resin, and a photopolymerization initiator is irradiated with light having a wavelength with which the photocurable resin and the photopolymerization initiator react. Light irradiation in this polymer stabilization treatment may be performed on a liquid crystal material exhibiting an isotropic phase or a blue phase under the control of temperature. For example, the polymer stabilization treatment is performed in such a manner that the temperature of a liquid crystal layer is controlled and the liquid crystal layer exhibiting a blue phase is irradiated with light. However, the polymer stabilization treatment is not limited to this method and may be performed in such a manner that a liquid crystal layer exhibiting an isotropic phase at a temperature within +10° C., preferably +5° C. of the phase transition temperature between the blue phase and the isotropic phase is irradiated with light. The phase transition temperature between a blue phase and an isotropic phase refers to a temperature at which the phase changes from the blue phase to the isotropic phase when the temperature rises, or a temperature at which the phase changes from the isotropic phase to the blue phase when the temperature decreases.

As an example of the polymer stabilization treatment, the following method can be given: after heating a liquid crystal layer to the isotropic phase, the temperature of the liquid crystal layer is gradually decreased so that the phase changes to the blue phase, and then, irradiation with light is performed while the temperature at which the blue phase is exhibited is kept. Alternatively, another method can be employed in which after the phase changes to the isotropic phase by gradually heating a liquid crystal layer, the liquid crystal layer can be irradiated with light under a temperature within +10° C., preferably +5° C. of the phase transition temperature between the blue phase and the isotropic phase (in the state where the liquid crystal layer is exhibiting the isotropic phase). Moreover, in the case where an ultraviolet curable resin (a UV curable resin) is used as the photocurable resin contained in the liquid crystal material, the liquid crystal layer may be irradiated with ultraviolet rays. Even in the case where the blue phase is not exhibited, if polymer stabilization treatment is performed by irradiation with light at a temperature within +10° C., preferably +5° C. of the phase transition temperature between the blue phase and the isotropic phase (in the state where the liquid crystal layer is exhibiting the isotropic phase), the response time can be made as short as 1 msec or less and high-speed response is possible.

In addition, resistivity (or specific resistance) of the liquid crystal material which exhibits a blue phase is preferably made as high as possible. This is because if the resistivity of the liquid crystal material is low, charge will leak to the counter electrode from the pixel electrode through the liquid crystal layer, which may affect the voltage value applied to the liquid crystal layer. Thus, in one embodiment of the present invention, the resistivity of a liquid crystal material which exhibits a blue phase may be $1 \times 10^9$ Ω·cm or more, preferably $1 \times 10^{11}$ Ω·cm or more, more preferably $1 \times 10^{12}$ Ω·cm or more. Note that the resistivity in this specification is measured at 20° C.

In this embodiment, a transistor including a high-purity oxide semiconductor layer is used as a switching element of a pixel in order to utilize advantages of the liquid crystal layer including a liquid crystal material which exhibits a blue phase, e.g., high-speed response of the liquid crystal and viewing angle independence, and also to overcome a disadvantage peculiar to the liquid crystal material which exhibits a blue phase. In other words, since driving voltage of the liquid crystal material which exhibits a blue phase is much higher than that of another liquid crystal driving method, a transistor used as a switching element is required to have a high drain breakdown voltage as well as low power consumption; in this embodiment, a transistor with excellent electric characteristics of high drain breakdown voltage and significantly low off-state current is used as a switching element, whereby a highly-reliable display device with excellent image quality and low power consumption can be provided.

(Embodiment 2)

In this embodiment, an example of a display device including a liquid crystal material which exhibits a blue phase will be described. Specifically, an example of a structure of a pixel will be described.

In a liquid crystal display device which includes a liquid crystal material which exhibits a blue phase, a method can be employed in which gray scale is controlled by generating an electric field substantially parallel to a substrate surface (i.e., in a lateral direction) to move liquid crystal molecules in a plane parallel to the substrate surface (hereinafter, this method is called a horizontal electric field method). For example, by employing a structure of an electrode illustrated FIGS. 5A and 5B, a horizontal electric field display device can be provided. FIG. 5B is a cross-sectional view taken along line X1-X2 in FIG. 5A.

As illustrated in FIG. 5A, a plurality of source wirings (including the wiring 405a) are provided in parallel to each other (extended in the vertical direction in the drawing) and apart from each other. In addition, a plurality of gate wirings (including the wiring 401) are extended in a direction substantially perpendicular to the source wirings (the horizontal direction in the drawing) and provided apart from each other. Capacitor wirings 408 are adjacent to respective gate wirings and are extended in a direction substantially parallel to the gate wirings, that is, a direction substantially perpendicular to the source wirings (the horizontal direction in the drawing). Roughly rectangular space is surrounded by the source wirings, the capacitor wirings 408, and the gate wirings. In this space, the first electrode 447 and a second electrode 448 of the liquid crystal display device are provided with the liquid crystal layer 444 therebetween. The transistor 420 serving as a switch is located in the upper left corner of the drawing. In addition, the first electrodes 447 and the transistors 420 are arranged in a matrix.

As illustrated in FIG. 5B, the liquid crystal layer 444 is provided between the first substrate 441 and a second substrate 442. The first substrate 441 and the second substrate 442 are light-transmitting substrates and are respectively provided with a polarizing plate 443a and a polarizing plate 443b on their outer sides (the sides opposite from the liquid crystal layer 444). The average gap between the first substrate 441 and the second substrate 442 (hereinafter, referred to as a cell gap) may be, for example, 1 μm to 10 μm inclusive.

The transistor 420 is provided over the first substrate 441 and includes the wiring 401, the gate insulating layer 402, and the oxide semiconductor layer 403. In this embodiment, a high-purity oxide semiconductor layer is used as the oxide semiconductor layer 403. The oxide semiconductor layer 403 is electrically connected to the wirings 405a and 405b serving as a source electrode and a drain electrode. Note that although an inverted-staggered transistor is illustrated as the transistor 420 in FIG. 5B, the present invention is not limited to the structure. That is, a top-gate transistor may alternatively be used.

In addition, the first insulating film 407 is provided to cover the transistor 420 and is in contact with the oxide semiconductor layer 403. The second insulating film 409 is provided over the first insulating film 407 and the third insulating film 417 is provided over the second insulating film 409. Although the insulating film which covers the transistor have a three-layer structure in the display device illustrated in FIG. 5B, the present invention is not limited to this structure. In other words, the insulating film which covers the transistor may have a single-layer structure or a two-layer structure.

In FIG. 5B, a light-transmitting resin having a chromatic color is used as the third insulating film 417 and the third insulating film 417 serves as a coloring layer (a color filter). If the color filter is provided on the second substrate 442 (the counter substrate) side, precise alignment of the pixel region over the first substrate 441 (the element substrate) would be difficult and an image quality may be lowered. In FIG. 5B, since the third insulating film 417 is formed on the first substrate 441 side as a color filter, the pixel region and the color filter can be precisely aligned easily.

The chromatic-color light-transmitting resin may be formed using a material which transmits only light colored with a chromatic color. Specifically, a photosensitive or non-photosensitive organic resin can be used. When a photosensitive organic resin layer is used, the number of resist masks can be reduced and thus the process can be simplified.

Note that chromatic colors are colors except achromatic colors such as black, gray, and white. Specifically, the chromatic color can be red, green, or blue, for example. Further, cyan, magenta, yellow, or the like may also be used.

The thickness of the third insulating film 417 is preferably controlled as appropriate in consideration of a relationship between the concentration of the coloring material to be contained and light transmittance, in order to make the third insulating film 417 serve as a coloring layer (a color filter). Note that in the case where the third interlayer film 417 is formed of a plurality of thin films, at least one of them needs to be a light-transmitting chromatic-color resin layer so that the third insulating film 417 may serve as a color filter.

Further, in the case where the thickness of the light-transmitting chromatic-color resin layers differs depending on their chromatic colors or in the case where a light-blocking layer is provided, or in the case where the surface is uneven due to the transistor, an insulating film which transmits light in a visible wavelength range (a so-called colorless and transparent insulating layer) is preferably formed over the third insulating film 417 for planarization of the surface of the third insulating film 417. Improvement in planarization of the third insulating film 417 allows favorable coverage with the first electrode 447 and the second electrode 448 and also a uniform gap (the thickness) of the liquid crystal layer, whereby the visibility of the liquid crystal display device is increased and a higher image quality can be achieved.

Further, a light-blocking layer is preferably provided on the second substrate 442 to realize higher contrast and higher definition display. In this case, the light-blocking layer may be formed so as to overlap with the transistor 420 (at least with the semiconductor layer of the transistor) with the liquid crystal layer 444 interposed therebetween.

The light-blocking layer is formed using a material that reflects or absorbs light. For example, a black organic resin can be used. Specifically, a black organic resin which can be formed by mixing a black resin of a pigment material, carbon black, titanium black, or the like into a resin such as photosensitive or non-photosensitive polyimide can be used. Alternatively, a light-blocking metal film can be used. In this case, chromium, molybdenum, nickel, titanium, cobalt, copper, tungsten, aluminum, or the like may be used.

A first structure body 449 and a second structure body 445 are provided over the third insulating film 417 and can be referred to as projections (ribs). Note that the first structure body 449 and the second structure body 445 include comb-shaped parts which have opening patterns, bends, and branches.

The structure body can be formed using an insulating material (e.g., an organic insulating material and an inorganic insulating material) or a conductive material (e.g., an organic conductive material like a conductive resin, and an inorganic conductive material like metal). For example, a visible light curable resin, an ultraviolet curable resin, or a thermosetting resin can be used. Note that a material which transmits visible light is preferably used for the structure body to avoid a reduction in aperture ratio and in white transmittance. Specifically, an acrylic resin, an epoxy resin, an amine resin, or the like may be used. Further, the structure body may have a stack-layer structure instead of a single-layer structure.

The cross-sectional shape of the first structure body 449 and the second structure body 445 along a direction perpendicular to the main surfaces of the first substrate 441 and the second substrate 442 may be a polygon, a triangle, a trapezoid, a semicircle, or a semiellipse. In addition, the first structure body 449 and the second structure body 445 preferably have a smooth curved surface with few steps. For example, as illustrated in FIG. 5B, when the first structure body 449 and the second structure body 445 have a tapered shape with ends having a curvature, the coverage with the first electrode 447 and the second electrode 448 which are formed to cover surfaces (top surfaces and side surfaces) of the first structure body 449 and the second structure body 445 can be improved.

In addition, the height of the first structure body 449 and the second structure body 445 may be at least smaller than the average gap (the cell gap) between the first substrate 441 and the second substrate 442. Specifically, the height may be 0.1 μm or more and less than 10 μm. The structure bodies are preferably high because the higher the first structure body 449 and the second structure body 445 are, the more effectively a horizontal electric field can be applied to the liquid crystal layer 444 and the less driving voltage will be needed. Further, the width of the first structure body 449 and the second structure body 445 may be 0.5 μm to 10 μm inclusive. The first structure body 449 and the second structure body 445 may be arranged with an interval of 1 μm to 10 μm inclusive therebetween.

The method for forming the first structure body 449 and the second structure body 445 is not particularly limited, and a dry method such as an evaporation method, a sputtering method, or a CVD method or a wet method such as spin coating, dip coating, spray coating, a droplet discharge method (an ink jetting method), nanoimprinting, or various printing methods (e.g., screen printing or offset printing) may be used depending on the material. An etching step (dry etching or wet etching) may be employed to form a desired pattern, as necessary.

Further, the structure body may be acceptable as long as it projects into the liquid crystal layer from a surface of the substrate which faces the liquid crystal layer. Projections therefore may be provided by etching the third insulating film 417 partly so that the surface facing the liquid crystal layer may be rough. In this case, the third insulating film 417 includes the first projection and the second projection, whereby an additional film formation step for forming the first structure body 449 and the second structure body 445 can be omitted.

The first electrode 447 is formed to cover the first structure body 449 and is electrically connected to the transistor 420. The first electrode 447 serves as the pixel electrode. The second electrode 448 is formed to cover the second structure body 445 and serves as a common electrode. In addition, a capacitor is formed of the first electrode 447, the liquid crystal layer 444, and the capacitor wiring 408.

An image signal (an analog video signal) is input to the first electrode 447 through the wiring 405a and the transistor 420. Although the second electrode 448 can be in a floating state (an electrically isolated state), the second electrode 448 may be set to a fixed potential, preferably to a potential around a common potential (an intermediate potential of the image signal which is input to the first electrode 447) so that the potential may be in such a level that does not generate flickers.

Note that although the first electrode 447 is electrically connected to the transistor 420 through the wiring 405b in FIGS. 5A and 5B, the present invention is not limited to the structure. For example, the first electrode 447 may be directly connected to the oxide semiconductor layer 403 in the transistor 420.

The height (the thickness) of the first electrode 447 and the second electrode 448 may be at least smaller than the average gap (the cell gap) between the first substrate 441 and the second substrate 442. Specifically, the height may be 0.01 μm to 3 μm inclusive. Here, it is preferable to satisfy X=a+b, where the average gap (the cell gap) between the first substrate 441 and the second substrate 442 is X μm, the height of the first structure body 449 and the second structure body 445 is a μm, and the thickness of the first electrode 447 and the second electrode 448 is b μm. When the equation X=a+b is satisfied, the first electrode 447 and the second electrode 448 are in contact with the second substrate 442. In other words, the first structure body 449 and the second structure body 445 serve as spacers in the pixel portion. Accordingly, a columnar spacer or spherical spacer, which is generally provided in the pixel portion to keep the distance between the first substrate 441 and the second substrate 442 uniform, is not additionally needed. Thus, the number of process steps of the display device can be reduced. Note that the first electrode 447 and the second electrode 448 are arranged with an interval of 0.5 μm to 8 μm inclusive therebetween.

The first electrode 447 and the second electrode 448 are alternately arranged without overlapping with each other. In addition, the first electrode 447 and the second electrode 448 do not have plate-like shapes but have comb-shaped parts which have various opening patterns, bends, and branches.

The first electrode 447 and the second electrode 448 can be formed using a light-transmitting conductive material such as oxide containing tungsten and indium (indium oxide containing tungsten oxide), oxide containing tungsten, indium, and zinc (indium zinc oxide containing tungsten oxide), oxide containing titanium and indium (indium oxide containing titanium oxide), oxide containing titanium, indium, and tin (indium tin oxide containing titanium oxide), oxide containing indium and tin (indium tin oxide or ITO), oxide containing indium and zinc (indium zinc oxide), and oxide containing silicon, indium, and tin (indium tin oxide to which silicon oxide is added). The second electrode 448 can also be formed using one or plurality of materials selected from metal such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), copper (Cu), or silver (Ag); an alloy thereof; and nitride thereof. The second electrode 448 can also be formed using a conductive composition containing a conductive high molecule (also referred to as a conductive polymer).

Note that in FIGS. 5A and 5B, the hatching patterns of the first electrode 447 and the second electrode 448 are different from each other and the materials of them are different for a better understanding of the description, but the present invention is not limited to the structure. That is, the first electrode 447 and the second electrode 448 can be formed using the same material. Specifically, the first electrode 447 and the second electrode 448 are preferably formed using the same light-transmitting conductive material because the number of process steps can be reduced compared with the case where they are formed using different materials. Further, a light-transmitting conductive material is preferably used for forming the first electrode 447 and the second electrode 448 because an aperture ratio will be increased. Further, a light-transmitting conductive material is more preferably used for forming the wiring 405a and the wiring 405b as well as the first electrode 447 and the second electrode 448 so that the aperture ratio may be further increased.

Although FIGS. 5A and 5B illustrate a horizontal electric field display device in which the second electrode 448 provided on the first substrate 441 side serves as a common electrode, the present invention is not limited to the structure. For example, as another common electrode, a third electrode (a second common electrode) can be additionally provided on the counter substrate (the second substrate 442) side, in addition to the second electrode 448 (a first common electrode) provided on the first substrate 441 side. In the case where the third electrode is provided, the second electrode 448 on the first substrate side and the third electrode on the second substrate side are arranged to face (overlap with) each other with the liquid crystal layer 444 interposed therebetween. Further, the second electrode 448 and the third electrode are preferably set to the same potential. In addition, the second electrode 448 and the third electrode are preferably formed of the same material.

By providing the third electrode on the second substrate side, an electric field can be applied to the liquid crystal layer 444 in an oblique direction (in a direction oblique to the main surface of the first substrate 441) between the first electrode 447 and the third electrode; thus, liquid crystal molecules can be controlled more efficiently. The liquid crystal molecules in the entire liquid crystal layer 444 including the liquid crystal molecules in the thickness direction of the liquid crystal layer 444 can be thereby made to respond and the white transmittance (light transmittance in white display) can be improved. As a result, the contrast ratio, which is a ratio of the white transmittance to the black transmittance (light transmittance in black display), can also be improved.

As described above, in this embodiment, the first electrode 447 is provided so as to cover the first structure body 449 and the second electrode 448 is provided so as to cover the second structure body 445, whereby the formation area of the first electrode 447 and the second electrode 448 can be increased in the thickness direction (in a three dimensional direction) of the liquid crystal layer 444. Accordingly, when voltage is applied between the first electrode 447 and the second electrode 448, an electric field can be widely (effectively) formed between the first electrode 447 and the second electrode 448. Therefore, the driving voltage of the display device can be lowered, which leads to a reduction in power consumption. In addition, since the transistor 420 includes a high-purity oxide semiconductor layer, power consumption for displaying a still image or the like can be reduced as described in Embodiment 1.

(Embodiment 3)

In this embodiment, another example which is different from the horizontal electric field display device described in Embodiment 2 will be described.

Figure 6:
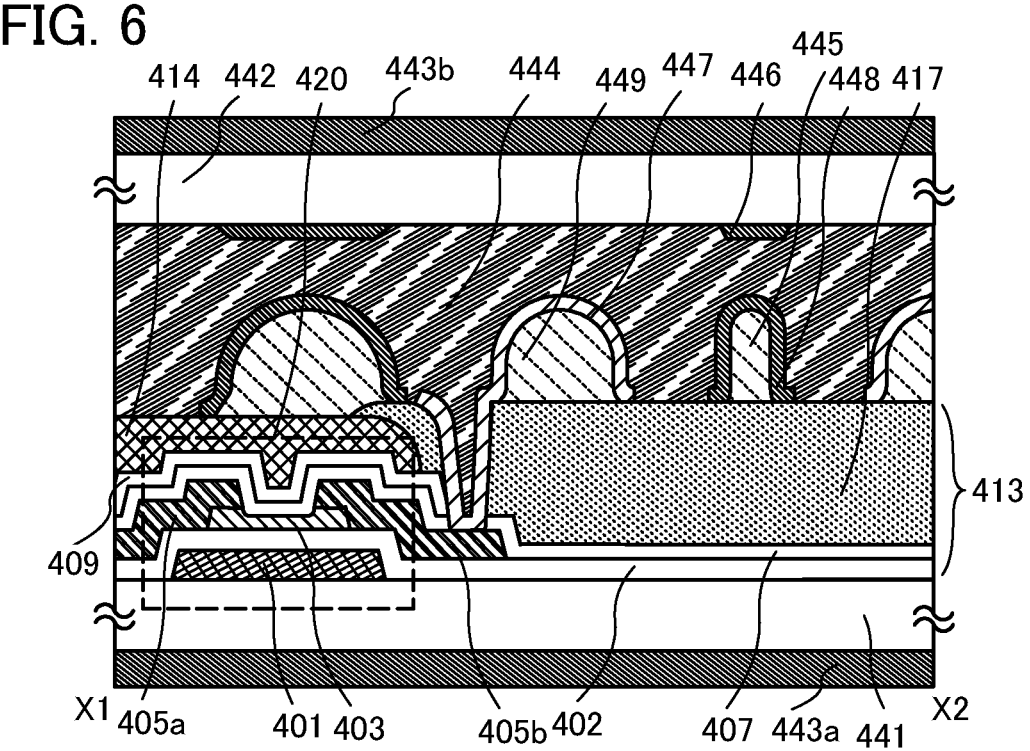
FIG. 6 is a cross-sectional view illustrating a structural example of a pixel.

Although illustrated in FIGS. 5A and 5B and described in Embodiment 2 is the horizontal electric field display device in which the second electrode 448 provided on the first substrate 441 side serves as a common electrode, the present invention is not limited to the structure. For example, as illustrated in FIG. 6, a third electrode 446 (a second common electrode) can be additionally provided on the counter substrate (the second substrate 442) side to be used as a common electrode, in addition to the second electrode 448 (a first common electrode) provided on the first substrate 441 side. In the case where the third electrode is provided, the second electrode 448 on the first substrate side and the third electrode 446 on the second substrate side are arranged to overlap with each other with the liquid crystal layer interposed therebetween. Further, the second electrode 448 and the third electrode 446 are preferably set to the same potential.

By providing the third electrode 446 on the second substrate side, an electric field can be applied to the liquid crystal layer 444 in an oblique direction (in a direction oblique to the main surface of the first substrate 441) between the first electrode 447 and the third electrode 446; thus, liquid crystal molecules can be controlled more efficiently. The liquid crystal molecules in the entire liquid crystal layer 444 including the liquid crystal molecules in the thickness direction of the liquid crystal layer 444 can be thereby made to respond and the white transmittance can be improved. As a result, the contrast ratio, which is a ratio of the white transmittance to the black transmittance (light transmittance in black display), can also be improved.

In the display device illustrated in FIG. 6, the third insulating film 417 and a light-blocking layer 414 are provided over the second insulating film 409. The light-blocking layer 414 is formed over the transistor 420 (at least in a region which covers the semiconductor layer of the transistor) with the first insulating film 407 and the second insulating film 409 interposed therebetween and serves as a light-blocking layer for the semiconductor layer. On the other hand, the third insulating film 417 is a light-transmitting chromatic-color resin layer and is formed to overlap with the first electrode 447, the second electrode 448, and the third electrode 446 and serves as a color filter. Note that in the display device illustrated in FIG. 6, part of the second electrode 448 is formed over the light-blocking layer 414 and the liquid crystal layer 444 is provided thereover.

A black organic resin is preferable as a material for the light-blocking layer 414. For example, a black organic resin which can be formed by mixing a black resin of a pigment material, carbon black, titanium black, or the like into a resin material such as photosensitive or non-photosensitive polyimide can be used. As the formation method of the light-blocking layer 414, a wet method such as spin coating, dip coating, spray coating, a droplet discharge method (e.g., an ink jetting method, screen printing, or offset printing), or the like may be used depending on the material. An etching step (dry etching or wet etching) may be employed to form a desired pattern, as necessary.

The light-blocking layer 414 can block incident light on the oxide semiconductor layer 403 of the transistor 420 without a reduction in aperture ratio of a pixel, whereby electric characteristics of the transistor 420 can be prevented from being changed and can be stabilized. Further, the light-blocking layer 414 can prevent light leakage to adjacent pixels, whereby higher contrast and higher definition display can be performed.

Note that for the components in FIG. 6 with the same reference numeral as the components in FIGS. 5A and 5B which are described in Embodiment 2, materials and formation methods similar to those for the components in FIGS. 5A and 5B can be used and thus detailed description thereof is omitted here.

(Embodiment 4)

In this embodiment, another example which is different from the horizontal electric field display device described in Embodiment 2 will be described.

Figure 7:
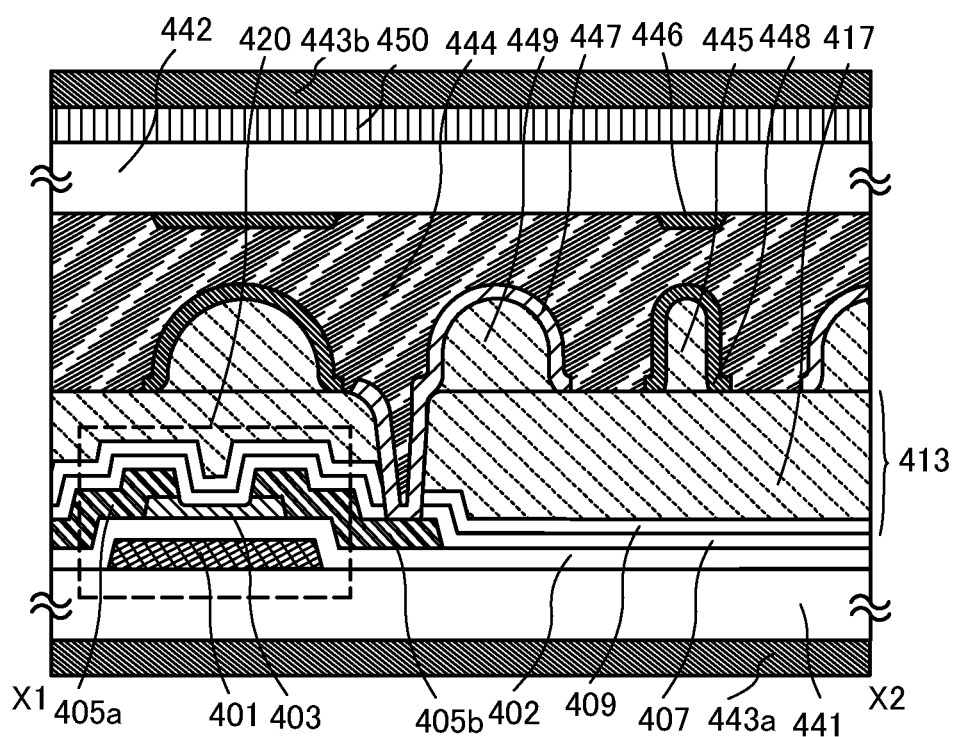
FIG. 7 is a cross-sectional view illustrating a structural example of a pixel.

Although illustrated in FIGS. 5A and 5B and described in Embodiment 2 is the horizontal electric field display device in which the third insulating film 417 is used as a color filter, the present invention is not limited to the structure. For example, as illustrated in FIG. 7, a color filter 450 can be provided between the second substrate 442 and the polarizing plate 443b. The color filter 450 may be thus provided on the outer side of the first substrate 441 or/and the second substrate 442 between which the liquid crystal layer 444 is interposed. The color filter 450 can be formed using the chromatic color light-transmitting resin described in Embodiment 2.

The third insulating film 417 does not need to serve as a color filter in FIG. 7, and is preferably formed using an insulating film which can planarize a surface. The insulating film serving as a planarization film can be formed using a heat-resistant organic material such as polyimide, acrylic, benzocyclobutene, polyamide, or epoxy. As an alternative to such organic materials, it is possible to use a low-dielectric constant material (a low-k material), a siloxane-based resin, phosphosilicate glass (PSG), borophosphosilicate glass (BPSG), or the like. Note that the third insulating film 417 may be formed by stacking a plurality of insulating films formed using any of these materials.

As in FIG. 6 described in Embodiment 3, the display device in FIG. 7 includes the third electrode 446 (the second common electrode) provided on the counter substrate (the second substrate 442) side as another common electrode, in addition to the second electrode 448 (the first common electrode) provided on the first substrate 441 side. In the case where the third electrode is provided, the second electrode 448 on the first substrate side and the third electrode 446 on the second substrate side are arranged to overlap with each other with the liquid crystal layer interposed therebetween. Further, the second electrode 448 and the third electrode 446 are preferably set to the same potential.

By providing the third electrode 446 on the second substrate side, an electric field can be applied to the liquid crystal layer 444 in an oblique direction (in a direction oblique to the main surface of the first substrate 441) between the first electrode 447 and the third electrode 446; thus, liquid crystal molecules can be controlled more efficiently. The liquid crystal molecules in the entire liquid crystal layer 444 including the liquid crystal molecules in the thickness direction of the liquid crystal layer 444 can be thereby made to respond and the white transmittance can be improved. As a result, the contrast ratio, which is a ratio of the white transmittance to the black transmittance (light transmittance in black display), can also be improved.

Note that for the components in FIG. 7 with the same reference numeral as the components in FIGS. 5A and 5B which are described in Embodiment 2, materials and formation methods similar to those for the components in FIGS. 5A and 5B can be used and thus detailed description thereof is omitted here.

(Embodiment 5)

In this embodiment, a structure which leads to a further reduction in power consumption of a display device will be described. Specifically, a structure where power consumption is reduced not only in a pixel portion of a display device, but also in a driver circuit portion of the display device will be described.

Figure 8:
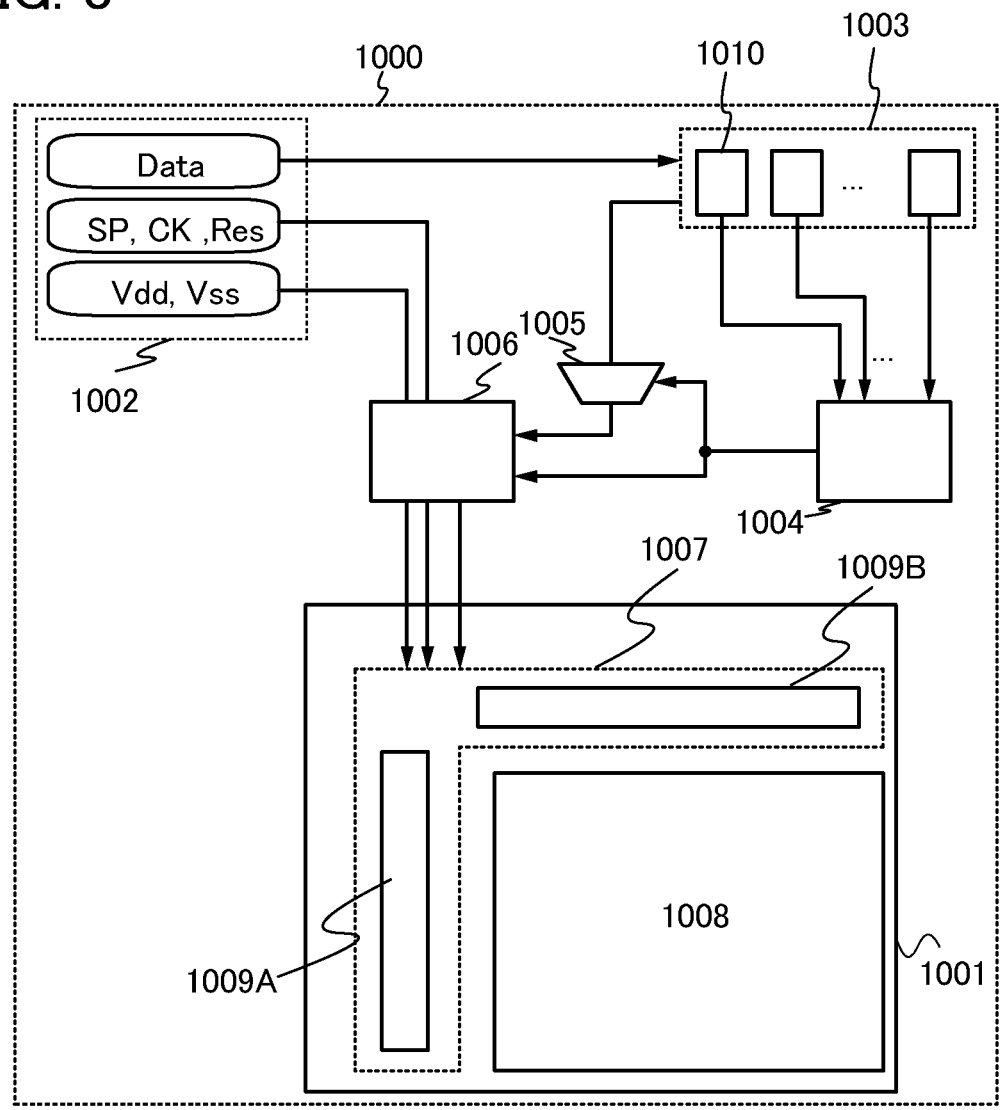
FIG. 8 is an example of a block diagram of a display device.

FIG. 8 is a block diagram illustrating an example of a display device. Note that the present invention is not limited to the structure in FIG. 8.

A display device 1000 in FIG. 8 includes a display panel 1001, a signal generation circuit 1002, a memory circuit 1003, a comparison circuit 1004, a selection circuit 1005, and a display control circuit 1006. The display panel 1001 includes a driver circuit portion 1007 and a pixel portion 1008. The driver circuit portion 1007 includes a gate line driver circuit 1009A and a signal line driver circuit 1009B. The gate line driver circuit 1009A and the signal line driver circuit 1009B have a function to drive the pixel portion 1008 including a plurality of pixels.

As a transistor included in the pixel portion 1008, the transistor described in Embodiment 1 is used. In other words, an n-channel transistor including a high-purity oxide semiconductor layer is used as a switching transistor. Note that the driver transistor may include a high-purity oxide semiconductor layer or a silicon layer. In this embodiment, an n-channel transistor including a high-purity oxide semiconductor layer is also used as a driver transistor.

In this embodiment, a switching transistor, which is one of the transistors in the pixel portion 1008, is an n-channel transistor including a high-purity oxide semiconductor layer, whereby data such as an image signal can be held in a long period of time. Therefore, the frequency of signal writing can be decreased when a still image is displayed. Accordingly, a reduction in power consumption of the display device can be achieved.

Furthermore, in this embodiment, when a still image is displayed, by operating the driver circuit portion to stop the output of signals to be supplied to all the signal lines and/or all the scan lines included in the pixel portion, power consumption of the driver circuit portion as well as the pixel portion can be reduced. In other words, the display device includes a period when supply of signals to all the signal lines and/or all the scan lines included in the pixel portion is stopped in a period when the display device displays a still image. In this embodiment, as one structure for achieving a reduction in power consumption of the driver circuit portion, the display device 1000 includes the signal generation circuit 1002, the memory circuit 1003, the comparison circuit 1004, the selection circuit 1005, and the display control circuit 1006.

The signal generation circuit 1002 has a function to generate a signal (a control signal) needed for driving the gate line driver circuit 1009A and the signal line driver circuit 1009B. In addition, the signal generation circuit 1002 has a function to output the control signal to the driver circuit portion 1007 through a wiring and to output an image signal (also referred to as video voltage, video signal, video data) to the memory circuit 1003 through a wiring. In other words, the signal generation circuit 1002 is a circuit for generating and outputting control signals for controlling the driver circuit portion 1007 and image signals to be supplied to the pixel portion.

Specifically, the signal generation circuit 1002 supplies, as the control signals, a high power supply potential Vdd and a low power supply potential Vss to the gate line driver circuit 1009A and the signal line driver circuit 1009B, a start pulse SP and a clock pulse CK for the gate line driver circuit to the gate line driver circuit 1009A, and a start pulse SP and a clock signal CK for the signal line driver circuit to the signal line driver circuit 1009B. Moreover, the signal generation circuit 1002 outputs image signal Data for displaying a moving image or a still image to the memory circuit 1003.

The moving image refers to an image which is recognized as a moving image with human eyes by rapid switching of a plurality of images which are time-divided into a plurality of frames. Specifically, a moving image refers to a series of image signals which can be recognized as a moving image with little flicker by human eyes by switching images 60 times (60 frames) or more per second. In contrast, a still image refers to image signals in which a plurality of images which are time-divided into a plurality of frames are switched at high speed, but the image signals of a still image are not different between successive frame periods, for example, between the n-th frame and (n+1)th frame, unlike the moving image.

Note that the signal generation circuit 1002 may have a function to generate other signals such as an image signal and a latch signal. The signal generation circuit 1002 may also have a function to output, to the gate line driver circuit 1009A and/or the signal line driver circuit 1009B, a reset signal Res for stopping output of a pulse signal of each driver circuit. Note that each signal may be composed of a plurality of signals such as a first clock signal and a second clock signal.

Note that a high power supply potential Vdd refers to a potential which is higher than a reference potential, and a low power supply potential refers to a potential which is lower than or equal to the reference potential. Note that both the high power supply potential and the low power supply potential are preferably set to potentials with which a transistor can operate.

Note that voltage refers to a potential difference between a given potential and a reference potential (e.g., a ground potential) in many cases. Accordingly, voltage, potential, and a potential difference can be referred to as potential, voltage, and voltage difference, respectively.

In the case where an image signal output from the signal generation circuit 1002 to the memory circuit 1003 is an analog signal, the signal may be converted into a digital signal through an A/D converter or the like to be output to the memory circuit 1003.

The memory circuit 1003 includes a plurality of frame memories 1010 for storing image signals of a plurality of frames. Note that the frame memory may be formed using a memory element such as dynamic random access memory (DRAM) or static random access memory (SRAM).

Note that the number of frame memories 1010 is not particularly limited as long as an image signal can be stored for each frame period. The image signals of the frame memories 1010 are selectively read out by the comparison circuit 1004 and the selection circuit 1005.

The comparison circuit 1004 is a circuit which selectively reads out image signals in successive frame periods stored in the memory circuit 1003, compares the image signals, and detects a difference thereof. In the case where a difference is detected by the comparison of the image signals by the comparison circuit 1004, the image is recognized as a moving image in the successive frame periods from which the difference is detected. On the other hand, in the case where a difference is not detected by the comparison of the image signals by the comparison circuit 1004, the image is recognized as a still image in the successive frame periods from which the difference is not detected. In other words, depending on the presence or absence of difference detected by the comparison circuit 1004, whether the image signals in the successive frame periods are image signals for displaying a moving image or image signals for displaying a still image is determined. Note that the difference obtained by the comparison may be set to be detected when the difference exceeds a certain level.

The selection circuit 1005 includes a plurality of switches such as transistors, and is a circuit which selects the image signals from the frame memories 1010 in which the image signals are stored, and outputs the image signals to the display control circuit 1006 when it is determined that the image signals are those for displaying a moving image by the difference detection in the comparison circuit 1004. Note that in the case where a difference of image signals between frames compared by the comparison circuit is not detected, an image displayed in the successive frame periods is a still image. In that case, image signal of the latter of the successive frame periods is not output to the display control circuit 1006.

The display control circuit 1006 is a circuit which switches between supply and stop of the image signal and the control signals such as the high power supply potential Vdd, the low power supply potential Vss, the start pulse SP, the clock pulse CK, and the reset signal Res to the driver circuit portion 1007. Specifically, when it is determined that an image to be displayed is a moving image by the comparison circuit 1004, that is, a difference between image signals in successive frame periods is detected, the image signals are supplied from the selection circuit 1005 to the display control circuit 1006. Then, the image signals are supplied to the driver circuit portion 1007 through the display control circuit 1006. In addition, the control signals are supplied to the driver circuit portion 1007 through the display control circuit 1006. On the other hand, when it is determined that an image to be displayed is a still image by the comparison circuit 1004, that is, a difference between image signals in successive frame periods is not detected, the image signal of the latter of the successive frame periods is not supplied from the selection circuit 1005; thus, the image signal of latter of the successive frame periods is not supplied to the driver circuit portion 1007 through the display control circuit 1006, and the display control circuit 1006 stops supplying the control signals to the driver circuit portion 1007.

Note that in the case where it is determined that the image to be displayed is a still image, when the period during which the image is displayed is short, supply of the high power supply potential Vdd and the low power supply potential Vss among the control signals is not necessarily stopped. In this case, an increase of the power consumption due to frequent stop and start of supply of the high power supply potential Vdd and the low power supply potential Vss can be reduced, which is preferable.

It is preferable that the supply of the image signals and the control signals is stopped during a period in which the image signal can be held in each pixel in the pixel portion 1008, and the display control circuit 1006 may have a structure which can again supply the image signals and the control signals which the display control circuit 1006 supplies before, so that the image signals are supplied again after the holding period of each pixel.

The supply of a signal refers to supply of a predetermined potential to a wiring. The stop of supply of a signal refers to stop of supply of the predetermined potential to the wiring, and electrical connection to a wiring to which a predetermined fixed potential is supplied, for example, a wiring to which the low power supply potential Vss is supplied. The stop of supply of a signal also refers to cut of an electrical connection to a wiring to which a predetermined potential is supplied and to bring the wiring into a floating state.

In this manner, image signals are compared to determine whether an image thereof is a moving image or a still image, and supply or stop of control signals such as a clock signal or a start pulse is selected, whereby power consumption of the driver circuit portion 1007 can be reduced.

Next, an example of a structure of a shift register included in each of the gate line driver circuit 1009A and the signal line driver circuit 1009B of the driver circuit portion 1007 will be described with reference to FIGS. 9A to 9C.

Figure 9A:
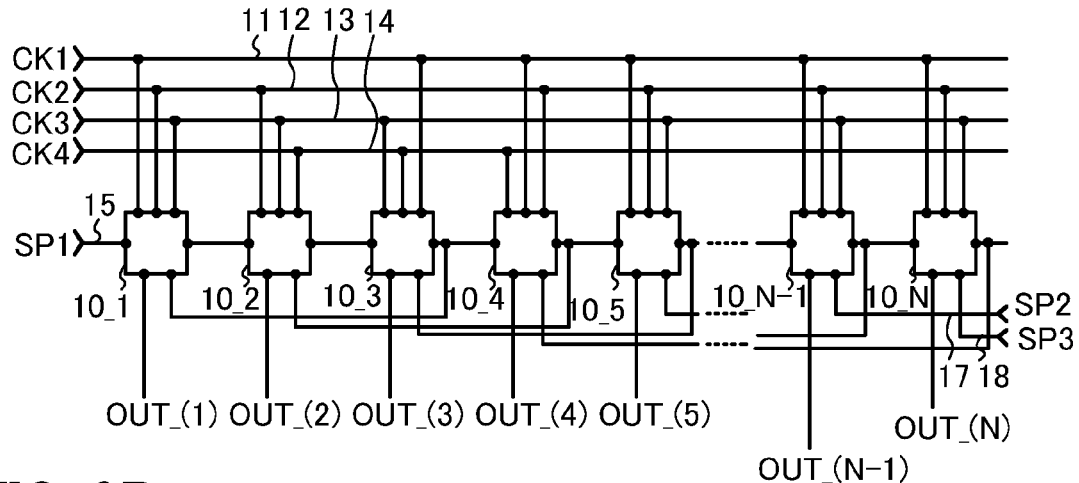
FIGS. 9A to 9C illustrate an example of a driver circuit.

The shift register illustrated in FIG. 9A includes a first to Nth pulse output circuits 10_1 to 10_N (N is a natural number of 3 or more). In the shift register illustrated in FIG. 9A, a first clock signal CK1, a second clock signal CK2, a third clock signal CK3, and a fourth clock signal CK4 are supplied from a first wiring 11, a second wiring 12, a third wiring 13, and a fourth wiring 14, respectively, to the first to Nth pulse output circuits 10_1 to 10_N. A start pulse SP1 (a first start pulse) is input from a fifth wiring 15 to the first pulse output circuit 10_1. To the nth pulse output circuit 10_n of the second or subsequent stage (n is a natural number of 2 or more and N or less), a signal from the pulse output circuit of the preceding stage (such a signal is referred to as a preceding-stage signal OUT (n−1)) is input. To the first pulse output circuit 10_1, a signal from the third pulse output circuit 10_3 of the stage following the next stage is input. Similarly, to the nth pulse output circuit 10_n of the second or subsequent stage, a signal from the (n+2)th pulse output circuit 10_(n+2) of the stage following the next stage (such a signal is referred to as a subsequent-stage signal OUT(n+2)) is input. Therefore, the pulse output circuits of the respective stages output first output signals (OUT(1)(SR) to OUT(N)(SR)) to be input to the pulse output circuit of the subsequent stage and/or the pulse output circuit of the stage before the preceding stage, and second output signals (OUT(1) to OUT(N)) to be input to another wiring or the like. Note that since the subsequent-stage signal OUT(n+2) is not input to the last two stages of the shift register as illustrated in FIG. 9A, a second start pulse SP2 and a third start pulse SP3 may be input from a seventh wiring 17 and an eighth wiring 18, respectively, to the pulse output circuits of the last two stages, for example. Alternatively, a signal which is additionally generated in the shift register may be used. For example, a structure may be employed in which a (N+1)th pulse output circuit 10_(N+1) and a (N+2)th pulse output circuit 10_(N+2) which do not contribute to pulse output to the display portion (such circuits are also referred to as dummy stages) may be provided so that signals corresponding to the second start pulse (SP2) and the third start pulse (SP3) are generated in the dummy stages.

Note that the first to the fourth clock signals (CK1) to (CK4) are signals that alternate between an H level and an L level at regular intervals as illustrated in FIG. 10. The first clock signal (CK1) to the fourth clock signal (CK4) are delayed by ¼ cycle sequentially. In this embodiment, driving of the pulse output circuit or the like is controlled with the first to fourth clock signals (CK1) to (CK4). Note that the clock signal CK may be referred to as GCK or SCK in some cases depending on a driver circuit to which the clock signal is input, but the clock signal is referred to as CK here.

Figure 9B:
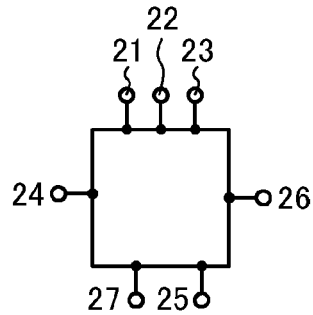

Each of the first to Nth pulse output circuits 10_1 to 10_N includes a first input terminal 21, a second input terminal 22, a third input terminal 23, a fourth input terminal 24, a fifth input terminal 25, a first output terminal 26, and a second output terminal 27 (see FIG. 9B).

The first input terminal 21, the second input terminal 22, and the third input terminal 23 are electrically connected to any of the first to fourth wirings 11 to 14. For example, in the first pulse output circuit 10_1 in FIGS. 9A and 9B, the first input terminal 21 is electrically connected to the first wiring 11, the second input terminal 22 is electrically connected to the second wiring 12, and the third input terminal 23 is electrically connected to the third wiring 13. In the second pulse output circuit 10_2, the first input terminal 21 is electrically connected to the second wiring 12, the second input terminal 22 is electrically connected to the third wiring 13, and the third input terminal 23 is electrically connected to the fourth wiring 14.

In FIGS. 9A and 9B, in the first pulse output circuit 10_1, the start pulse is input to the fourth input terminal 24, a subsequent-stage signal OUT(3) is input to the fifth input terminal 25, the first output signal OUT(1)(SR) is output from the first output terminal 26, and the second output signal OUT(1) is output from the second output terminal 27.

Next, an example of a specific circuit configuration of the pulse output circuit will be described with reference to FIG. 9C.

Figure 9C:
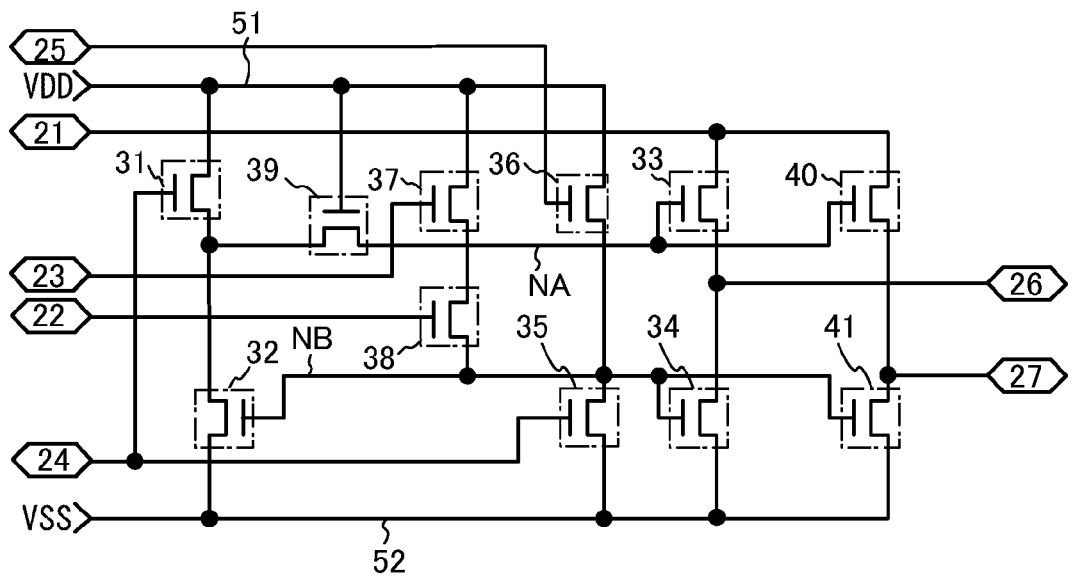

In FIG. 9C, a first terminal of a first transistor 31 is electrically connected to a power supply line 51, a second terminal of the first transistor 31 is electrically connected to a first terminal of a ninth transistor 39, and a gate of the first transistor 31 is electrically connected to the fourth input terminal 24. A first terminal of a second transistor 32 is electrically connected to a power supply line 52, a second terminal of the second transistor 32 is electrically connected to the first terminal of the ninth transistor 39, and a gate of the second transistor 32 is electrically connected to a gate of a fourth transistor 34. A first terminal of a third transistor 33 is electrically connected to the first input terminal 21, and a second terminal of the third transistor 33 is electrically connected to the first output terminal 26. A first terminal of the fourth transistor 34 is electrically connected to the power supply line 52, and a second terminal of the fourth transistor 34 is electrically connected to the first output terminal 26. A first terminal of a fifth transistor 35 is electrically connected to the power supply line 52, a second terminal of the fifth transistor 35 is electrically connected to the gate of the second transistor 32 and the gate of the fourth transistor 34, and a gate of the fifth transistor 35 is electrically connected to the fourth input terminal 24. A first terminal of a sixth transistor 36 is electrically connected to the power supply line 51, a second terminal of the sixth transistor 36 is electrically connected to the gate of the second transistor 32 and the gate of the fourth transistor 34, and a gate of the sixth transistor 36 is electrically connected to the fifth input terminal 25. A first terminal of a seventh transistor 37 is electrically connected to the power supply line 51, a second terminal of the seventh transistor 37 is electrically connected to a second terminal of an eighth transistor 38, and a gate of the seventh transistor 37 is electrically connected to the third input terminal 23. A first terminal of the eighth transistor 38 is electrically connected to the gate of the second transistor 32 and the gate of the fourth transistor 34, and a gate of the eighth transistor 38 is electrically connected to the second input terminal 22. The first terminal of the ninth transistor 39 is electrically connected to the second terminal of the first transistor 31 and the second terminal of the second transistor 32, a second terminal of the ninth transistor 39 is electrically connected to a gate of the third transistor 33 and a gate of a tenth transistor 40, and a gate of the ninth transistor 39 is electrically connected to the power supply line 51. A first terminal of the tenth transistor 40 is electrically connected to the first input terminal 21, a second terminal of the tenth transistor 40 is electrically connected to the second output terminal 27, and the gate of the tenth transistor 40 is electrically connected to the second terminal of the ninth transistor 39. A first terminal of an eleventh transistor 41 is electrically connected to the power supply line 52, a second terminal of the eleventh transistor 41 is electrically connected to the second output terminal 27, and a gate of the eleventh transistor 41 is electrically connected to the gate of the second transistor 32 and the gate of the fourth transistor 34.

In FIG. 9C, a connection point where the gate of the third transistor 33, the gate of the tenth transistor 40, and the second terminal of the ninth transistor 39 are connected is referred to as a node NA. A connection point where the gate of the second transistor 32, the gate of the fourth transistor 34, the second terminal of the fifth transistor 35, the second terminal of the sixth transistor 36, the first terminal of the eighth transistor 38, and the gate of the eleventh transistor 41 are connected is referred to as a node NB.

In the case where the pulse output circuit in FIG. 9C is the first pulse output circuit 10_1, the first clock signal CK1 is input to the first input terminal 21, the second clock signal CK2 is input to the second input terminal 22, the third clock signal CK3 is input to the third input terminal 23, the start pulse SP1 is input to the fourth input terminal 24, a subsequent-stage signal OUT(3) is input to the fifth input terminal 25, the OUT(1)(SR) is output from the first output terminal 26, and the OUT(1) is output from the second output terminal 27.

FIG. 10 is a timing diagram of a shift register including a plurality of pulse output circuits illustrated in FIG. 9C. Note that when the shift register is a scan line driver circuit, a period 61 in FIG. 10 corresponds to a vertical retrace period and a period 62 corresponds to a gate selection period.

The process of supply and stop of potentials of wirings in the driver circuit including a plurality of n-channel transistors illustrated as an example in FIGS. 9A to 9C, in the case where a still image and a moving image are displayed, is described below.

Figure 12A:
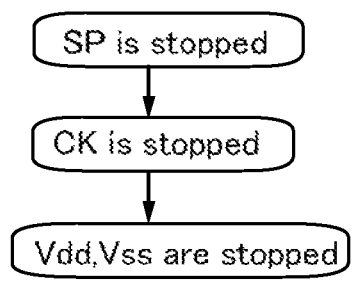
FIGS. 12A to 12D illustrate examples of a process for supplying and stopping signals supplied to a driver circuit.
Figure 12B:
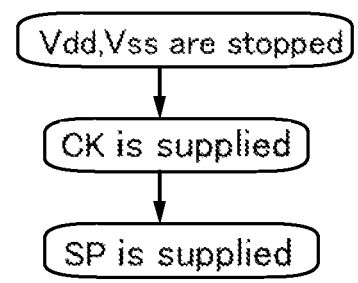

First, to stop operation of the driver circuit portion 1007, supply of the start pulse SP is stopped by the display control circuit 1006. After the supply of the start pulse SP is stopped, pulse output reaches the last stage of the shift register, and then supply of the each clock signal CK is stopped. Next, supply of the high power supply potential Vdd and the low power supply potential Vss of the power supply voltage is stopped (see FIG. 12A). To start the operation of the driver circuit portion 1007 again, first, the display control circuit 1006 supplies the high power supply potential Vdd and the low power supply potential Vss of the power supply voltage to the driver circuit portion 1007. Then, each of the clock signals CK is supplied, and then, supply of the start pulse SP is started again (see FIG. 12B).

In the description of FIGS. 9A to 9C, the reset signal Res is not supplied to the driver circuit. A structure in which the reset signal Res is supplied will be described with reference to FIGS. 11A to 11 C.

Figure 11A:
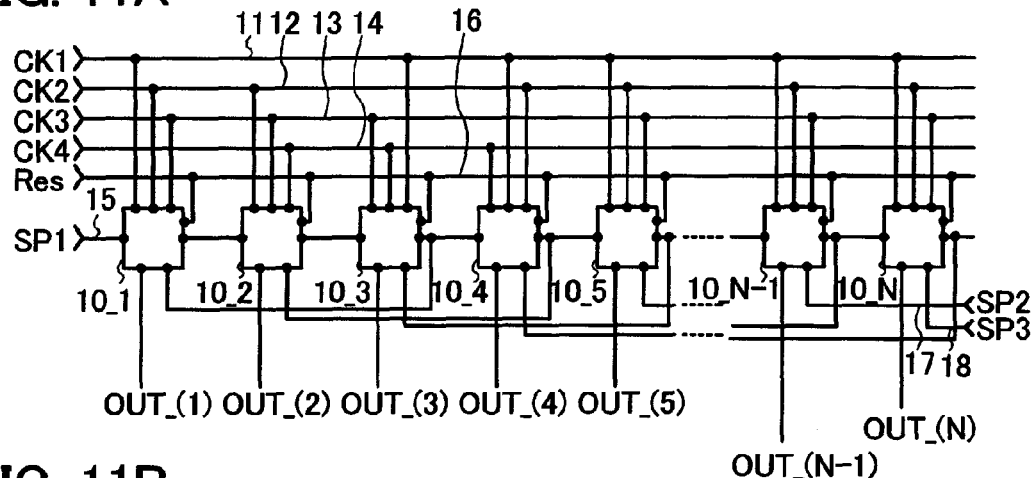
FIGS. 11A to 11C illustrate an example of a driver circuit.

The shift register illustrated in FIG. 11A includes a first to Nth pulse output circuits 10_1 to 10_N (N is a natural number of 3 or more). In the shift register illustrated in FIG. 11A, a first clock signal CK1, a second clock signal CK2, a third clock signal CK3, and a fourth clock signal CK4 are supplied from a first wiring 11, a second wiring 12, a third wiring 13, and a fourth wiring 14, respectively, to the first to Nth pulse output circuits 10_1 to 10_N. A start pulse SP1 (a first start pulse) is input from a fifth wiring 15 to the first pulse output circuit 10_1. To the nth pulse output circuit 10_n of the second or subsequent stage (n is a natural number of 2 or more and N or less), a signal from the pulse output circuit of the preceding stage (such a signal is referred to as a preceding-stage signal OUT(n−1)) is input. To the first pulse output circuit 10_1, a signal from the third pulse output circuit 10_3 of the stage following the next stage is input. Similarly, to the nth pulse output circuit 10_n of the second or subsequent stage, a signal from the (n+2)th pulse output circuit 10_(*n*+2) of the stage following the next stage (such a signal is referred to as a subsequent-stage signal OUT(n+2)) is input. Therefore, the pulse output circuits of the respective stages output first output signals (OUT(1)(SR) to OUT(N)(SR)) to be input to the pulse output circuit of the subsequent stage and/or the pulse output circuit of the stage before the preceding stage, and second output signals (OUT(1) to OUT(N)) to be input to another wiring or the like. To the pulse output circuit in each stage, a reset signal Res is supplied from a sixth wiring 16.

Figure 11B:
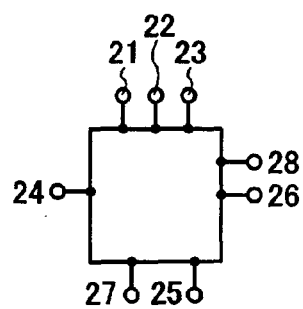
Figure 11C:
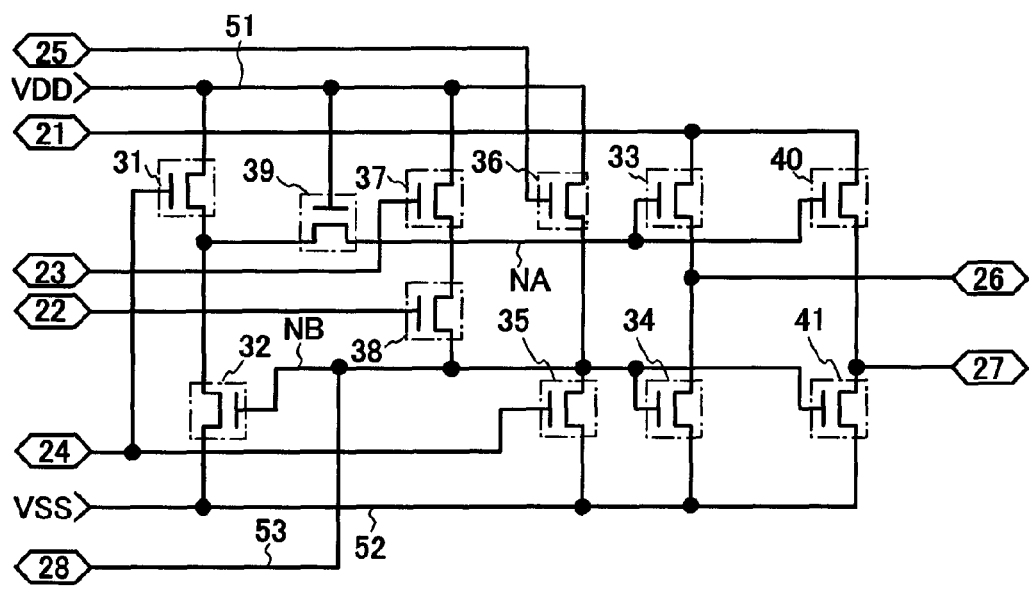

The pulse output circuit illustrated in FIGS. 11A to 11C is different from the pulse output circuit illustrated in FIGS. 9A to 9C in that the sixth wiring 16 for supplying the reset signal Res is provided; the other portions are similar to those described with reference to FIGS. 9A to 9C.

Each of the first to Nth pulse output circuits 10_1 to 10_N includes the first input terminal 21, the second input terminal 22, the third input terminal 23, a fourth input terminal 24, a fifth input terminal 25, a first output terminal 26, a second output terminal 27, and a sixth input terminal 28 (see FIG. 11B).

The first input terminal 21, the second input terminal 22, and the third input terminal 23 are electrically connected to any of the first to fourth wirings 11 to 14. For example, in the first pulse output circuit 10_1 in FIGS. 11A and 11B, the first input terminal 21 is electrically connected to the first wiring 11, the second input terminal 22 is electrically connected to the second wiring 12, and the third input terminal 23 is electrically connected to the third wiring 13. In the second pulse output circuit 10_2, the first input terminal 21 is electrically connected to the second wiring 12, the second input terminal 22 is electrically connected to the third wiring 13, and the third input terminal 23 is electrically connected to the fourth wiring 14.

In FIGS. 11A and 11B, in the first pulse output circuit 10_1, the start pulse is input to the fourth input terminal 24, a subsequent-stage signal OUT(3) is input to the fifth input terminal 25, the first output signal OUT(1)(SR) is output from the first output terminal 26, the second output signal OUT(1) is output from the second output terminal 27, and the reset signal Res is input from the sixth input terminal 28.

Next, an example of a specific circuit configuration of the pulse output circuit will be described with reference to FIG. 11C.

In FIG. 11C, the first terminal of the first transistor 31 is electrically connected to the power supply line 51, the second terminal of the first transistor 31 is electrically connected to the first terminal of the ninth transistor 39, and the gate of the first transistor 31 is electrically connected to the fourth input terminal 24. The first terminal of the second transistor 32 is electrically connected to the power supply line 52, the second terminal of the second transistor 32 is electrically connected to the first terminal of the ninth transistor 39, and the gate of the second transistor 32 is electrically connected to the gate of the fourth transistor 34. The first terminal of the third transistor 33 is electrically connected to the first input terminal 21, and the second terminal of the third transistor 33 is electrically connected to the first output terminal 26. The first terminal of the fourth transistor 34 is electrically connected to the power supply line 52, and the second terminal of the fourth transistor 34 is electrically connected to the first output terminal 26. The first terminal of the fifth transistor 35 is electrically connected to the power supply line 52, the second terminal of the fifth transistor 35 is electrically connected to the gate of the second transistor 32 and the gate of the fourth transistor 34, and the gate of the fifth transistor 35 is electrically connected to the fourth input terminal 24. The first terminal of the sixth transistor 36 is electrically connected to the power supply line 51, the second terminal of the sixth transistor 36 is electrically connected to the gate of the second transistor 32 and the gate of the fourth transistor 34, and the gate of the sixth transistor 36 is electrically connected to the fifth input terminal 25. The first terminal of the seventh transistor 37 is electrically connected to the power supply line 51, the second terminal of the seventh transistor 37 is electrically connected to the second terminal of the eighth transistor 38, and the gate of the seventh transistor 37 is electrically connected to the third input terminal 23. The first terminal of the eighth transistor 38 is electrically connected to the gate of the second transistor 32 and the gate of the fourth transistor 34, and the gate of the eighth transistor 38 is electrically connected to the second input terminal 22. The first terminal of the ninth transistor 39 is electrically connected to the second terminal of the first transistor 31 and the second terminal of the second transistor 32, the second terminal of the ninth transistor 39 is electrically connected to the gate of the third transistor 33 and the gate of the tenth transistor 40, and the gate of the ninth transistor 39 is electrically connected to the power supply line 51. The first terminal of the tenth transistor 40 is electrically connected to the first input terminal 21, the second terminal of the tenth transistor 40 is electrically connected to the second output terminal 27, and the gate of the tenth transistor 40 is electrically connected to the second terminal of the ninth transistor 39. The first terminal of the eleventh transistor 41 is electrically connected to the power supply line 52, the second terminal of the eleventh transistor 41 is electrically connected to the second output terminal 27, and the gate of the eleventh transistor 41 is electrically connected to the gate of the second transistor 32 and the gate of the fourth transistor 34. The gate of the second transistor 32, the gate of the fourth transistor 34, the second terminal of the fifth transistor 35, the second terminal of the sixth transistor 36, the first terminal of the eighth transistor 38, and the gate of the eleventh transistor 41 are electrically connected to a wiring 53 for supplying the reset signal Res. The reset signal Res is a signal which supplies a high power supply potential level to the gate of the second transistor 32, the gate of the fourth transistor 34, the second terminal of the fifth transistor 35, the second terminal of the sixth transistor 36, the first terminal of the eighth transistor 38, and the gate of the eleventh transistor 41, and thereby reducing the output from the pulse output circuit to a signal at a low power supply potential level.

In FIG. 11C, a connection point where the gate of the third transistor 33, the gate of the tenth transistor 40, and the second terminal of the ninth transistor 39 are connected is referred to as a node NA. A connection point where the gate of the second transistor 32, the gate of the fourth transistor 34, the second terminal of the fifth transistor 35, the second terminal of the sixth transistor 36, the first terminal of the eighth transistor 38, and the gate of the eleventh transistor 41 are connected is referred to as a node NB.

In the case where the pulse output circuit in FIG. 11C is the first pulse output circuit 10_1, the first clock signal CK1 is input to the first input terminal 21, the second clock signal CK2 is input to the second input terminal 22, the third clock signal CK3 is input to the third input terminal 23, the start pulse SP is input to the fourth input terminal 24, a subsequent-stage signal OUT(3) is input to the fifth input terminal 25, the OUT(1)(SR) is output from the first output terminal 26, the OUT(1) is output from the second output terminal 27, and the reset signal Res is input to the sixth input terminal 28.

Note that the timing diagram of the shift register including a plurality of pulse output circuits illustrated in FIG. 11C is similar to that illustrated in FIG. 10.

The process of supply and stop of potentials of wirings in the driver circuit including a plurality of n-channel transistors illustrated as an example in FIGS. 11A to 11C, in the case where a still image and a moving image are displayed, is described below.

Figure 12C:
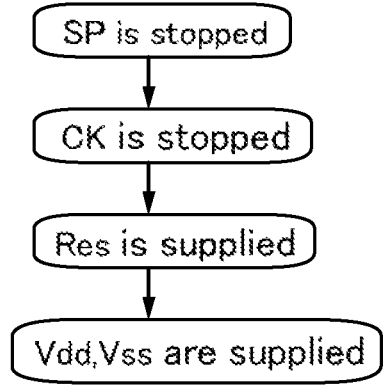
Figure 12D:
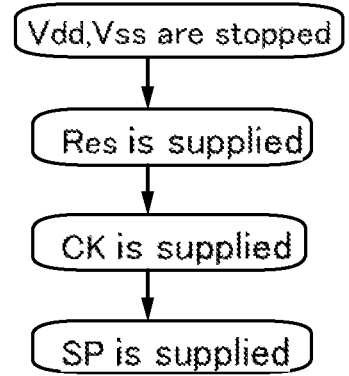

First, to stop operation of the driver circuit portion 1007, supply of the start pulse SP is stopped by the display control circuit 1006. After the supply of the start pulse SP is stopped, pulse output reaches the last stage of the shift register, and then supply of the each clock signal CK is stopped. Next, the reset signal Res is supplied. Next, supply of the high power supply potential Vdd and the low power supply potential Vss of the power supply voltage is stopped (see FIG. 12C). To start the operation of the driver circuit portion 1007 again, first, the display control circuit 1006 supplies the high power supply potential Vdd and the low power supply potential Vss of the power supply voltage to the driver circuit portion 1007. Next, the reset signal Res is supplied. Then, each of the clock signals CK is supplied, and then, supply of the start pulse SP is started again (see FIG. 12D).

The structure illustrated in FIGS. 11A to 11C in which the reset signal is supplied in addition to the structure illustrated in FIGS. 9A to 9C is preferable because malfunction due to signal delay at the time of switching between a still image and a moving image or the like can be reduced.

As described above, by providing a transistor including a high-purity oxide semiconductor in each pixel, a period in which a storage capacitor can hold voltage can be longer than that in a conventional case, and power consumption for displaying a still image or the like can be reduced. Furthermore, when a still image is displayed, by operating the driver circuit portion to stop the output of a signal to be supplied to all the signal lines and/or all the scan lines in the pixel portion, power consumption of the driver circuit portion as well as the pixel portion can be reduced.

(Embodiment 6)

In this embodiment, an example of a display device including a liquid crystal material which exhibits a blue phase will be described. Specifically, an example of a structure of a pixel will be described.

Figure 26:
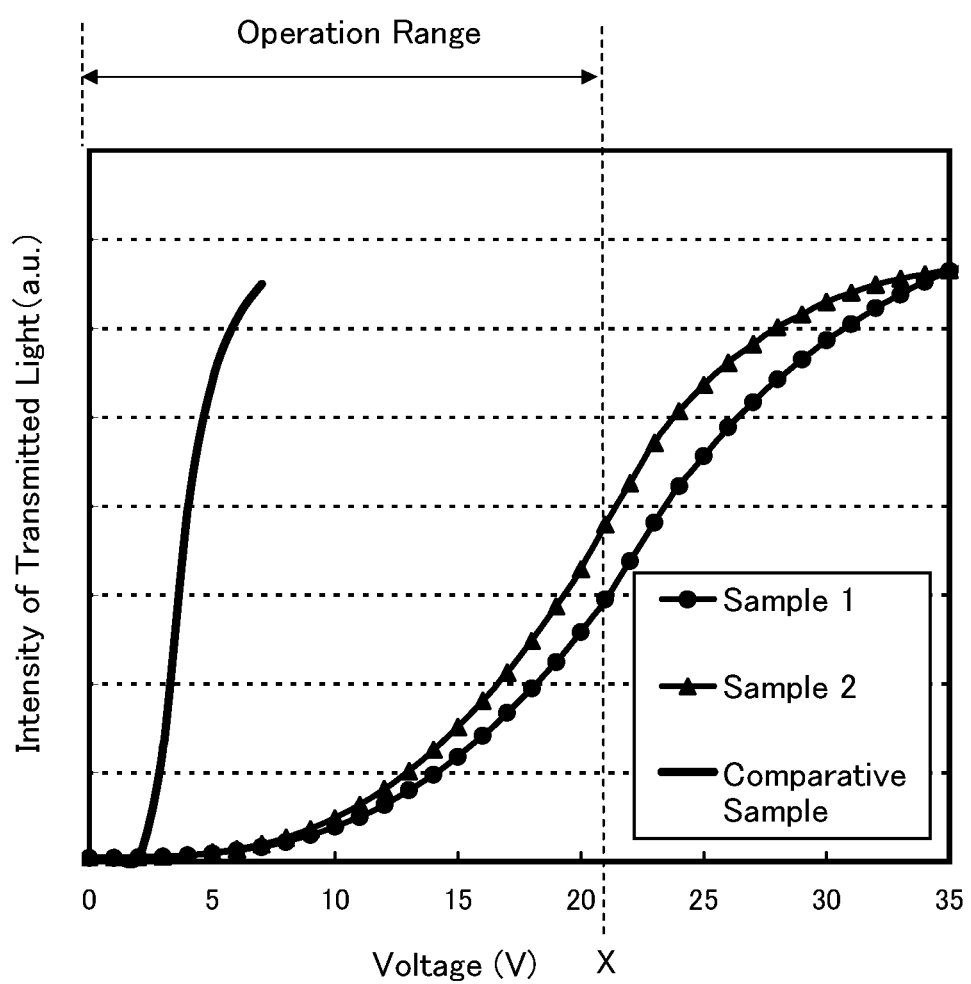
FIG. 26 is a graph showing a light transmittance characteristic of a liquid crystal material which exhibits a blue phase in accordance with voltage.

First, a light transmittance characteristic of a liquid crystal material which exhibits a blue phase in accordance with voltage will be described with reference to FIG. 26. In FIG. 26, the horizontal axis represents application voltage, which corresponds to a potential difference between a pixel electrode and a common electrode. Here, the common electrode was connected to a GND line (a ground line) and the pixel electrode was supplied with voltage. The vertical axis represents intensity of transmitted light which is the measured intensity of light emitted from a light source and passed through samples.

Three samples, Comparative Sample, Sample 1, and Sample 2 were used. Sample 1 and Sample 2 include a liquid crystal material which exhibits a blue phase, whereas Comparative Sample includes conventional PVA liquid crystal. Sample 1 has a structure where, on the first substrate side, a pixel electrode is provided to cover a first structure body and a common electrode is provided to cover a second structure body (see FIGS. 5A and 5B). Sample 2 has a structure where, on the first substrate side, a pixel electrode is provided to cover a first structure body and a first common electrode is provided to cover a second structure body; and on the second substrate (the counter substrate) side, the second common electrode is provided to face the first common electrode (see FIG. 6). Note that the first common electrode and the second common electrode are both connected to a GND line (a ground line) and have the same potential.

As shown in FIG. 26, the line of Comparative Sample of conventional PVA liquid crystal has a threshold voltage and does not pass through the origin. On the other hand, as shown by the lines of Samples 1 and 2 in FIG. 26, the lines of a liquid crystal material which exhibits a blue phase do not have a threshold voltage and pass through the origin. In addition, the lines of a liquid crystal material which exhibits a blue phase have a region where the lines are concave up. Therefore, to take advantage of the characteristic of a liquid crystal material which exhibits a blue phase, a display device may be set so that it may display grayscale within the range where the lines are concave up, and thus gamma correction can be automatically performed. For example, in the case of Samples 1 and 2 in FIG. 26, the display device may be set so as to operate within the range from 0 volts to X volts. Note that in the case where grayscale with extremely high luminance is to be displayed, the display device may be operated by application of voltage of X volts or more. When grayscale is displayed within the range where the lines are concave up, a gamma correction circuit is not needed in the display device, whereby an inexpensive display device can be provided. If the display device is not provided with the gamma correction circuit, the grayscale signals input to the pixels have the same voltage difference between grayscale levels or the bit number of output signals from a digital-to-analog converter (hereinafter, referred to as a DAC) and that of signals input to the pixel are the same.

For example, a structure can be employed where, as illustrated in FIG. 3, a video signal is input to a signal line driver circuit 1241 (a source driver) and then to a DAC 1242 to be converted into an analog signal, and the analog signal is output to a pixel portion 1243 without gamma correction. Note that although the DAC 1242 is provided as part of the signal line driver circuit 1241 in FIG. 3, the present invention is not limited thereto. Further, in the case where video signals for television are input to the signal line driver circuit 1241, the video signals for television may be subjected to inverse gamma correction and then input to the DAC 1242 to be converted into analog signals which can be output to the pixel portion 1243 without gamma correction.

Further, since the gamma correction circuit is not required, a capacitor digital-to-analog converter (hereinafter, referred to as a C-DAC) can be used whereas a display device which requires the gamma correction circuit has to have a resistor digital-to-analog converter as a DAC. A resistor digital-to-analog converter (hereinafter, referred to as an R-DAC) performs gamma correction using series-connected resistors having different resistance values, and thus current is kept supplied to the resistors and power consumption is high. In addition, many resistors are needed for multi-grayscale display and the size of the DAC increases. On the other hand, current is not kept supplied in the C-DAC whereby power consumption can be suppressed. In addition, in the case of multi-grayscale display, the C-DAC is difficult to output voltage other than linear voltage. The liquid crystal material which exhibits a blue phase linearly changes its liquid crystal capacity in accordance with voltage. Thus, when a liquid crystal material which exhibits a blue phase is used as a liquid crystal layer, a C-DAC can be employed.

Figure 27A:
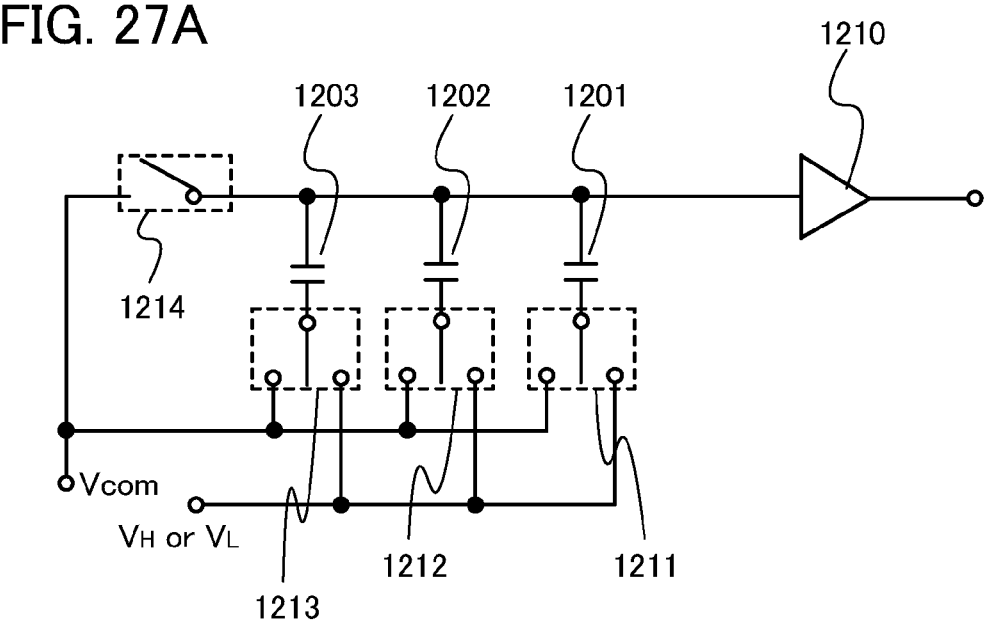
FIGS. 27A and 27B illustrate structural examples of a circuit of a capacitor digital-to-analog converter.

A C-DAC can have various circuit structures. For example, a C-DAC having a structure illustrated in FIG. 27A can be used. The C-DAC in FIG. 27A is a 3-bit circuit and includes first to fourth switches 1211 to 1214, first to third capacitors 1201 to 1203, and an amplifier 1210. The ratio of capacitance of the first capacitor 1201: the second capacitor 1202: the third capacitor 1203 is 1:2:4. Note that the bit number of the C-DAC is not limited to three and the number of switches and capacitors may be changed as appropriate in accordance with the bit number.

The operation of the C-DAC includes the following three steps. In the first step, the first to fourth switches 1211 to 1214 make all the capacitors (the first to third capacitors 1201 to 1203) electrically connected to a common potential Vcom to discharge the capacitors. In the second step, the fourth switch 1214 is brought into a non-conductive state (an off state). In the third step, a digital signal (a video signal) makes a predetermined switch out of the first to third switches 1211 to 1213 be electrically connected to a first wiring. Note that in the case where signals are output to pixels using one C-DAC, the first wiring is supplied with a potential $V_H$ when the signal is positive and a potential $V_L$ when the signal is negative. In the case where signals are output to pixels using two C-DACs, the first wiring of one of the C-DACs is supplied with a potential $V_H$ and the first wiring of the other C-DACs is supplied with a potential $V_L$. In such a manner, digital signals input to the C-DAC can be converted into analog signals and output therefrom. When an analog signal for three grayscale levels is to be output, for example, only the second switch 1212 out of the first to third switches 1211 to 1213 may be made electrically connected to the first wiring in the third step. When an analog signal for one grayscale level is to be output, all the second to fourth switches (1212 to 1214) may be made electrically connected to the common potential Vcom in the third step.

Figure 27B:
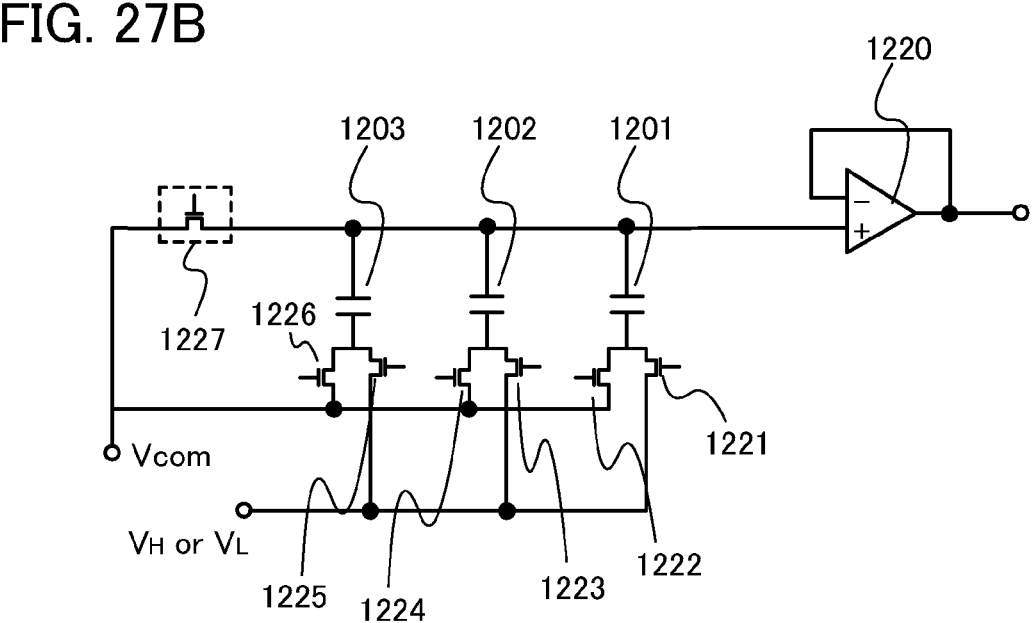

Various elements can be employed as the first to fourth switches 1211 to 1214. For example, transistors which operate in the linear region can be used. For example, as illustrated in FIG. 27B, the first switch 1211 can be composed of a first transistor 1221 and a second transistor 1222, the second switch 1212 can be composed of a third transistor 1223 and a fourth transistor 1224, the third switch 1213 can be composed of a fifth transistor 1225 and a sixth transistor 1226, and the fourth switch 1214 can be composed of a seventh transistor 1227. In addition, in FIG. 27B, an operational amplifier 1220 is used as the amplifier.

In this embodiment, as the first to seventh transistors 1221 to 1227, the transistor including a high-purity oxide semiconductor described in Embodiment 1 is used. In this case, a capacitor with extremely low charge leakage can be provided, whereby the sizes of the first to third capacitors 1201 to 1203 can be small. Therefore, compared to the conventional display device, the grayscale levels can be increased when the DAC is formed in the area with the same size.

(Embodiment 7)

In this embodiment, a structural example of the transistor 6401 described in Embodiment 1 and an example of a manufacturing method thereof will be described. In other words, a structural example of a transistor including a high-purity oxide semiconductor and an example of a manufacturing method thereof will be described.

Figure 13A:
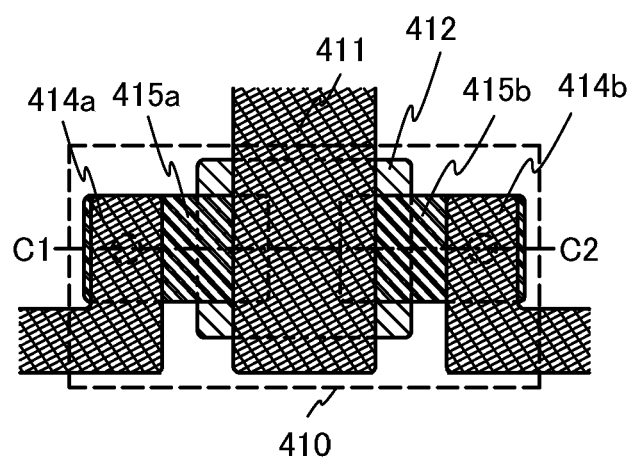
FIGS. 13A and 13B are a plan view and a cross-sectional view illustrating an example of a transistor.
Figure 13B:
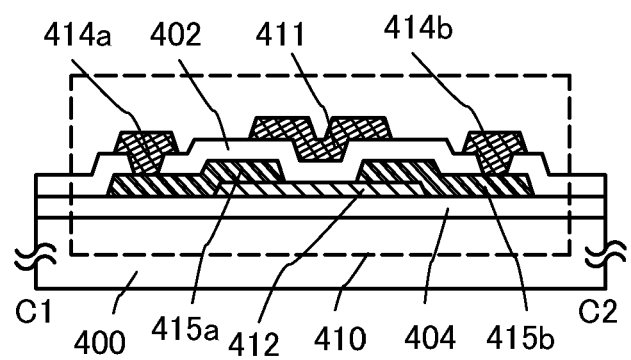

First, FIGS. 13A and 13B illustrate a planar structure and a cross-sectional structure of an example of a transistor. FIG. 13A is a plan view of a transistor 410 having a top-gate structure and FIG. 13B is a cross-sectional view taken along C1-C2 in FIG. 13A.

The transistor 410 includes, over a substrate 400, an insulating layer 404, an oxide semiconductor layer 412, a first electrode (one of a source electrode and a drain electrode) 415a, a second electrode (the other of the source electrode and the drain electrode) 415b, a gate insulating layer 402, and a gate electrode 411. A wiring layer (a first wiring) 414a and a wiring layer (a second wiring) 414b are provided in contact with and electrically connected to the first electrode 415a and the second electrode 415b, respectively.

Note that although the transistor 410 in FIG. 13A has a single-gate structure, the present invention is not limited to the structure. The transistor may have a multi-gate structure which includes a plurality of gate electrodes and a plurality of channel formation regions.

Next, a manufacturing process of the transistor 410 will be described with reference to FIGS. 14A to 14E.

First, an insulating layer 407 serving as a base film is formed over the substrate 400.

Although there is no particular limitation on a substrate that can be used as the substrate 400, the substrate needs to have heat resistance high enough to withstand at least heat treatment to be performed later. In the case where the temperature of the heat treatment to be performed later is high, a substrate having a strain point of 730° C. or higher is preferably used. Specific examples of the substrate 400 include a glass substrate, a crystalline glass substrate, a ceramic substrate, a quartz substrate, a sapphire substrate, and a plastic substrate. Further, specific examples of a material of the glass substrate include aluminosilicate glass, aluminoborosilicate glass, and barium borosilicate glass.

As the insulating layer 407, an oxide insulating layer such as a silicon oxide layer, a silicon oxynitride layer, an aluminum oxide layer, or an aluminum oxynitride layer is preferably used. The insulating layer 407 can be formed by a plasma CVD method, a sputtering method, or the like. In order to prevent the insulating layer 407 from containing a large amount of hydrogen, the insulating layer 407 is preferably formed by a sputtering method. In this embodiment, a silicon oxide layer is formed as the insulating layer 407 by a sputtering method. Specifically, the substrate 400 is transferred to a process chamber and a sputtering gas including high-purity oxygen from which hydrogen and moisture are removed is introduced, and a target of silicon or silicon oxide is used, whereby a silicon oxide layer is formed as the insulating layer 407 over the substrate 400. Note that the substrate 400 may be kept at room temperature or may be heated during deposition.

A specific example of a deposition condition for a silicon oxide film is as follows: quartz (preferably, synthetic quartz) is used as the target; the substrate temperature is 108° C.; the distance between a target and the substrate 400 (T–S distance) is 60 mm; the pressure is 0.4 Pa; the high-frequency power is 1.5 kW; the atmosphere is oxygen and argon (the flow rate ratio of oxygen to argon is 25 sccm: 25 sccm=1:1); and an RF sputtering method is used. The thickness of the film is 100 nm. Note that a silicon target may be used as the target instead of the quartz (preferably, synthetic quartz) target. Further, an oxygen gas may be used as a sputtering gas instead of a mixed gas of oxygen and argon. Here, a sputtering gas for forming the insulating layer 407 is a high-purity gas in which impurities such as hydrogen, water, hydroxyl, or hydride are reduced to such a level that the concentration thereof can be expressed by ppm or ppb.

Further, it is preferable that the insulating layer 407 be formed while moisture remaining in the process chamber is removed so that the insulating layer 407 may be prevented from including hydrogen, hydroxyl, or moisture.

In order to remove moisture remaining in the process chamber, a capture-type vacuum pump may be used. For example, a cryopump, an ion pump, or a titanium sublimation pump can be used. Further, as an evacuation means, a turbo pump provided with a cold trap is preferable. A process chamber which is evacuated with a cryopump is preferable because hydrogen atoms, compounds including a hydrogen atom such as water ($H_2O$), or the like are exhausted from the chamber and thus hydrogen atoms are hardly included in the insulating layer 407 formed in the chamber.

Examples of a sputtering method include an RF sputtering method in which a high-frequency power source is used for a sputtering power supply, a DC sputtering method, and a pulsed DC sputtering method in which a bias is applied in a pulsed manner. An RF sputtering method is mainly used in the case where an insulating film is formed, and a DC sputtering method is mainly used in the case where a metal film is formed.

In addition, there is also a multi-source sputtering apparatus in which a plurality of targets of different materials can be set. With the multi-source sputtering apparatus, films of different materials can be formed to be stacked in the same chamber, or a film can be formed by electric discharge of plural kinds of materials at the same time in the same chamber.

Further, a sputtering apparatus provided with a magnet system inside the chamber and used for a magnetron sputtering method, or a sputtering apparatus used for an ECR sputtering method in which plasma generated with the use of microwaves is used without using glow discharge can be used.

Further, as a deposition method using a sputtering method, there are also a reactive sputtering method in which a target substance and a sputtering gas component are chemically reacted with each other during the deposition to form a thin compound film thereof, and a bias sputtering method in which voltage is also applied to a substrate during the deposition.

The structure of the insulating layer 407 is not limited to a single-layer structure and may be a stacked-layer structure. For example, the insulating layer 407 may have a stacked-layer structure in which a nitride insulating layer such as a silicon nitride layer, a silicon nitride oxide layer, an aluminum nitride layer, or an aluminum nitride oxide layer and the above oxide insulating layer are stacked in this order over the substrate 400.

For example, a sputtering gas including high-purity nitrogen from which hydrogen and moisture are removed is introduced between the silicon oxide layer and the substrate and a silicon target is used to form a silicon nitride layer. In this step also, it is preferable that the silicon nitride layer be formed while moisture remaining in the process chamber is removed as in the case of the silicon oxide layer. In the formation of the silicon nitride layer, a substrate may also be heated during deposition.

In the case where the stack of a silicon nitride layer and a silicon oxide layer is provided as the insulating layer 407, the silicon nitride layer and the silicon oxide layer can be formed in the same process chamber using the same silicon target. First, an etching gas including nitrogen is introduced and a silicon nitride layer is formed using a silicon target provide in the process chamber, and then the etching gas is switched to an etching gas including oxygen to form a silicon oxide layer using the same silicon target. Since the silicon nitride layer and the silicon oxide layer can be formed in succession without exposure to air in this method, impurities such as hydrogen or moisture can be prevented from being adsorbed on a surface of the silicon nitride layer.

Then, an oxide semiconductor layer is formed over the insulating layer 407 by a sputtering method.

Further, in order that hydrogen, hydroxyl, and moisture be contained in the oxide semiconductor layer as little as possible, it is preferable that the substrate 400 over which the insulating layer 407 is formed be preheated in a preheating chamber of a sputtering apparatus as pretreatment for the film formation so that impurities such as hydrogen and moisture adsorbed to the substrate 400 may be removed and evacuated. Note that as an evacuation means, a cryopump is preferably provided in the preheating chamber. Further, this preheating may be performed on the substrate 400 before the formation of the gate insulating layer 402, which is to be formed later. Further, this preheating is preferably performed similarly on the substrate 400 over which layers up to the first electrode 415a and the second electrode 415b are formed. Note that this preheating treatment may be omitted.

Note that before the oxide semiconductor layer is formed by a sputtering method, dust attached to a surface of the insulating layer 407 is preferably removed by reverse sputtering in which an argon gas is introduced and plasma is generated. The reverse sputtering refers to a method in which, without application of voltage to a target side, a high-frequency power source is used for application of voltage to a substrate side in an argon atmosphere in order to generate plasma in the vicinity of the substrate to modify a surface. Note that instead of an argon atmosphere, nitrogen, helium, oxygen, or the like may be used.

As a target for forming the oxide semiconductor layer, a metal oxide target including zinc oxide as its main component can be used. For example, a target with a composition ratio of $In_2O_3:Ga_2O_3:ZnO=1:1:1$ [mol %] that is, In:Ga:Zn=1:1:0.5 [atomic %] can be used. Alternatively, a target having a composition ratio of In:Ga:Zn=1:1:1 [atomic %] or a target having a composition ratio of In:Ga:Zn=1:1:2 [atomic %] can be used. Further, a target which includes $SiO_2$ at 2 wt % to 10 wt % inclusive can be used. The filling factor of the metal oxide target is 90% to 100% inclusive, and preferably 95% to 99.9% inclusive. With the use of a metal oxide target with a high filling factor, the formed oxide semiconductor layer can have high density.

Note that the oxide semiconductor layer may be formed in a rare gas (typically, argon) atmosphere, an oxygen atmosphere, or a mixed atmosphere of a rare gas and oxygen. Here, a sputtering for forming the oxide semiconductor layer is a high-purity gas in which impurities such as hydrogen, water, hydroxyl, or hydride are reduced to such a level that the concentration thereof can be expressed by ppm or ppb.

The oxide semiconductor layer is formed over the substrate 400 in such a manner that the substrate is held in a process chamber maintained at reduced pressure, a sputtering gas from which hydrogen and moisture are removed is introduced while moisture remaining in the process chamber is removed, and metal oxide is used as a target. In order to remove moisture remaining in the process chamber, a capture-type vacuum pump is preferably used. For example, a cryopump, an ion pump, or a titanium sublimation pump is preferably used. In a process chamber which is evacuated with a cryopump, hydrogen atoms, compounds including hydrogen atoms such as water ($H_2O$) (more preferably, compounds including carbon atoms in addition), and the like are exhausted. Accordingly, the concentration of impurities included in the oxide semiconductor layer formed in the process chamber can be reduced. Further, the substrate temperature may be kept at room temperature or may be increased to a temperature less than 400° C. during the deposition of the oxide semiconductor layer.

As an example of the deposition condition of the oxide semiconductor layer, the following condition can be given: the temperature of the substrate is room temperature; the distance between the substrate and the target is 110 mm; the pressure is 0.4 Pa; the direct current (DC) power supply is 0.5 kW; and the atmosphere is oxygen and argon (the flow rate ratio of oxygen to argon is 15 sccm:30 sccm). Note that a pulse direct current (DC) power supply is preferable because dust generated in the deposition be reduced and the film thickness can be made uniform. The thickness of the oxide semiconductor layer is preferably 2 nm to 200 nm inclusive, preferably 5 nm to 30 nm inclusive. Note that an appropriate thickness of the oxide semiconductor layer is different depending on the material; therefore, the thickness may be determined as appropriate depending on the material.

Although an In—Ga—Zn—O-based oxide that is ternary metal oxide is used as the oxide semiconductor in the given example, the following oxide semiconductors can also be used: In—Sn—Ga—Zn—O that is quaternary metal oxide; In—Sn—Zn—O, In—Al—Zn—O, Sn—Ga—Zn—O, Al—Ga—Zn—O, or Sn—Al—Zn—O that is ternary metal oxide; In—Zn—O, Sn—Zn—O, Al—Zn—O, Zn—Mg—O, Sn—Mg—O, or In—Mg—O that is binary metal oxide; In—O; Sn—O; Zn—O; and the like. An oxide semiconductor layer may include Si. The oxide semiconductor layer may be amorphous or crystalline. Further, the oxide semiconductor layer may be non-single-crystal or single crystal.

Note that as the oxide semiconductor layer, a thin film expressed by $InMO_3(ZnO)_m$ (m>0) can be used. Here, M represents one or more metal elements selected from Ga, Al, Mn, and Co. For example, Ga, Ga and Al, Ga and Mn, or Ga and Co can be given as M.

Figure 14A:
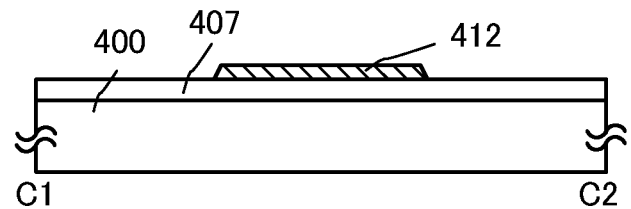
FIGS. 14A to 14E are cross-sectional views illustrating an example of a method for manufacturing a transistor.

Then, an oxide semiconductor layer is processed into an island-shaped oxide semiconductor layer 412 by a first photolithography step (see FIG. 14A). Note that a resist mask for forming the island-shaped oxide semiconductor layer 412 may be formed using an ink jetting method. The formation of the resist mask by an ink jetting method does not use a photomask; thus, manufacturing cost can be reduced.

Note that the etching of the oxide semiconductor layer may be dry etching, wet etching, or both wet etching and dry etching.

In the case of dry etching, a parallel plate reactive ion etching (RIE) method or an inductively coupled plasma (ICP) etching method can be used. In order to etch the film into a desired shape, the etching conditions (the amount of electric power applied to a coil-shaped electrode, the amount of electric power applied to an electrode on a substrate side, the temperature of the electrode on the substrate side, or the like) is adjusted as appropriate.

As an etching gas for dry etching, a gas including chlorine (a chlorine-based gas such as chlorine ($Cl_2$), boron chloride ($BCl_3$), silicon chloride ($SiCl_4$), or carbon tetrachloride ($CCl_4$)) is preferable but a gas including fluorine (a fluorine-based gas such as carbon tetrafluoride ($CF_4$), sulfur hexafluoride ($SF_6$), nitrogen trifluoride ($NF_3$), or trifluoromethane ($CHF_3$)), hydrogen bromide (HBr), oxygen ($O_2$), any of these gases to which a rare gas such as helium (He) or argon (Ar) is added, or the like can be used.

As an etchant used for wet etching, a mixed solution of phosphoric acid, acetic acid, and nitric acid, or an ammonium hydrogen peroxide mixture (a solution in which 31 wt % hydrogen peroxide, 28 wt % ammonia water, and water are mixed in a volume ratio of 5:2:2), or the like can be used. Further, ITO-07N (produced by KANTO CHEMICAL CO., INC.) may be used. The etching conditions (e.g., an etchant, an etching period, and a temperature) may be adjusted as appropriate in accordance with a material of the oxide semiconductor.

In the case of wet etching, an etchant is removed together with the material which is etched off by cleaning. The waste liquid including the etchant and the material which is etched off may be purified and the material may be reused. When a material (e.g., a rare metal such as indium) included in the oxide semiconductor layer is collected from the waste liquid after the etching and reused, the resources can be efficiently used.

In this embodiment, the oxide semiconductor layer is processed into the island-shaped oxide semiconductor layer 412 by a wet etching method using a mixed solution of phosphoric acid, acetic acid, and nitric acid as an etchant.

Then, first heat treatment is performed on the oxide semiconductor layer 412. The temperature of the first heat treatment is 400° C. to 750° C. inclusive, preferably 400° C. or higher and lower than the strain point of the substrate. Here, the substrate is put in an electric furnace which is one type of heat treatment apparatus and heat treatment is performed on the oxide semiconductor layer in a nitrogen atmosphere at 450° C. for one hour. After that, the oxide semiconductor layer is prevented from being exposed to air and from again including water or hydrogen. By this first heat treatment, hydrogen, water, hydroxyl, and the like can be removed from the oxide semiconductor layer 412.

Note that the heat treatment apparatus is not limited to an electric furnace, and an apparatus may be provided with a device for heating an object by heat conduction or thermal radiation from a heater such as a resistance heater. For example, an RTA (rapid thermal anneal) apparatus such as a GRTA (gas rapid thermal anneal) apparatus or an LRTA (lamp rapid thermal anneal) apparatus can be used. An LRTA apparatus is an apparatus with which an object is heated by radiation of light (an electromagnetic wave) emitted from a lamp such as a halogen lamp, a metal halide lamp, a xenon arc lamp, a carbon arc lamp, a high-pressure sodium lamp, or a high-pressure mercury lamp. A GRTA apparatus is an apparatus for heat treatment using a high-temperature gas. As the gas, an inert gas (typically, a rare gas such as argon) or a nitrogen gas can be used.

For example, the first heat treatment can employ GRTA, in which the substrate is transferred into an inert gas heated to a high temperature of 650° C. to 700° C., and heated for several minutes there, and then the substrate is transferred out of the inert gas heated to a high temperature. GRTA enables high-temperature heat treatment for a short time.

In the first heat treatment, it is preferable that water, hydrogen, and the like be not contained in the atmosphere. In addition, nitrogen or a rare gas such as helium, neon, or argon which is introduced into a heat treatment apparatus preferably has a purity of 6N (99.9999%) or higher, more preferably 7N (99.99999%) or higher (that is, the concentration of impurities is 1 ppm or lower, preferably 0.1 ppm or lower).

Note that depending on the conditions of the first heat treatment or a material of the oxide semiconductor layer, the oxide semiconductor layer 412 may be crystallized to be microcrystal or a polycrystal. For example, the oxide semiconductor layer may crystallize to become a microcrystalline oxide semiconductor layer having a crystallinity of 80% or more. Note that the island-shaped oxide semiconductor layer 412 may be an amorphous oxide semiconductor layer without crystallization after the first heat treatment. Further, the island-shaped oxide semiconductor layer 412 may become an oxide semiconductor layer in which a microcrystalline portion (with a grain diameter of 1 nm to 20 nm inclusive, typically 2 nm to 4 nm inclusive) is mixed into an amorphous oxide semiconductor layer.

The first heat treatment of the oxide semiconductor layer may be performed on the oxide semiconductor layer before being processed into the island-shaped oxide semiconductor layer. In that case, after the first heat treatment, the substrate is taken out of the heat treatment apparatus and subjected to the photolithography step.

Although the first heat treatment is performed mainly for the purpose of removing impurities such as hydrogen, water, and hydroxyl from the oxide semiconductor layer, it may generate oxygen defects in the oxide semiconductor layer. Therefore, the first heat treatment is preferably followed by treatment for supplying oxygen. Specifically, heat treatment in oxygen atmosphere or an atmosphere including nitrogen and oxygen (nitrogen to oxygen is 4 to 1 in volume ratio) may be performed after the first heat treatment, for example. Further, plasma treatment in an oxygen atmosphere may be employed.

The heat treatment having an effect of dehydration or dehydrogenation on the oxide semiconductor layer may be performed at any of the following timings: after the oxide semiconductor layer is formed; after a source electrode and a drain electrode are formed over the oxide semiconductor layer; and after a gate insulating layer is formed over the source electrode and the drain electrode.

Then, a conductive film is formed over the insulating layer 407 and the oxide semiconductor layer 412. The conductive film may be formed by a sputtering method or a vacuum evaporation method. As a material of the conductive film, a metal material such as Al, Cu, Cr, Ta, Ti, Mo, W, or Y, an alloy material including any of the metal materials, a conductive metal oxide, and the like can be given. As a conductive metal oxide, indium oxide ($In_2O_3$), tin oxide ($SnO_2$), zinc oxide (ZnO), an indium oxide-tin oxide alloy ($In_2O_3$—$SnO_2$, abbreviated as ITO), an indium oxide-zinc oxide alloy ($In_2O_3$—ZnO), or the metal oxide material including silicon or silicon oxide can be used. In this case, heat resistance can be improved. Further, an Al material to which an element such as Si, Ti, Ta, W, Mo, Cr, Nd, Sc, or Y which prevents generation of hillocks or whiskers which will be generated in an Al film, may be used.

Further, the conductive film may have a single-layer structure or a stacked-layer structure of two or more layers. For example, a single-layer structure of an aluminum film including silicon; a two-layer structure of an aluminum film and a titanium film stacked thereover; a three-layer structure of a Ti film, an aluminum film stacked thereover, and a Ti film stacked thereover can be given. Further, a stacked-layer structure in which a metal layer of Al, Cu, or the like and a refractory metal layer of Cr, Ta, Ti, Mo, W, or the like are stacked may be employed.

Figure 14B:
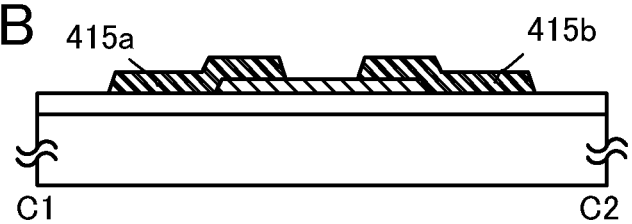

Then, by a second photolithography step, a resist mask is formed over the conductive film, and selective etching is performed, whereby the first electrode 415a and the second electrode 415b are formed, and then, the resist mask is removed (see FIG. 14B). The first electrode 415a serves as one of a source electrode and a drain electrode while the second electrode 415b serves as the other of the source electrode and the drain electrode. Here, the first electrode 415a and the second electrode 415b are preferably etched so as to have tapered ends because coverage with the gate insulating layer formed thereon will be improved. Note that resist mask for forming the first electrode 415a and the second electrode 415b may be formed by an ink jetting method. The formation of the resist mask by an ink jetting method does not use a photomask; thus, manufacturing cost can be reduced.

In this embodiment, as the first electrode 415a and the second electrode 415b, a 150-nm-thick titanium film is formed by a sputtering method.

Note that in order to prevent the oxide semiconductor layer 412 from being removed and the insulating layer 407 thereunder from being exposed in the etching of the conductive film, their materials and etching conditions of the conductive film need to be adjusted as appropriate. Therefore, in this embodiment, an In—Ga—Zn—O-based oxide semiconductor is used as the oxide semiconductor layer 412, a titanium film is used as the conductive film, and an ammonium hydrogen peroxide mixture (a mixture of ammonia, water, and a hydrogen peroxide solution) is used as an etchant so that part of the oxide semiconductor layer 412 is not etched. However, the present invention is not limited thereto. Part of the oxide semiconductor layer 412 may be etched by the second photolithography step and an oxide semiconductor layer having a groove (a depression portion) can be formed.

Ultraviolet, KrF laser light, or ArF laser light is used for light exposure for forming the resist mask in the second photolithography step. A channel length L of the transistor to be formed later depends on the width of an interval between a lower end of the first electrode and a lower end of the second electrode which are adjacent to each other over the oxide semiconductor layer 412. Note that when light exposure is performed to provide the channel length L of less than 25 nm, extreme ultraviolet with extremely short wavelengths of several nanometers to several tens of nanometers is used for light exposure for forming the resist mask in the second photolithography step. Light exposure with extreme ultraviolet leads to a high resolution and a large depth of focus. Accordingly, the channel length L of the transistor to be formed later can be set to 10 nm to 1000 nm inclusive. In this case, an increase in operation speed of the transistor can be achieved, and further, a reduction in power consumption of the transistor can be achieved due to extremely small off-state current.

Figure 14C:
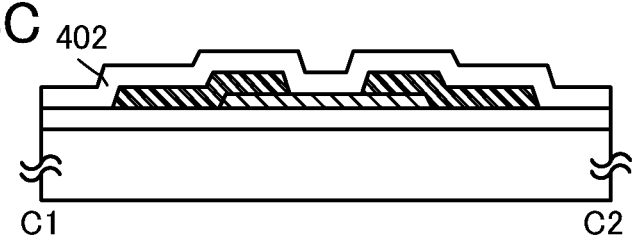

Then, the gate insulating layer 402 is formed over the insulating layer 407, the oxide semiconductor layer 412, the first electrode 415a, and the second electrode 415b (see FIG. 14C).

The gate insulating layer 402 can be formed to have a single-layer structure or a stacked-layer structure including any of a silicon oxide layer, a silicon nitride layer, a silicon oxynitride layer, a silicon nitride oxide layer, and an aluminum oxide layer by a plasma CVD method, a sputtering method, or the like.

The gate insulating layer 402 is preferably formed in a manner such that hydrogen is not included in the gate insulating layer 402. Thus, the gate insulating layer 402 is preferably formed by a sputtering method, in which hydrogen can be reduced to a very low level in an atmosphere during the disposition. In the case of forming a silicon oxide film by a sputtering method, a silicon target or a quartz target is used as a target, and oxygen or a mixed gas of oxygen and argon is used as a sputtering gas.

The gate insulating layer 402 can have a structure in which a silicon oxide layer and a silicon nitride layer are stacked in order over the first electrode 415a and the second electrode 415b. For example, a silicon oxide layer ($SiO_x$ (x>0)) with a thickness of 5 nm to 300 nm inclusive may be formed as a first gate insulating layer and a silicon nitride layer ($SiN_y$ (y>0)) with a thickness of 50 nm to 200 nm inclusive may be formed as a second gate insulating layer over the first gate insulating layer to provide a gate insulating layer with a thickness of 100 nm In this embodiment, a silicon oxide layer having a thickness of 100 nm is formed by an RF sputtering method under a pressure of 0.4 Pa, a high-frequency power of 1.5 kW, and an atmosphere of oxygen and argon (the flow rate ratio of oxygen to argon is 25 sccm:25 sccm=1:1).

Figure 14D:
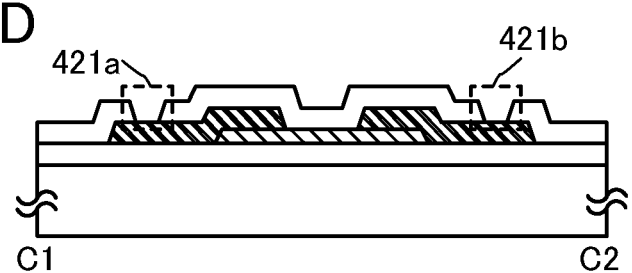

Next, by a third photolithography step, a resist mask is formed, and selective etching is performed, whereby part of the gate insulating layer 402 partly removed; thus, openings 421a and 421b reaching the first electrode 415a and the second electrode 415b are formed (see FIG. 14D). Note that the formation of the resist mask by an ink jetting method does not use a photomask; thus, manufacturing cost can be reduced.

Then, after a conductive film is formed over the gate insulating layer 402 and in the openings 421a and 421b, the gate electrode 411, the first wiring 414a and the second wiring 414b are formed in a fourth photolithography step.

The gate electrode 411, the first wiring 414a, and the second wiring 414b can be formed to have a single-layer structure or a stacked-layer structure using a metal material such as molybdenum, titanium, chromium, tantalum, tungsten, aluminum, copper, neodymium, or scandium, or an alloy material containing any of these materials as the main component. Specific examples of a two-layer structure of the gate electrode 411, the first wiring 414a, and the second wiring 414b include a structure including an aluminum layer and a molybdenum layer thereover, a structure including a copper layer and a molybdenum layer thereover, a structure including a copper layer and a titanium nitride layer or a tantalum nitride layer thereover, and a structure including a titanium nitride layer and a molybdenum layer thereover. Specific examples of a three-layer structure includes a structure in which a tungsten layer or a tungsten nitride layer, an alloy layer of aluminum and silicon or aluminum and titanium, and a titanium nitride layer or a titanium layer are stacked. Note that the gate electrode can be formed using a light-transmitting conductive film. As a light-transmitting conductive film, a film of a light-transmitting conductive oxide can be specifically given.

In this embodiment, as the gate electrode 411, the first wiring 414a, and the second wiring 414b, a 150-nm-thick titanium film is formed by a sputtering method.

Then, second heat treatment (preferably, at 200° C. to 400° C. inclusive, for example, at 250° C. to 350° C. inclusive) is performed in an inert gas atmosphere or in an oxygen gas atmosphere. In this embodiment, the second heat treatment is performed in a nitrogen atmosphere at 250° C. for one hour. Note that the second heat treatment may be performed after a protective insulating layer or a planarization insulating layer is formed over the transistor 410.

Heat treatment may be further performed at 100° C. to 200° C. inclusive in air for 1 hour to 30 hours inclusive. This heat treatment may be performed at a fixed heating temperature or the temperature may be increased from room temperature to a heating temperature of 100° C. to 200° C. inclusive and decreased from the heating temperature to room temperature, plural times repeatedly. Further, this heat treatment may be performed under reduced pressure before the formation of the oxide insulating layer. Under reduced pressure, the heating time can be shortened, which is preferable.

Figure 14E:
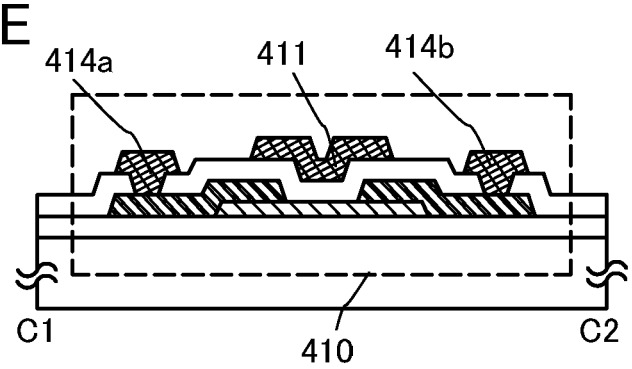

Through the above process, the transistor 410 including the high-purity oxide semiconductor layer 412 in which the concentration of hydrogen, moisture, hydride, and hydroxide is reduced can be formed (see FIG. 14E). The transistor 410 can be used as the transistor 6401 described in Embodiment 1, for example.

A protective insulating layer or a planarization insulating layer for planarization may be provided over the transistor 410. The protective insulating layer can be formed to have a single-layer structure or a stacked-layer structure including any of a silicon oxide layer, a silicon nitride layer, a silicon oxynitride layer, a silicon nitride oxide layer, and an aluminum oxide layer. The planarization insulating layer can be formed of a heat-resistant organic material, such as polyimide, acrylic, benzocyclobutene, polyamide, or epoxy. As an alternative to such organic materials, it is also possible to use a low-dielectric constant material (a low-k material), a siloxane-based resin, phosphosilicate glass (PSG), borophosphosilicate glass (BPSG), or the like. The planarization insulating layer may be formed by stacking a plurality of insulating films formed of any of these materials.

Here, the siloxane-based resin corresponds to a resin including a Si—O—Si bond which is formed using a siloxane-based material as a starting material. The siloxane-based resin may include an organic group (e.g., an alkyl group or an aryl group) or a fluoro group as a substituent. The organic group may include a fluoro group.

The method for forming the planarization insulating layer is not particularly limited. Depending on the material, the planarization insulating layer can be formed by a method such as sputtering method, an SOG method, a spin coating method, a dipping method, a spray coating method, or a droplet discharge method (e.g., an ink jetting method, screen printing, or offset printing), or by using a tool (apparatus) such as a doctor knife, a roll coater, a curtain coater, a knife coater, or the like.

As described above, by removing moisture remaining in the reaction atmosphere in the formation of the oxide semiconductor layer, the concentration of hydrogen and hydride in the oxide semiconductor layer can be reduced.

The transistor including an oxide semiconductor layer which is described in this embodiment has extremely high drain breakdown voltage. Consequently, even if a driving voltage is high as in the case of a display device including a liquid crystal material which exhibits a blue phase, a highly-reliable display device can be provided by using the transistor including an oxide semiconductor layer which is described in this embodiment in a pixel for forming a display portion of the display device. In addition, off-state current of the transistor including a high-purity oxide semiconductor can be reduced to $1\times10^{-13}$ A or less, preferably $1\times10^{-16}$ A or less. Thus, voltage can be held in a storage capacitor for a long period of time and thus power consumption for displaying a still image or the like can be suppressed.

(Embodiment 8)

In this embodiment, a structural example of the transistor 6401 described in Embodiment 1 and an example of a manufacturing method thereof will be described. In other words, a structural example of a transistor including a high-purity oxide semiconductor and an example of a manufacturing method thereof will be described with reference to FIGS. 15A to 15E.

Figure 15A:
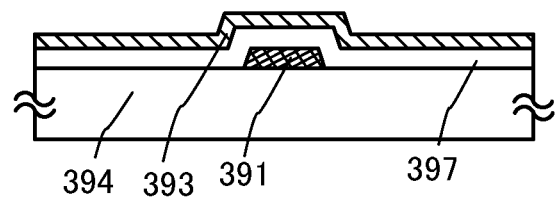
FIGS. 15A to 15E are cross-sectional views illustrating an example of a method for manufacturing a transistor.
Figure 15B:
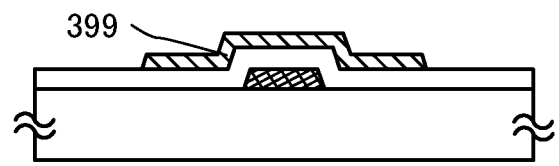
Figure 15C:
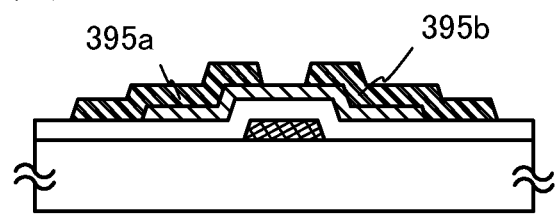
Figure 15D:
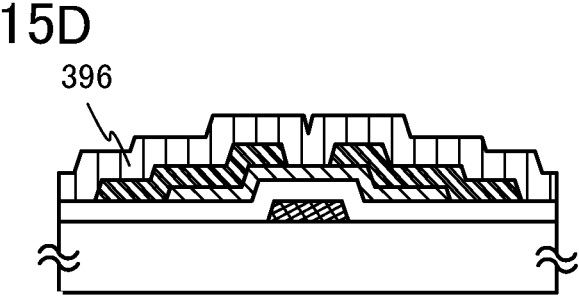
Figure 15E:
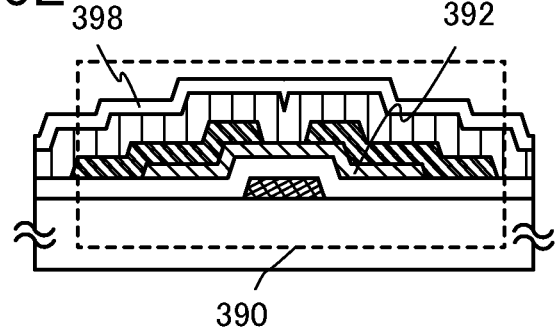
Figure 16A:
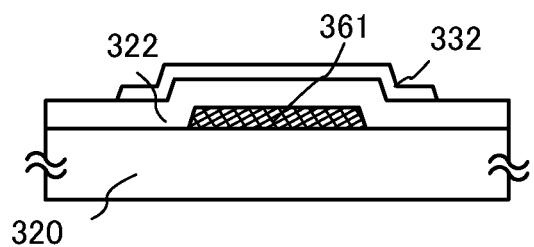
FIGS. 16A to 16D are cross-sectional views illustrating an example of a method for manufacturing a transistor.
Figure 16B:
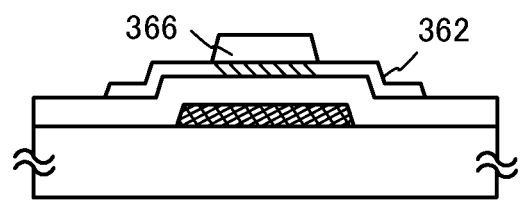
Figure 16C:
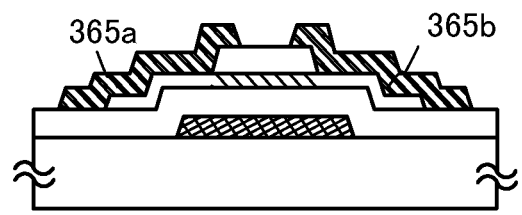
Figure 16D:
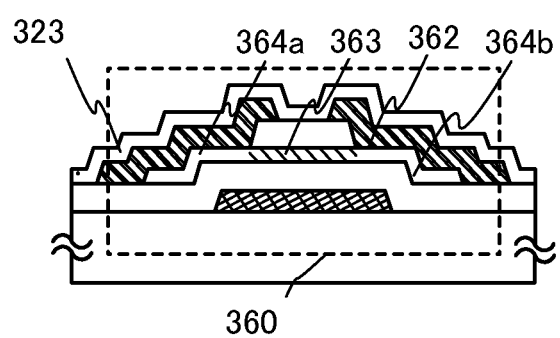

FIGS. 15A to 15E illustrate an example of a cross-sectional structure of a transistor. A transistor 390 illustrated in FIG. 15E is one type of a bottom gate structure and is also referred to as an inverted staggered transistor. The transistor 390 can be used as the transistor 6401 described in Embodiment 1, for example. Note that although the transistor 390 has a single-gate structure, the present invention is not limited to the structure. The transistor may have a multi-gate structure which includes a plurality of gate electrodes and a plurality of channel formation regions.

A process of manufacturing the transistor 390 over a substrate 394 will be described below with reference to FIGS. 15A to 15E.

First, a conductive film is formed over the substrate 394, and then, a gate electrode 391 is formed by a first photolithography step. It is preferable that an end portion of the formed gate electrode be tapered because coverage with a gate insulating layer formed thereover is improved. Note that a resist mask may be formed by an ink jetting method. The formation of the resist mask by an ink jetting method does not use a photomask; thus, manufacturing cost can be reduced.

For the material of the substrate 394, a material similar to that of the substrate 400 described in Embodiment 7 can be employed. For the material and the formation method of the gate electrode 391, a material and a method similar to those of the gate electrode 411 described in Embodiment 7 can be employed.

Note that an insulating film serving as a base film may be provided between the substrate 394 and the gate electrode 391. The base film has a function of preventing diffusion of impurity elements from the substrate 394, and can be formed to have a single-layer structure or a stacked-layer structure including one or more of a silicon nitride film, a silicon oxide film, a silicon nitride oxide film, and a silicon oxynitride film.

Then, a gate insulating layer 397 is formed over the gate electrode 391.

The gate insulating layer 397 can be formed to have a single-layer structure or a stacked-layer structure including any of a silicon oxide layer, a silicon nitride layer, a silicon oxynitride layer, a silicon nitride oxide layer, and an aluminum oxide layer by a plasma CVD method, a sputtering method, or the like. Note that in order to prevent the gate insulating layer 397 from containing a large amount of hydrogen, the gate insulating layer 397 is preferably formed by a sputtering method. In the case of forming a silicon oxide film by a sputtering method, a silicon target or a quartz target is used as a target, and oxygen or a mixed gas of oxygen and argon is used as a sputtering gas.

The gate insulating layer 397 can have a structure in which a silicon nitride layer and a silicon oxide layer are stacked over the gate electrode 391. For example, a silicon nitride layer ($SiN_y$ ($y>0$)) with a thickness of 50 nm to 200 nm inclusive may be formed by a sputtering method as a first gate insulating layer and a silicon oxide layer ($SiO_x$ ($x>0$)) with a thickness of 5 nm to 300 nm inclusive may be formed as a second gate insulating layer over the first gate insulating layer to provide a gate insulating layer with a thickness of 100 nm.

Then, an oxide semiconductor layer 393 is formed with a thickness of 2 nm to 200 nm inclusive over the gate insulating layer 397 (see FIG. 15A).

For the material and the formation method of the oxide semiconductor layer 393, a material and a method similar to those of the oxide semiconductor layer (the island-shaped oxide semiconductor layer 412) described in Embodiment 7 can be employed.

As an example of the deposition condition in the case where the oxide semiconductor layer 393 is formed by a sputtering method, the following condition can be given: the distance between the substrate and the target is 100 mm, the pressure is 0.6 Pa, the direct current (DC) power supply is 0.5 kW, and the atmosphere is oxygen (the proportion of the oxygen flow is 100%). Note that a pulse direct current (DC) power supply is preferable because dust generated in the deposition can be reduced and the film thickness can be made uniform. The thickness of the oxide semiconductor layer 393 is preferably 2 nm to 200 nm inclusive, preferably 5 nm to 30 nm inclusive. Note that an appropriate thickness of the oxide semiconductor layer is different depending on the material; therefore, the thickness may be determined as appropriate depending on the material.

Note that before the oxide semiconductor layer 393 is formed, dust attached to a surface of the gate insulating layer 397 is preferably removed by reverse sputtering in which an argon gas is introduced and plasma is generated.

Further, in order that hydrogen, hydroxyl, and moisture may be contained in the gate insulating layer 397 and the oxide semiconductor layer 393 as little as possible, it is preferable that the substrate 394 over which the gate electrode 391 is formed or the substrate 394 over which layers up to the gate insulating layer 397 are formed be preheated in a preheating chamber of a sputtering apparatus as pretreatment for the film formation so that impurities such as hydrogen and moisture adsorbed to the substrate 394 are removed and evacuated. The temperature of the preheating may be 100° C. to 400° C. inclusive, preferably 150° C. to 300° C. inclusive. As an evacuation means, a cryopump is preferably provided in the preheating chamber. Further, this preheating may be similarly performed on the substrate 394 over which layers up to and including a first electrode 395a and a second electrode 395b are formed, before the formation of a protective insulating layer 396.

Then, an oxide semiconductor layer is processed into an island-shaped oxide semiconductor layer 399 by a second photolithography step (see FIG. 15B). Note that for the process method of the island-shaped oxide semiconductor layer 399, a process method of similar to that of the island-shaped oxide semiconductor layer 412 described in Embodiment 7 can be employed.

Note that it is preferable that reverse sputtering be performed before formation of a conductive film in the subsequent step in order to remove a resist residue or the like attached on the surfaces of the oxide semiconductor layer 399 and the gate insulating layer 397.

Then, a conductive film is formed over the gate insulating layer 397 and the oxide semiconductor layer 399. The conductive film may be formed by a sputtering method or a vacuum evaporation method. As a material of the conductive film, an element selected from Al, Cr, Cu, Ta, Ti, Mo, and W; an alloy containing any of these elements as a component; an alloy containing a plurality of these elements in combination; and the like can be used. Further, one or more materials selected from manganese, magnesium, zirconium, beryllium, and yttrium may be used. Further, a light-transmitting conductive film may be included. As a light-transmitting conductive film, a film of a light-transmitting conductive oxide can be specifically given.

Further, the conductive film may have a single-layer structure or a stacked-layer structure of two or more layers. For example, a single-layer structure of an aluminum film including silicon; a two-layer structure of an aluminum film and a titanium film stacked thereover; a three-layer structure of a Ti film, an aluminum film stacked thereover, and a Ti film stacked thereover can be given.

Then, by a third photolithography step, a resist mask is formed over the conductive film, and selective etching is performed, whereby the first electrode 395a and the second electrode 395b are formed, and then, the resist mask is removed (see FIG. 15C). Here, in order to prevent the oxide semiconductor layer 399 from being removed and the gate insulating layer 397 thereunder from being exposed in the etching of the conductive film, their materials and etching conditions of the conductive film need to be adjusted as appropriate. Therefore, in this embodiment, an In—Ga—Zn—O-based oxide semiconductor is used as the oxide semiconductor layer 399, a titanium film is used as the conductive film, and an ammonium hydrogen peroxide mixture (a mixture of ammonia, water, and a hydrogen peroxide solution) is used as an etchant so that part of the oxide semiconductor layer 399 is not etched. However, the present invention is not limited thereto. Part of the oxide semiconductor layer 399 may be etched by the third photolithography step and an oxide semiconductor layer having a groove (a depression portion) can be formed.

Ultraviolet, KrF laser light, or ArF laser light is used for light exposure for forming the resist mask in the third photolithography step. A channel length L of the transistor to be formed later depends on the width of an interval between a lower end of the source electrode and a lower end of the drain electrode which are adjacent to each other over the oxide semiconductor layer 399. Note that when light exposure is performed to provide the channel length L of less than 25 nm, extreme ultraviolet with extremely short wavelengths of several nanometers to several tens of nanometers is used for light exposure for forming the resist mask in the third photolithography step. Light exposure with extreme ultraviolet leads to a high resolution and a large depth of focus.

Accordingly, the channel length L of the transistor to be formed later can be set to 10 nm to 1000 nm inclusive, which will lead to an increase in operation speed of the circuit, and further, a reduction in power consumption of the transistor due to extremely small off-state current.

Further, in order to reduce the number of photomasks used in the photolithography steps and reduce the number of photolithography steps, an etching step may be performed with the use of a multi-tone mask which is a light-exposure mask through which light is transmitted to have a plurality of intensities. A resist mask formed using a multi-tone mask has a plurality of thicknesses and further can be changed in shape by being etched, and therefore, can be used in a plurality of etching steps to provide different patterns. Therefore, a resist mask corresponding to at least two kinds of different patterns can be formed using one multi-tone mask. Thus, the number of light-exposure masks can be reduced and the number of corresponding photolithography steps can also be reduced, whereby simplification of the process can be realized.

In addition, plasma treatment using a gas such as $N_2O$, $N_2$, or Ar may be performed to remove water or the like adsorbed on an exposed surface of the oxide semiconductor layer 399. Plasma treatment may be performed using a mixed gas of oxygen and argon. In this embodiment, either plasma treatment is performed.

Then, after the plasma treatment, a protective insulating layer 396 which is in contact with the exposed oxide semiconductor layer 399, the first electrode 395a, and the second electrode 395b is formed without exposure to air (see FIG. 15D). At this time, it is preferable that the protective insulating layer 396 be formed while moisture remaining in the process chamber is removed so that the oxide semiconductor layer 399 and the protective insulating layer 396 can be prevented from including hydrogen, hydroxyl, or moisture. In order to remove moisture remaining in the process chamber, a capture-type vacuum pump is preferably used. For example, a cryopump, an ion pump, or a titanium sublimation pump is preferably used. In a chamber which is evacuated with a cryopump, hydrogen atoms, compounds including hydrogen atoms such as water ($H_2O$), and the like are exhausted. Accordingly, the concentration of impurities included in the protective insulating layer 396 formed in the process chamber can be reduced.

In this embodiment, an oxide insulating layer is formed as the protective insulating layer 396. For the formation of the protective insulating layer 396, the substrate 394 over which layers up to the island-shaped oxide semiconductor layer 399, the first electrode 395a, and the second electrode 395b are formed is kept at room temperature or heated to a temperature lower than 100° C., a sputtering gas including high-purity oxygen from which hydrogen and moisture are removed is introduced, and a silicon semiconductor target is used, whereby a silicon oxide layer is formed. Note that instead of a silicon oxide layer, a silicon oxynitride layer, an aluminum oxide layer, an aluminum oxynitride layer, or the like can be used as the oxide insulating layer.

For example, a silicon oxide layer is formed by a pulsed DC sputtering method under the following condition: a boron-doped silicon target which has a purity of 6N (the resistivity is 0.01 Ωcm) is used; the distance between the substrate and the target (T-S distance) is 89 mm; the pressure is 0.4 Pa, the direct-current (DC) power supply is 6 kW, and the atmosphere is oxygen (the proportion of the oxygen flow is 100%). The thickness of the silicon oxide layer is 300 nm. Note that instead of a silicon target, quartz (preferably, synthetic quartz) can be used. As a sputtering gas, an oxygen gas or a mixed gas of oxygen and argon may be used.

Further, heat treatment is preferably performed at 100° C. to 400° C. inclusive while the protective insulating layer 396 and the oxide semiconductor layer 399 are in contact with each other. Since the protective insulating layer 396 has many defects, by the heat treatment, impurities such as hydrogen, moisture, hydroxyl, or hydride contained in the oxide semiconductor layer 399 is diffused into the protective insulating layer 396 so that the impurities contained in the oxide semiconductor layer 399 may be further reduced.

Through the above process, the transistor 390 including an oxide semiconductor layer 392 in which the concentration of hydrogen, moisture, hydroxyl, and hydroxide is reduced can be formed (see FIG. 15E). As described in this embodiment, by removing moisture remaining in the reaction atmosphere in the formation of the oxide semiconductor layer, the concentration of hydrogen and hydride in the oxide semiconductor layer can be reduced. As a result, an intrinsic or substantially intrinsic semiconductor can be obtained.

Note that an insulating layer may be additionally provided over the protective insulating layer 396. In this embodiment, a protective insulating layer 398 is formed over the protective insulating layer 396. As the insulating layer 398, a silicon nitride film, a silicon nitride oxide film, an aluminum nitride film, an aluminum nitride oxide film, or the like may be used.

For the formation of the insulating layer 398, the substrate 394 over which layers up to the protective insulating layer 396 are formed is heated to a temperature of 100° C. to 400° C., a sputtering gas including high-purity nitrogen from which hydrogen and moisture are removed is introduced, and a silicon semiconductor target is used, whereby a silicon nitride film is formed. In this step also, it is preferable that the insulating layer 398 be formed while moisture remaining in the process chamber is removed as in the case of the protective insulating layer 396. By heating the substrate 394 to 100° C. to 400° C. in the deposition of the insulating layer 398, hydrogen or moisture in the oxide semiconductor layer 399 can be diffused into the insulating layer 398. In that case, heat treatment is not necessarily performed directly after the formation of the protective insulating layer 396.

In the case where a silicon oxide layer is formed as the protective insulating layer 396 and a silicon nitride layer is formed as the insulating layer 398, the silicon oxide layer and the silicon nitride layer can be formed in the same process chamber using the same silicon target. First, an etching gas including oxygen is introduced and a silicon oxide layer is formed using a silicon target provide in the process chamber, and then the etching gas is switched to an etching gas including nitrogen and a silicon nitride layer is formed using the same silicon target. Since the silicon oxide layer and the silicon nitride layer can be formed in succession without exposure to air, impurities such as hydrogen or moisture can be prevented from being adsorbed on a surface of the silicon oxide layer. Note that after the silicon oxide layer is formed as the protective insulating layer 396 and the silicon nitride layer is formed thereover as the insulating layer 398, heat treatment (at a temperature of 100° C. to 400° C.) for diffusion of hydrogen or moisture in the oxide semiconductor layer into the oxide insulating layer is preferably performed.

After the formation of the protective insulating layer 396, heat treatment may be further performed at 100° C. to 200° C. inclusive in air for 1 hour to 30 hours inclusive. This heat treatment may be performed at a fixed heating temperature or the temperature may be increased from room temperature to a heating temperature of 100° C. to 200° C. inclusive and decreased from the heating temperature to room temperature, plural times repeatedly. Further, this heat treatment may be performed under reduced pressure before the formation of the oxide insulating layer. Under reduced pressure, the heating time can be shortened.

Since the above process can be performed at a temperature of 400° C. or lower, the process can be preferably applied to a manufacturing process using a glass substrate having a side longer than 1 m and a thickness of 1 mm or less. In addition, since the whole process can be performed at a treatment temperature of 400° C. or lower, a display panel can be manufactured with less energy consumption.

The transistor including an oxide semiconductor layer which is described in this embodiment has extremely high drain breakdown voltage. Consequently, even if a driving voltage is high as in the case of a display device including a liquid crystal material which exhibits a blue phase, a highly-reliable display device can be provided by using the transistor including an oxide semiconductor layer which is described in this embodiment in a pixel for forming a display portion of the display device. In addition, off-state current of the transistor including a high-purity oxide semiconductor can be reduced to $1 \times 10^{-13}$ A or less, preferably $1 \times 10^{-16}$ A or less. Thus, voltage can be held in a storage capacitor for a long period of time and thus power consumption for displaying a still image or the like can be suppressed.

(Embodiment 9)

In this embodiment, a structural example of the transistor 6401 described in Embodiment 1 and an example of a manufacturing method thereof will be described. In other words, a structural example of a transistor including a high-purity oxide semiconductor and an example of a manufacturing method thereof will be described with reference to FIGS. 16A to 16D.

FIGS. 16A to 16D illustrate an example of a cross-sectional structure of a transistor. A transistor 360 illustrated in FIG. 16A to 16D is one type of a bottom gate structure called a channel-protective type (channel-stop type) and is also referred to as an inverted staggered transistor. The transistor 360 can be used as the transistor 6401 described in Embodiment 1. Note that although the transistor 360 has a single-gate structure, the present invention is not limited to the structure. The transistor may have a multi-gate structure which includes a plurality of gate electrodes and a plurality of channel formation regions.

A process of manufacturing the transistor 360 over a substrate 320 will be described below with reference to FIGS. 16A to 16D.

First, a conductive film is formed over the substrate 320, and then, a gate electrode 361 is formed by a first photolithography step. For the material of the substrate 320, a material similar to that of the substrate 394 described in Embodiment 8 can be employed. For the material and the formation method of the gate electrode 361, a material and a method similar to those of the gate electrode 391 described in Embodiment 8 can be employed.

Then, a gate insulating layer 322 is formed over the gate electrode 361. For the material of the gate insulating layer 322, a material similar to that of the gate insulating layer 397 described in Embodiment 8 can be employed. In this embodiment, a silicon oxynitride layer having a thickness of 100 nm or less is formed by a plasma CVD method as the gate insulating layer 322.

Then, an oxide semiconductor layer having a thickness of 2 nm to 200 nm inclusive is formed over the gate insulating layer 322 and processed into an island-shaped oxide semiconductor layer by a second photolithography step. For the material and the formation method of the island-shaped oxide semiconductor layer, a material and a method similar to those of the island-shaped oxide semiconductor layer 399 described in Embodiment 8 can be employed. In this embodiment, the oxide semiconductor layer is formed by a sputtering method using an In—Ga—Zn—O-based oxide semiconductor target.

Then, dehydration or dehydrogenation of the oxide semiconductor layer is performed. The temperature of the first heat treatment for dehydration or dehydrogenation is 400° C. to 750° C. inclusive, preferably 400° C. or higher and lower than the strain point of the substrate. Here, the substrate is put in an electric furnace which is one type of heat treatment apparatus and heat treatment is performed on the oxide semiconductor layer in a nitrogen atmosphere at 450° C. for one hour. After that, the oxide semiconductor layer is prevented from being exposed to air and from again including water or hydrogen; thus an oxide semiconductor layer 332 is obtained (see FIG. 16A).

Then, plasma treatment using a gas such as $N_2O$, $N_2$, or Ar is performed. By this plasma treatment, adsorbed water or the like of an exposed surface of the oxide semiconductor layer is removed. Plasma treatment may be performed using a mixed gas of oxygen and argon.

Then, an oxide insulating layer is formed over the gate insulating layer 322 and the oxide semiconductor layer 332. Then, by a third photolithography step, a resist mask is formed, and selective etching is performed, whereby an oxide insulating layer 366 is formed, and then, the resist mask is removed.

In this embodiment, a 200-nm-thick silicon oxide film is formed as the oxide insulating layer 366 by a sputtering method. The substrate temperature in film formation may be room temperature to 300° C. inclusive, and in this embodiment, the substrate temperature is 100° C. The silicon oxide film can be formed by a sputtering method in a rare gas (typically, argon) atmosphere, an oxygen atmosphere, or an atmosphere including a rare gas (typically, argon) and oxygen. As a target, a silicon oxide target or a silicon target can be used. For example, with use of a silicon target, a silicon oxide film can be formed by a sputtering method in an atmosphere of oxygen and nitrogen. The oxide insulating layer 366 which is formed in contact with the oxide semiconductor layer with reduced resistance is formed using an inorganic insulating film which does not include impurities such as moisture, a hydrogen ion, an oxygen ion, and OH⁻ and which prevents entry of them from the outside; for example, a silicon oxide film, a silicon oxynitride film, an aluminum oxide film, an aluminum oxynitride film, or the like can be typically used.

At this time, it is preferable that the oxide insulating layer 366 be formed while moisture remaining in the process chamber is removed so that the oxide semiconductor layer 332 and the oxide insulating layer 366 can be prevented from including hydrogen, hydroxyl, or moisture. As for a method for removing moisture remaining in the process chamber, the method described in other embodiments can be employed.

Then, second heat treatment (preferably, at 200° C. to 400° C. inclusive, for example, at 250° C. to 350° C. inclusive) is preferably performed in an inert gas atmosphere or in an oxygen gas atmosphere. For example, the second heat treatment is performed in a nitrogen atmosphere at 250° C. for one hour. In the second heat treatment, a portion of the oxide semiconductor layer (a channel formation region) is heated while being in contact with the oxide insulating layer 366.

In this embodiment, the oxide semiconductor layer 332 on which the oxide insulating layer 366 is provided and which is partly exposed is further subjected to heat treatment in a nitrogen atmosphere or an inert gas atmosphere or under reduced pressure. By the heat treatment in a nitrogen atmosphere or an inert gas atmosphere or under reduced pressure, the region of the oxide semiconductor layer 332 which is not covered with the oxide insulating layer 366 is reduced in resistance. For example, the heat treatment may be performed in a nitrogen atmosphere at 250° C. for one hour.

By the heat treatment on the oxide semiconductor layer 332 over which the oxide insulating layer 366 is formed in a nitrogen atmosphere, the resistance of the exposed region of the oxide semiconductor layer 332 is reduced; thus, an oxide semiconductor layer 362 including regions with different resistances (indicated as a shaded region and a white region in FIG. 16B) is formed.

Then, a conductive film is formed over the gate insulating layer 322, the oxide semiconductor layer 362, and the oxide insulating layer 366. After that, by a fourth photolithography step, a resist mask is formed, and selective etching is performed to form a first electrode 365a and a second electrode 365b. Then, the resist mask is removed (see FIG. 16C).

As a material of the first electrode 365a and the second electrode 365b, an element selected from Al, Cr, Cu, Ta, Ti, Mo, and W, an alloy containing any of these elements as a component, an alloy film containing any of these the elements in combination, or the like can be given. Further, the metal conductive film may have a single-layer structure or a stacked-layer structure of two or more layers.

Through the above steps, heat treatment for dehydration or dehydrogenation is performed on the oxide semiconductor layers after deposition to reduce the resistance, and then, part of the oxide semiconductor layers is selectively brought into an oxygen-excess state. As a result, a channel formation region 363 which overlaps with the gate electrode 361 becomes an i-type region. In addition, a high-resistance source region 364a which overlaps with the first electrode 365a, and a high-resistance drain region 364b which overlaps with the second electrode 365b are formed in a self-aligned manner. Through the above steps, the transistor 360 is formed.

Heat treatment may be further performed at 100° C. to 200° C. inclusive in air for 1 hour to 30 hours inclusive. In this embodiment, the heat treatment is performed at 150° C. for 10 hours. This heat treatment may be performed at a fixed heating temperature or the temperature may be increased from room temperature to a heating temperature of 100° C. to 200° C. inclusive and decreased from the heating temperature to room temperature, plural times repeatedly. Further, this heat treatment may be performed under reduced pressure before the formation of the oxide insulating film. Under reduced pressure, the heating time can be shortened.

By forming the high-resistance drain region 364b (or the high-resistance source region 364a) in part of the oxide semiconductor layer which overlaps with the second electrode 365b (or the first electrode 365a), the reliability of the transistor can be improved. Specifically, by forming the high-resistance drain region 364b, the conductivity can vary stepwise from the drain electrode to the high-resistance drain region 364b and the channel formation region 363. Therefore, in the case where the transistor operates with the second electrode 365b connected to a wiring for supplying a high power supply potential VDD, the high-resistance drain region serves as a buffer and a high electric field is not applied locally even if a high electric field is applied between the gate electrode 361 and the second electrode 365b; thus, the breakdown voltage of the transistor can be improved.

Then, a protective insulating layer 323 is formed over the first electrode 365a, the second electrode 365b, and the oxide insulating layer 366. In this embodiment, the protective insulating layer 323 is formed using a silicon nitride film (see FIG. 16D).

The transistor including an oxide semiconductor layer which is described in this embodiment has extremely high drain breakdown voltage. Consequently, even if a driving voltage is high as in the case of a display device including a liquid crystal material which exhibits a blue phase, a highly-reliable display device can be provided by using the transistor including an oxide semiconductor layer which is described in this embodiment in a pixel for forming a display portion of the display device. In addition, off-state current of the transistor including a high-purity oxide semiconductor can be reduced to $1 \times 10^{-13}$ A or less, preferably $1 \times 10^{-16}$ A or less. Thus, voltage can be held in a storage capacitor for a long period of time and thus power consumption for displaying a still image or the like can be suppressed.

(Embodiment 10)

In this embodiment, another example of a transistor which can be applied to the display device disclosed in this specification will be described. A transistor 350 in this embodiment can be used as, for example, the transistor 6401 in each pixel of the pixel portion described in Embodiment 1.

Figure 17A:
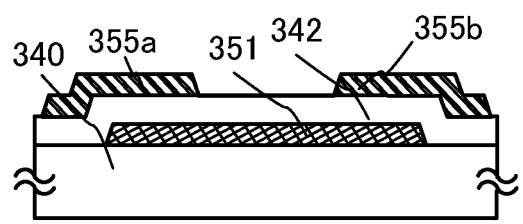
FIGS. 17A to 17D are cross-sectional views illustrating an example of a method for manufacturing a transistor.
Figure 17B:
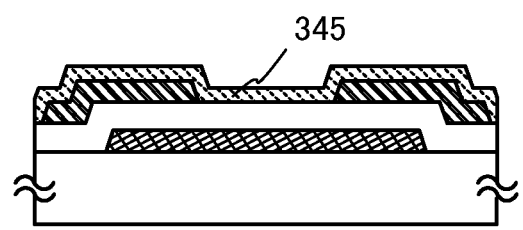
Figure 17C:
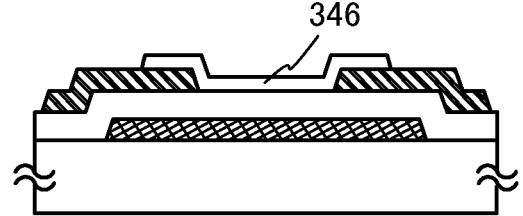
Figure 17D:
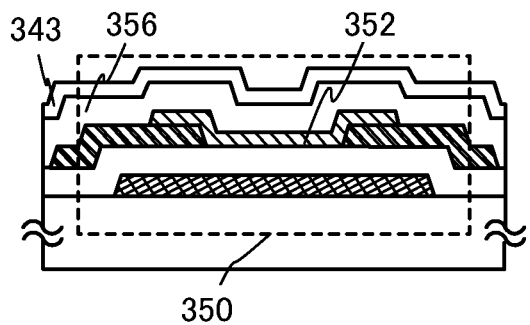

Although the transistor 350 in FIG. 17D has a single-gate structure, the present invention is not limited to the structure. The transistor may have a multi-gate structure which includes a plurality of gate electrodes and a plurality of channel formation regions.

A process of manufacturing the transistor 350 over a substrate 340 will be described below with reference to FIGS. 17A to 17D.

First, a conductive film is formed over the substrate 340, and then, a gate electrode 351 is formed by a first photolithography step. In this embodiment, a 150-nm-thick tungsten film is formed as the gate electrode 351 by a sputtering method.

Then, a gate insulating layer 342 is formed over the gate electrode 351. In this embodiment, a silicon oxynitride film having a thickness of 100 nm or less is formed by a plasma CVD method as the gate insulating layer 342.

Then, a conductive film is formed over the gate insulating layer 342. By a second photolithography step, a resist mask is formed over the conductive film, and selective etching is performed, whereby a source electrode 355a and a drain electrode 355b are formed, and then, the resist mask is removed (see FIG. 17A).

Then, an oxide semiconductor layer 345 is formed (see FIG. 17B). In this embodiment, the oxide semiconductor layer 345 is formed by a sputtering method using an In—Ga—Zn—O-based semiconductor oxide target. Then, the oxide semiconductor layer 345 is processed into an island-shaped oxide semiconductor layer by a third photolithography step.

In the step of forming the oxide semiconductor layer 345, it is preferable that the oxide semiconductor layer 345 be formed while moisture remaining in the process chamber is removed so that the oxide semiconductor layer 345 can be prevented from including hydrogen, hydroxyl, or moisture. As for a method for removing moisture remaining in the process chamber, the method described in other embodiments can be employed.

Then, first treatment is performed on the oxide semiconductor layer for dehydration or dehydrogenation. The temperature of the first heat treatment is 400° C. to 750° C. inclusive, preferably 400° C. or higher and lower than the strain point of the substrate. Here, the substrate is put in an electric furnace which is one type of heat treatment apparatus and heat treatment is performed on the oxide semiconductor layer in a nitrogen atmosphere at 450° C. for one hour. After that, the oxide semiconductor layer is prevented from being exposed to air and from again including water or hydrogen; thus an oxide semiconductor layer 346 is obtained (see FIG. 17C).

The first heat treatment can employ GRTA, in which the substrate is transferred into an inert gas heated to a high temperature of 650° C. to 700° C., and heated for several minutes there, and then the substrate is transferred out of the inert gas heated to a high temperature.

Then, a protective insulating layer 356 is formed in contact with the oxide semiconductor layer 346. The protective insulating layer 356 can be formed with a thickness of 1 nm or more by a method by which impurities such as water or hydrogen is not mixed into the protective insulating layer 356 (e.g., a sputtering method) as appropriate. When hydrogen is included in the protective insulating layer 356, entry of hydrogen to the oxide semiconductor layer or extraction of oxygen in the oxide semiconductor layer by the hydrogen is caused, and thus a backchannel of the oxide semiconductor layer comes to have low resistance (to have n-type), whereby a parasitic channel might be formed. Therefore, it is important to form the protective insulating layer 356 by a method by which hydrogen included in the protective insulating layer 356 is reduced as much as possible.

Note that for the material and the formation method of the protective insulating layer 356, a material and a method similar to those of the oxide insulating layer 396 described in Embodiment 8 can be employed.

Then, second heat treatment (preferably, at 200° C. to 400° C. inclusive, for example, at 250° C. to 350° C. inclusive) is performed in an inert gas atmosphere or in an oxygen gas atmosphere. For example, the second heat treatment is performed in a nitrogen atmosphere at 250° C. for one hour. In the second heat treatment, the oxide semiconductor layer is heated while part thereof (the channel formation region) is in contact with the protective insulating layer 356.

Through the above steps, heat treatment for dehydration or dehydrogenation is performed on the oxide semiconductor layers after deposition to reduce the resistance, and then, the oxide semiconductor layers is brought into an oxygen-excess state. As a result, an i-type oxide semiconductor layer 352 is formed. Through the above steps, the transistor 350 is formed.

Heat treatment may be further performed at 100° C. to 200° C. inclusive in air for 1 hour to 30 hours inclusive. In this embodiment, the heat treatment is performed at 150° C. for 10 hours. This heat treatment may be performed at a fixed heating temperature or the temperature may be increased from room temperature to a heating temperature of 100° C. to 200° C. inclusive and decreased from the heating temperature to room temperature, plural times repeatedly. Further, this heat treatment may be performed under reduced pressure before the formation of the oxide insulating film. Under reduced pressure, the heating time can be shortened. With such heat treatment, hydrogen is introduced from the oxide semiconductor layer to the oxide insulating layer; thus, a normally-off transistor can be obtained. Thus, the reliability of a display device can be increased.

Note that an insulating layer may be additionally provided over the protective insulating layer 356. In this embodiment, an insulating layer 343 is formed over the protective insulating layer 356 (see FIG. 17D). For the material and the formation method of the insulating layer 343, a material and a method similar to those of the protective insulating layer 398 described in Embodiment 8 can be employed.

Further, a planarization insulating layer may be provided for the purpose of planarizing a surface over the insulating layer 343.

The transistor including an oxide semiconductor layer which is described in this embodiment has extremely high drain breakdown voltage. Consequently, even if a driving voltage is high as in the case of a display device including a liquid crystal material which exhibits a blue phase, a highly-reliable display device can be provided by using the transistor including an oxide semiconductor layer which is described in this embodiment in a pixel for forming a display portion of the display device. In addition, off-state current of the transistor including a high-purity oxide semiconductor can be reduced to $1 \times 10^{-13}$ A or less, preferably $1 \times 10^{-16}$ A or less. Thus, voltage can be held in a storage capacitor for a long period of time and thus power consumption for displaying a still image or the like can be suppressed.

(Embodiment 11)

In this embodiment, examples of external views and cross-sectional structure of a liquid crystal display panel in a display device will be described with reference to FIGS. 18A1 to 18B. Note that a display device in this specification refers to an image display device or a display device. The display device includes a module to which a flexible printed circuit (FPC), a tape automated bonding (TAB) tape, or a tape carrier package (TCP) is attached; a module having a TAB tape or a TCP at the end of which is provided with a printed wiring board; and a module having an integrated circuit (IC) which is directly mounted on a display element by a chip on glass (COG) method.

Figure 18B:
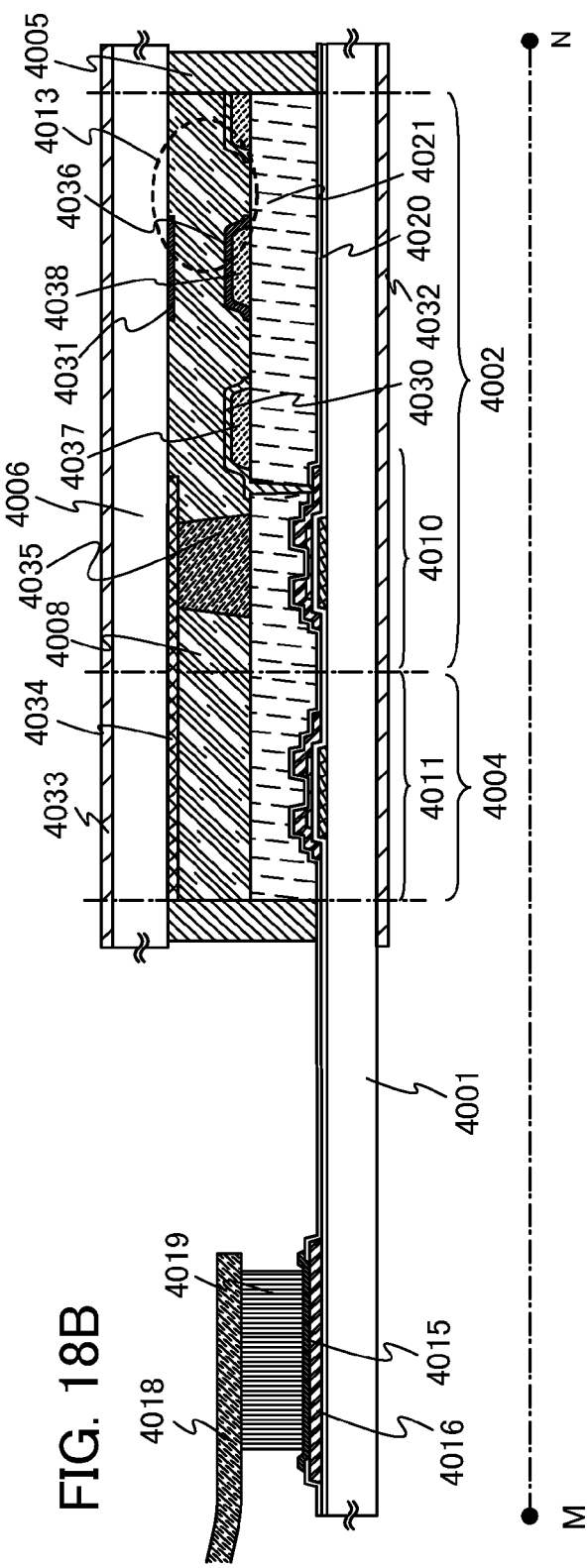

FIGS. 18A1 and 18A2 are plan views of panels in which transistors 4010 and 4011 and a liquid crystal element 4013 are sealed between a first substrate 4001 and a second substrate 4006 with a sealant 4005. FIG. 18B is a cross-sectional view taken along line M-N in FIGS. 18A1 and 18A2.

The sealant 4005 is provided so as to surround a pixel portion 4002 and a scan line driver circuit 4004 which are provided over the first substrate 4001. The second substrate 4006 is provided over the pixel portion 4002 and the scan line driver circuit 4004. The pixel portion 4002 and the scan line driver circuit 4004 are thus sealed together with a liquid crystal layer 4008, by the first substrate 4001, the sealant 4005, and the second substrate 4006. Note that the liquid crystal layer 4008 in this embodiment includes a liquid crystal material which exhibits a blue phase.

In FIG. 18A1, a signal line driver circuit 4003 that is formed using a single crystal semiconductor film or a polycrystalline semiconductor film over a substrate separately prepared is mounted in a region that is not surrounded by the sealant 4005 over the first substrate 4001. In contrast, FIG. 18A2 illustrates an example in which part of a signal line driver circuit is formed over the first substrate 4001. In FIG. 18A2, a signal line driver circuit 4003b is formed over the first substrate 4001 and a signal line driver circuit 4003a that is formed using a single crystal semiconductor film or a polycrystalline semiconductor film over the substrate separately prepared is mounted on the first substrate 4001.

Note that there is no particular limitation on the connection method of the driver circuit which is separately formed, and a COG method, a wire bonding method, a TAB method, or the like can be used as appropriate. FIG. 18A1 illustrates an example in which the signal line driver circuit 4003 is mounted by a COG method and FIG. 18A2 illustrates an example in which the signal line driver circuit 4003 is mounted by a TAB method.

The pixel portion 4002 and the scan line driver circuit 4004 provided over the first substrate 4001 each include a plurality of transistors. FIG. 18B illustrates the transistor 4010 included in the pixel portion 4002 and the transistor 4011 included in the scan line driver circuit 4004, as an example. An insulating layer 4020 and an interlayer film 4021 are provided over the transistors 4010 and 4011. Note that as the transistors 4010 and 4011, the transistor which is described in any one of Embodiments 7 to 10 or the like can be employed.

In addition, over the interlayer film 4021 and the insulating layer 4020, a conductive layer may be provided in a position which overlaps with a channel formation region in a semiconductor layer of the transistor 4011 in the scan line driver circuit 4004. A potential of the conductive layer may be the same or different from that of a gate electrode of the transistor 4011. The conductive layer can serve as a second gate electrode. Alternatively, the potential of the conductive layer may be GND or 0 V, or the conductive layer may be in a floating state.

In addition, a pixel electrode layer 4030 is formed over a first structure body 4037 which is provided over the first substrate 4001 and the interlayer film 4021 so as to project into the liquid crystal layer 4008. The pixel electrode layer 4030 is electrically connected to the transistor 4010. Over the interlayer film 4021, a first common electrode layer 4036 is provided over a second structure body 4038 which is provided to project into the liquid crystal layer 4008. The liquid crystal element 4013 includes the pixel electrode layer 4030, a second common electrode layer 4031, the first common electrode layer 4036, and the liquid crystal layer 4008. In addition, a polarizing plate 4032 and a polarizing plate 4033 are provided on the outer sides of the first substrate 4001 and the second substrate 4006, respectively. Note that although the second common electrode layer 4031 is provided on the second substrate 4006 side in this embodiment, the present invention is not limited to the structure. In other words, the second common electrode layer 4031 may be omitted.

With the pixel electrode layer 4030 which is provided so as to cover a top surface and a side surface of the first structure body 4037 and the first common electrode layer 4036 which is provided so as to cover a top surface and a side surface of the second structure body 4038, an electric field can be widely formed in the liquid crystal layer 4008 between the pixel electrode layer 4030 and the first common electrode layer 4036.

In addition, when the second common electrode layer 4031 is provided on the second substrate 4006 side, an electric field can be applied to liquid crystal in an oblique direction (in a direction oblique to the substrate) between the pixel electrode layer 4030 and the second common electrode layer 4031; thus, liquid crystal molecules can be controlled more efficiently. The liquid crystal molecules in the entire liquid crystal layer including the liquid crystal molecules in the thickness direction can be thereby made to respond and the white transmittance can be improved. As a result, the contrast ratio, which is a ratio of the white transmittance to the black transmittance, can also be improved.

As the first substrate 4001 and the second substrate 4006, glass, plastic, or the like which has a light-transmitting property can be used. The plastic can be a fiberglass-reinforced plastics (FRP) plate, a polyvinyl fluoride (PVF) film, a polyester film, or an acrylic resin film. Alternatively, a sheet in which aluminum foil is sandwiched by PVF films or polyester films can be used.

A columnar spacer 4035 which is formed by selectively etching an insulating film is provided in order to control the cell gap. Note that the present invention is not limited to this structure and a spherical spacer may be used. The cell gap is preferably 1 μm to 20 μm inclusive. Note that the cell gap refers to the average gap between the first substrate 4001 and the second substrate 4006.

Although FIGS. 18A1, 18A2, and 18B illustrate examples of a transmissive liquid crystal display device, the present invention is applicable to a transflective liquid crystal display device and a reflective liquid crystal display device.

FIGS. 18A1, 18A2, and 18B illustrate the liquid crystal display devices in which a polarizing plate is provided on the outer side (the view side) of a substrate; however, the polarizing plate may be provided on the inner side of the substrate. In other words, the position of the polarizing plate may be determined as appropriate depending on the material of the polarizing plate and conditions of the manufacturing process. Further, a light-blocking layer serving as a black matrix may be provided.

The interlayer film 4021 is a light-transmitting chromatic-color resin layer and serves as a color filter layer. Part of the interlayer film 4021 may be a light-blocking layer. In FIGS. 18A1, 18A2, and 18B, a light-blocking layer 4034 is provided on the second substrate 4006 to overlap with the transistors 4010 and 4011. By providing the light-blocking layer 4034, further improvement in contrast and in stabilization of the transistors can be achieved.

The insulating layer 4020 may serves as a protective film of the transistors. To use the insulating layer 4020 as a protective film, the insulating layer 4020 may be formed of a material which can prevent entry of impurities floating in air, such as an organic substance, a metal substance, or moisture, and the insulating layer 4020 is preferably a dense film. Specifically, the protective film may be formed using a single layer or a stack of layers selected from a silicon oxide film, a silicon nitride film, a silicon oxynitride film, a silicon nitride oxide film, an aluminum oxide film, an aluminum nitride film, an aluminum oxynitride film, or an aluminum nitride oxide film by a sputtering method.

Further, in the case of forming another light-transmitting insulating layer as a planarization insulating film, the light-transmitting insulating layer can be formed from an organic material having heat resistance, such as polyimide, acrylic, benzocyclobutene, polyamide, or epoxy. As an alternative to such organic materials, it is also possible to use a low-dielectric constant material (a low-k material), a siloxane-based resin, phosphosilicate glass (PSG), borophosphosilicate glass (BPSG), or the like. The insulating layer may be formed by stacking a plurality of insulating films formed of any of these materials.

The method for forming the insulating layers to be stacked is not particularly limited. Depending on the material, the planarization insulating layer can be formed by a method such as sputtering method, an SOG method, a spin coating method, a dipping method, a spray coating method, or a droplet discharge method (e.g., an ink jetting method, screen printing, or offset printing), or by using a tool (apparatus) such as a doctor knife, a roll coater, a curtain coater, a knife coater, or the like.

The pixel electrode layer 4030, the second common electrode layer 4031, and the first common electrode layer 4036 can be formed using a light-transmitting conductive material such as oxide containing tungsten and indium (indium oxide containing tungsten oxide), oxide containing tungsten, indium, and zinc (indium zinc oxide containing tungsten oxide), oxide containing titanium and indium (indium oxide containing titanium oxide), oxide containing titanium, indium, and tin (indium tin oxide containing titanium oxide), oxide containing indium and tin (indium tin oxide or ITO), oxide containing indium and zinc (indium zinc oxide), and oxide containing silicon, indium, and tin (indium tin oxide to which silicon oxide is added). The pixel electrode layer 4030, the second common electrode layer 4031, and the first common electrode layer 4036 can also be formed using one or plurality of materials selected from metal such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), copper (Cu), or silver (Ag); an alloy thereof; and nitride thereof. Further, the pixel electrode layer 4030, the second common electrode layer 4031, and the first common electrode layer 4036 can also be formed using a conductive high molecule (also referred to as a conductive polymer).

Further, a variety of signals and potentials are supplied to the signal line driver circuit 4003 which is separately formed, the scan line driver circuit 4004, or the pixel portion 4002 from an FPC 4018.

Further, since the transistors are easily broken by static electricity and the like, a protective circuit for protecting the driver circuits is preferably provided over the same substrate as a gate line or a source line. The protection circuit is preferably formed using a nonlinear element.

In FIGS. 18A1, 18A2, and 18B, a connection terminal electrode 4015 is formed using the same conductive film as that of the first common electrode layer 4036, and a terminal electrode 4016 is formed using the same conductive film as that of a source and drain electrode layers of the transistors 4010 and 4011. The connection terminal electrode 4015 is electrically connected to a terminal included in the FPC 4018 through an anisotropic conductive film 4019.

FIGS. 18A1, 18A2, and 18B illustrate an example in which the signal line driver circuit 4003 is formed separately and mounted on the first substrate 4001 without limitation. The scan line driver circuit may be separately formed and then mounted, or only part of the signal line driver circuit or part of the scan line driver circuit may be separately formed and then mounted.

(Embodiment 12)

In this embodiment, specific examples of an electronic device including a display device described in the above embodiments will be described. Note that electronic devices to which the present invention can be applied are not limited to the following specific examples.

Figure 19A:
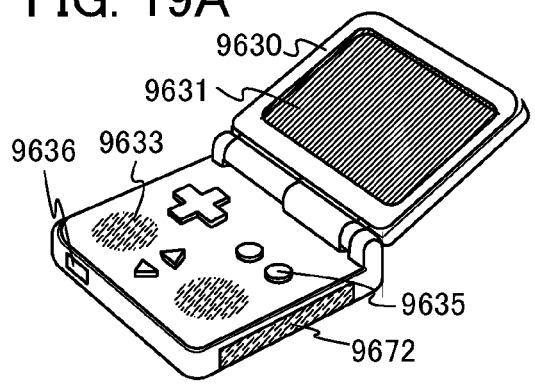
FIGS. 19A to 19C each illustrate an electronic device.

An electronic device illustrated in FIG. 19A is a portable game console which includes a housing 9630, a display portion 9631, a speaker 9633, operation keys 9635, a connection terminal 9636, a storage medium reading portion 9672, and the like. The portable game console may have a function of reading a program or data stored in a storage medium to display it on the display portion, and a function of sharing data with another portable game console by wireless communication. Note that the portable game console can have a variety of functions besides those given above.

Figure 19B:
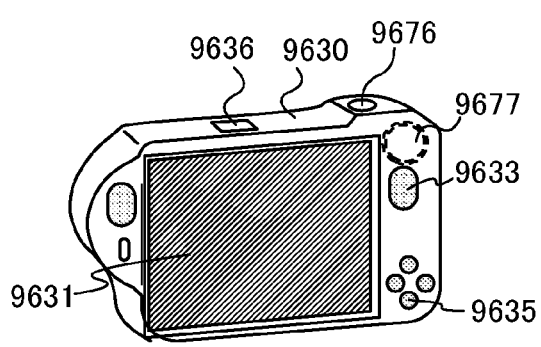

An electronic device illustrated in FIG. 19B is a digital camera which includes a housing 9630, a display portion 9631, a speaker 9633, operation keys 9635, a connection terminal 9636, a shutter button 9676, an image receiving portion 9677, and the like. The digital camera may have a function of photographing a still image and/or a moving image, a function of automatically or manually correcting the photographed image, a function of storing the photographed image data in a memory element, a function of displaying the photographed image data on the display portion, a television reception function, and the like. Note that the digital camera can have a variety of functions besides those given above.

Figure 19C:
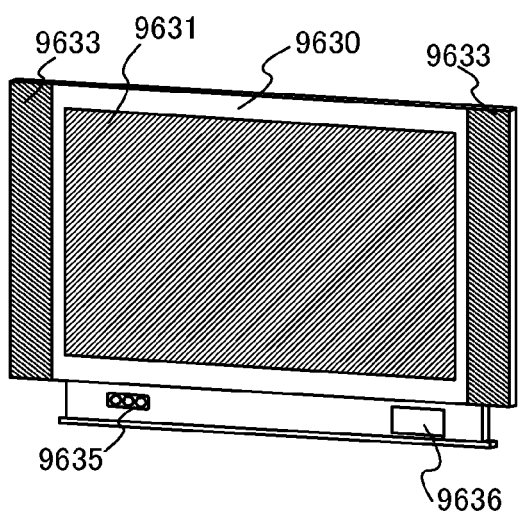

An electronic device illustrated in FIG. 19C is a television receiver which includes a housing 9630, a display portion 9631, speakers 9633, operation keys 9635, a connection terminal 9636, and the like. The television may have a function of converting a television electric wave into an image signal, a function of converting the image signal into a signal for display, a function of converting a frame frequency of the image signal, and the like. Note that the television receiver can have a variety of functions besides those given above.

Figure 20A:
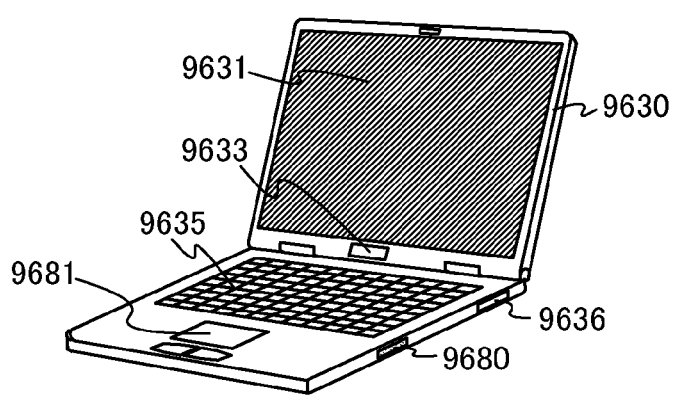
FIGS. 20A to 20D each illustrate an electronic device.

An electronic device illustrated in FIG. 20A is a computer which includes a housing 9630, a display portion 9631, a speaker 9633, operation keys 9635, a connection terminal 9636, a pointing device 9681, an external connection port 9680, and the like. The computer may have a function of displaying various kinds of information (e.g., a still image, a moving image, and a text) on the display portion, a function of controlling processing with a variety of software (programs), a communication function such as wireless communication or wired communication, a function of being connected to various computer networks with the communication function, a function of transmitting or receiving various kinds of data with the communication function, and the like. Note that the computer can have a variety of functions besides those given above.

Figure 20B:
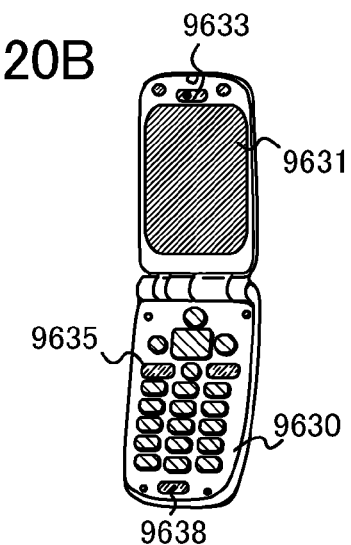

An electronic device illustrated in FIG. 20B is a mobile phone which includes a housing 9630, a display portion 9631, a speaker 9633, operation keys 9635, a microphone 9638, and the like. The mobile phone may have a function of displaying various kinds of data (e.g., a still image, a moving image, and a text) on the display portion, a function of displaying a calendar, a date, the time, and the like on the display portion, a function for managing or editing the data displaying on the display portion, a function of controlling processing with various kinds of software (programs), and the like. Note that the mobile phone can have a variety of functions besides those given above.

Figure 20C:
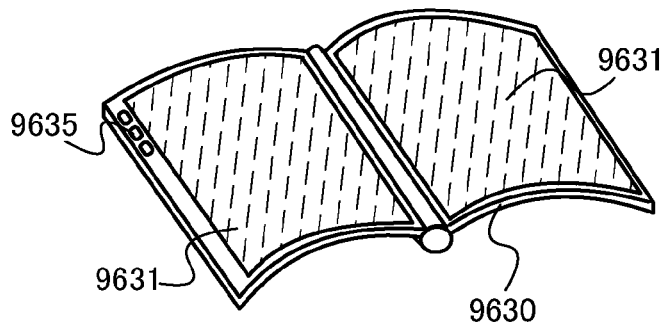

An electric device illustrated in FIG. 20C is an electronic paper including a housing 9630, display portions 9631, operation keys 9635, and the like. The electronic paper may have a function of displaying various kinds of data (e.g., a still image, a moving image, and a text) on the display portion, a function of displaying a calendar, a date, the time, and the like on the display portion, a function for managing or editing the data displaying on the display portion, a function of controlling processing with various kinds of software (programs), and the like. Note that the electronic paper can have a variety of functions besides those given above. An electronic paper can be specifically applied to an electronic book reader (also referred to as an e-book reader), a poster, and an advertisement in a vehicle such as a train, for example.

Figure 20D:
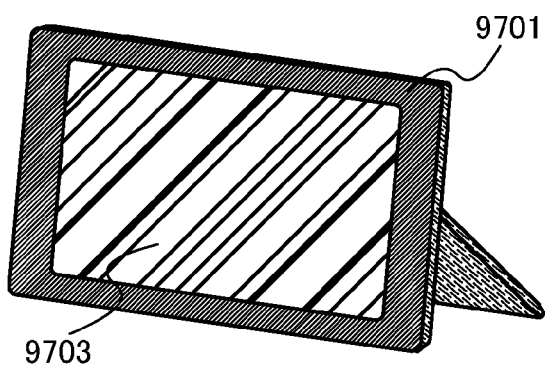

An electric device illustrated in FIG. 20D is a digital photo frame including a display portion 9703 incorporated in a housing 9701. The display portion 9703 can display a variety of images. For example, the display portion 9703 can display image data taken with a digital camera or the like and function like a normal photo frame.

Note that the digital photo frame is provided with an operation portion, an external connection terminal (e.g., a USB terminal and a terminal connectable to a variety of cables such as a USB cable), a storage medium insertion portion, and the like. Although these components may be provided on the same surface as the display portion, it is preferable to provide them on the side surface or the back surface for design aesthetics. For example, a storage medium storing image data taken with a digital camera is inserted into the storage medium insertion portion of the digital photo frame and the data is loaded, whereby the image can be displayed on the display portion 9703.

The digital photo frame may have a function which allows receiving and transmitting of data through wireless communication. In this case, through wireless communication, desired image data can be loaded to the digital photo frame to be displayed. Note that the digital photo frame can have a variety of functions besides those given above.

By using a display device which is one embodiment of the present invention in those electronic devices, the reliability can be improved and power consumption for displaying a still image or the like can be reduced. Accordingly, when the display device which is one embodiment of the present invention is applied to an electronic device which displays still images more often than moving images, such as a digital camera, an electronic paper, and a digital photo frame, an effect of a reduction in power consumption is significant, which is particularly preferable.

This application is based on Japanese Patent Application serial no. 2009-277088 filed with Japan Patent Office on Dec. 4, 2009, the entire contents of which are hereby incorporated by reference.

Explanation of Reference

10: pulse output circuit, 11: first wiring, 12: second wiring, 13: third wiring. 14: fourth wiring, 15: fifth wiring, 16: sixth wiring, 17: seventh wiring, 18: eighth wiring, 21: first input terminal, 22: second input terminal, 23: third input terminal, 24: fourth input terminal, 25: fifth input terminal, 26: first output terminal, 27: second output terminal, 28: sixth input terminal, 31: first transistor, 32: second transistor, 33: third transistor, 34: fourth transistor, 35: fifth transistor, 36: sixth transistor, 37: seventh transistor, 38: eighth transistor, 39: ninth transistor, 40: tenth transistor, 41: eleventh transistor, 51: power supply line, 52: power supply line, 53: wiring, 61: period, 62: period, 101: first wiring, 102A: second wiring, 200: substrate, 201: pixel, 202: pixel portion, 203: scan line driver circuit, 204: signal line driver circuit, 251: period, 252: period, 261: period, 262: period, 320: substrate, 322: gate insulating layer, 323: protective insulating layer, 332: oxide semiconductor layer, 340: substrate, 342: gate insulating layer, 343: insulating layer, 345: oxide semiconductor layer, 346: oxide semiconductor layer, 350: transistor, 351: gate electrode, 352: oxide semiconductor layer, 356: protective insulating film, 360: transistor, 361: gate electrode, 362: oxide semiconductor layer, 363: channel formation region, 366: oxide insulating layer, 390: transistor, 391: gate electrode, 392: oxide semiconductor layer, 393: oxide semiconductor layer, 394: substrate, 396: protective insulating layer, 397: gate insulating layer, 398: insulating layer, 399: oxide semiconductor layer, 400: substrate, 401: wiring (gate electrode), 402: gate insulating layer, 403: oxide semiconductor layer, 404: insulating layer, 407: first insulating film, 408: capacitor wiring, 409: second insulating film, 410: transistor, 411: gate electrode, 412: oxide semiconductor layer, 413: insulating film, 414: light-blocking layer, 417: third insulating film 420: transistor, 441: first substrate, 442: second substrate, 444: liquid crystal layer, 445: second structure body, 446: third electrode, 447: first electrode, 448: second electrode, 449: first structure body, 450: color filter, 1000: display device, 1001: display panel, 1002: signal generation circuit, 1003: memory circuit, 1004: comparison circuit, 1005: selection circuit, 1006: display control circuit, 1007: driver circuit portion, 1008: pixel portion, 1009A: gate line driver circuit, 1009B: signal line driver circuit, 1010: frame memory, 1201: first capacitor, 1202: second capacitor, 1203: third capacitor, 1210: amplifier, 1211: first switch, 1212: second switch, 1213: third switch, 1214: fourth switch, 1220: operational amplifier, 1221: first transistor, 1222: second transistor, 1223: third transistor, 1224: fourth transistor, 1225: fifth transistor, 1226: sixth transistor, 1227: seventh transistor, 1241: signal line driver circuit, 1242: DAC, 1243: pixel: portion, 355*a*: source electrode, 355*b*: drain: electrode, 364*a*: high-resistance source region, 364*b*: high-resistance drain region, 365*a*: first electrode, 365*b*: second electrode, 395*a*: first electrode, 395*b*: second electrode, 405*a*: wiring, 405*b*: wiring, 414*a*: wiring layer, 414*b*: wiring layer, 415*a*: first electrode, 415*b*: second electrode, 421*a*: opening, 421*b*: opening, 443*a*: polarizing: plate, 443*b*: polarizing plate, 4001: first substrate, 4002: pixel portion, 4003: signal line driver circuit, 4003*a*: signal line driver circuit, 4003*b*: signal line driver circuit, 4004: scan line driver circuit, 4005: sealant, 4006: second substrate, 4008: liquid crystal layer, 4010: transistor, 4011: transistor, 4013: liquid crystal element, 4015: connection terminal electrode, 4016: terminal electrode, 4018: FPC, 4019: anisotropic conductive film, 4020: insulating layer, 4021: interlayer film, 4030: pixel electrode layer, 4031: second common electrode layer, 4032: polarizing plate, 4034: light-blocking layer, 4035: spacer, 4036: first common electrode layer, 4037: first structure body, 4038: second structure body, 6401: transistor, 6402: liquid crystal element, 6403: capacitor, 6405: signal line, 6406: scan line, 9630: housing, 9631: display portion, 9633: speaker, 9635: operation key, 9636: connection terminal, 9638: microphone, 9672: storage medium reading portion, 9676: shutter button, 9677: image receiving portion, 9680: external connection port, 9681: pointing device, 9701: housing, 9703: display portion.

The invention claimed is:

1. A display device comprising:
a first substrate having a pixel portion in which a pixel including a transistor is provided;
a second substrate which faces the first substrate; and
a liquid crystal layer between the first substrate and the second substrate,
wherein the liquid crystal layer comprises a liquid crystal material which exhibits a blue phase,
wherein a gate of the transistor is electrically connected to a scan line, one of a source and a drain of the transistor is electrically connected to a signal line, and the other of the source and the drain of the transistor is electrically connected to an electrode, and
wherein the transistor includes an oxide semiconductor layer a hydrogen concentration of which is $5\times10^{19}/cm^3$ or less.

2. The display device according to claim 1,
wherein a carrier concentration of the oxide semiconductor layer is less than $1\times10^{14}/cm^3$.

3. The display device according to claim 1,
wherein the oxide semiconductor layer has a band gap of 2 eV or more.

4. The display device according to claim 1,
wherein a resistivity of the liquid crystal material which exhibits a blue phase is $1\times10^9$ Ω·cm or more.

5. An electronic device comprising the display device according to claim 1.

6. A display device comprising:
a first substrate having a pixel portion in which a pixel including a transistor is provided;
a second substrate which faces the first substrate; and
a liquid crystal layer between the first substrate and the second substrate;
wherein the liquid crystal layer comprises a liquid crystal material which exhibits a blue phase, and
wherein the transistor comprises a gate electrode over the first substrate, a gate insulating film over the gate electrode, an oxide semiconductor layer over the gate insulating film, a source electrode and a drain electrode which are electrically connected to the oxide semiconductor layer,
an insulating film formed to cover the transistor;
a first structure body and a second structure body formed over the insulating film;
a pixel electrode which is electrically connected to the source electrode or the drain electrode through an opening in the insulating film and which is formed to cover the first structure body; and
a common electrode formed to cover the second structure body,
wherein a hydrogen concentration of the oxide semiconductor layer is $5\times10^{19}/cm^3$ or less.

7. The display device according to claim 6,
wherein a carrier concentration of the oxide semiconductor layer is less than $1\times10^{14}/cm^3$.

8. The display device according to claim 6,
wherein the oxide semiconductor layer has a band gap of 2 eV or more.

9. The display device according to claim 6,
wherein a resistivity of the liquid crystal material which exhibits a blue phase is $1\times10^9$ Ω·cm or more.

10. An electronic device comprising the display device according to claim 6.

* * * * *

UNITED STATES PATENT AND TRADEMARK OFFICE
CERTIFICATE OF CORRECTION

PATENT NO. : 8,432,502 B2
APPLICATION NO. : 12/957809
DATED : April 30, 2013
INVENTOR(S) : Shunpei Yamazaki et al.

It is certified that error appears in the above-identified patent and that said Letters Patent is hereby corrected as shown below:

In the Specification

At column 5, line 41, "(R, G and" should be --(R,G, and--;

At column 8, line 29, "itself In" should be --itself. In--;

At column 9, line 11, "bather" should be --barrier--;

At column 9, line 12, "bather" should be --barrier--;

At column 9, line 21, "bather" should be --barrier--;

At column 39, line 16, "nm In this" should be --nm. In this--.

Signed and Sealed this
Eleventh Day of February, 2014

Michelle K. Lee
*Deputy Director of the United States Patent and Trademark Office*